US006950551B2

(12) United States Patent
Murashita et al.

(10) Patent No.: US 6,950,551 B2
(45) Date of Patent: Sep. 27, 2005

(54) TERMINAL AND INPUT/OUTPUT CHARACTERISTIC MEASUREMENT METHOD AND CALCULATION APPARATUS FOR DISPLAY DEVICE

(75) Inventors: Kimitaka Murashita, Kawasaki (JP); Shoji Suzuki, Kawasaki (JP); Masahiro Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 25 days.

(21) Appl. No.: 10/272,004

(22) Filed: Oct. 17, 2002

(65) Prior Publication Data

US 2003/0053001 A1 Mar. 20, 2003

Related U.S. Application Data

(62) Division of application No. 09/262,010, filed on Mar. 4, 1999, now Pat. No. 6,504,950.

(30) Foreign Application Priority Data

May 27, 1998 (JP) .......................................... 10-145787

(51) Int. Cl.[7] .................................................. G06K 9/00

(52) U.S. Cl. ....................... 382/166; 382/169; 358/507; 345/588

(58) Field of Search ................................ 382/167, 166, 382/500, 169, 162; 358/507, 521, 530, 500; 345/588

(56) References Cited

U.S. PATENT DOCUMENTS 5,298,993 A 3/1994 Edgar et al. ................ 348/180
5,532,719 A * 7/1996 Kikinis ....................... 345/211
5,572,444 A * 11/1996 Lentz et al. ........... 364/551.01
5,638,117 A 6/1997 Engeldrum et al. ......... 348/179
5,739,809 A 4/1998 McLaughlin et al. ....... 345/150
6,337,922 B2 1/2002 Kumada ..................... 382/162
6,683,687 B1 * 1/2004 Hoeller ....................... 356/385

FOREIGN PATENT DOCUMENTS

EP 0 597 797 5/1994
EP 0665680 8/1995
EP 0 785 672 7/1997
EP 0828329 11/1998
JP 10-277223 * 10/1998 ............. A63F/7/02
WO 96/08811 3/1996

* cited by examiner

*Primary Examiner*—Jerome Grant, II
(74) *Attorney, Agent, or Firm*—Staas & Halsey LLP

(57) ABSTRACT

An apparatus for creating an ICC profile in a simple manner without using a specialized measuring instrument. A display control unit reads out a dot pattern image from a pattern image data holding unit and a grayscale pattern image containing a plurality of grayscale patches of gradually varying gray scale from a grayscale image data holding unit, and presents the thus readout images for display on a display device. A user selects the grayscale patch having brightness closest to the brightness of the dot pattern image by operating a selection unit. Based on the selection, a gamma coefficient value is calculated by a gamma coefficient value calculation unit, and based on this gamma coefficient value, a profile creation unit modifies the ICC profile held in a common information holding unit and thus creates a customized ICC profile.

9 Claims, 47 Drawing Sheets

| INPUT(E) | OUTPUT($E^{2.443}$) |
|---|---|
| 0 | 0 |
| 0.2 | 0.0196 |
| 0.4 | 0.1066 |
| 0.6 | 0.2871 |
| 0.8 | 0.5798 |
| 1.0 | 1.0 |

| INPUT(E) | OUTPUT(B) |
|---|---|
| 0 | 0 |
| x1 | 0.2 |
| x2 | 0.4 |
| x3 | 0.6 |
| x4 | 0.8 |
| 1.0 | 1.0 |

COMPARE THE TOP AND BOTTOM IMAGES.

WHICH BOTTOM IMAGE APPEARS CLOSEST TO THE DENSITY OF THE TOP IMAGE? YOU CAN EASILY TELL IF YOU LOOK AT THE SCREEN FROM A DISTANCE.

COMPARE THE TOP AND BOTTOM IMAGES.

WHICH BOTTOM IMAGE APPEARS CLOSEST TO THE DENSITY OF THE TOP IMAGE? YOU CAN EASILY TELL IF YOU LOOK AT THE SCREEN FROM A DISTANCE.

Fig.37

```
<HTML>
<BODY BGCOLOR="#ffffff"></BODY>
<CENTER>
<H1>COMPARE THE TOP AND BOTTOM IMAGES.</H1><BR>
<BR>
WHICH BOTTOM IMAGE APPEARS CLOSEST TO THE DENSITY OF THE TOP IMAGE?<BR>
<BR>
<font size=-1>YOU CAN EASILY TELL IF YOU LOOK AT THE SCREEN FROM A DISTANCE.</FONT><BR>
<BR>
<BR>
<img src="ichimatsu.gif"><BR>
<!--<img src="grey00-ff.jpg"><BR> -->
<A href="index1.html"><img src="patch/patch00.gif" BORDER=0></A><A href="index2.html"><img
src="patch/patch20.gif" BORDER=0></A><A href="index3.html"><img src="patch/patch40.gif" BOR
DER=0></A><A href="index4.html"><img src="patch/patch60.gif" BORDER=0></A><A href="index5.h
tml"><img src="patch/patch80.gif" BORDER=0></A><A href="index6.html"><img src="patch/patcha
0.gif" BORDER=0></A><A href="index7.html"><img src="patch/patchc0.gif" BORDER=0></A><A href
="index8.html"><img src="patch/patche0.gif" BORDER=0></A><A href="index8.html"><img src="pa
tch/patchff.gif" BORDER=0></A><BR>
<!--
<A href="/cgi-bin/imagemap/~mura/gamma/index1.map"><img src="grey00-ff.jpg" BORDER=0 ISMAP>
</A><BR>
-->
<BR>
</CENTER>
</HTML>
```

COMPARE THE TOP AND BOTTOM IMAGES.

ADJUST THE DISPLAY CONTRAST SO THAT THE THIRD PATCH FROM RIGHT IN THE BOTTOM GRAYSCALE IMAGE BECOMES CLOSEST IN DENSITY TO THE TOP IMAGE. YOU CAN EASILY TELL IF YOU LOOK AT THE DISPLAY FROM A DISTANCE.

Fig.52

| | COLUMN → 0 1 | 2 3 | 4 5 | 6 7 | 8 9 | a b | c d | e f | ROW |
|---|---|---|---|---|---|---|---|---|---|
| PROFILE HEADER Ph | 0000 | 017c | 4b43 | 4d53 | 0200 | 0000 | 6d6e | 7472 | 0 |
| | 5247 | 4220 | 5859 | 5a20 | 07cd | 000b | 0013 | 000a | 1 |
| | 0019 | 0004 | 6163 | 7370 | 4d53 | 4654 | 0000 | 0000 | 2 |
| | 4655 | 4a49 | 6e6f | 6e65 | 0000 | 0000 | 0000 | 0000 | 3 |
| | 0000 | 0000 | 0000 | f6d5 | 0001 | 0000 | 0000 | d32b | 4 |
| | 002e | 3832 | 0000 | 0000 | 0000 | 0000 | 0000 | 0000 | 5 |
| | 0000 | 0000 | 0000 | 0000 | 0000 | 0000 | 0000 | 0000 | 6 |
| | 0000 | 0000 | 0000 | 0000 | 0000 | 0000 | 0000 | 0000 | 7 |
| TAG TABLE Tt | 0000 | 0004 | 6465 | 7363 | 0000 | 00b4 | 0000 | 0074 | 8 |
| | 7774 | 7074 | 0000 | 0128 | 0000 | 0014 | 7258 | 595a | 9 |
| | 0000 | 013c | 0000 | 0014 | 7254 | 5243 | 0000 | 0150 | a |
| | 0000 | 002c | 6465 | 7363 | 0000 | 0000 | 0000 | 0008 | b |
| TAG ELEMENT DATA Ted | 4655 | 4a49 | 5453 | 5500 | 0000 | 0000 | 0000 | 0009 | c |
| | feff | 0046 | 0055 | 004a | 0049 | 0054 | 0053 | 0055 | d |
| | 0000 | 0000 | 1246 | 554a | 4954 | 5355 | 0000 | 4900 | e |
| | 5400 | 5300 | 5500 | 0000 | 0000 | 0000 | 0000 | 0000 | f |
| | 0000 | 0000 | 0000 | 0000 | 0000 | 0000 | 0000 | 0000 | 10 |
| | 0000 | 0000 | 0000 | 0000 | 0000 | 0000 | 0000 | 0000 | 11 |
| | 0000 | 0000 | 0000 | 0000 | 5859 | 5a20 | 0000 | 0000 | 12 |
| | 0000 | f5db | 0001 | 0000 | 0001 | 72bb | 5859 | 5a20 | 13 |
| | 0000 | 0000 | 0000 | 6796 | 0000 | 38bd | 0000 | 0342 | 14 |
| | 6375 | 7276 | 0000 | 0000 | 0000 | 0010 | 0000 | 01ed | 15 |
| | 03bd | 05e1 | 0a23 | 11f9 | 1c54 | 26e7 | 3481 | 467e | 16 |
| | 5b56 | 7069 | 88ae | a51c | c3ff | e2f7 | | | 17 |

Ip

PDT wtpt rTRC rXYZ wtpt rTRC rXYZ

Fig.54

| | X | Y | Z | x | y | u' | v' |
|---|---|---|---|---|---|---|---|
| RED | 43.200 | 24.060 | 2.958 | 0.615 | 0.343 | 0.418 | 0.524 |
| GREEN | 29.040 | 64.400 | 11.970 | 0.275 | 0.611 | 0.113 | 0.562 |
| BLUE | 17.660 | 6.559 | 97.740 | 0.145 | 0.054 | 0.173 | 0.144 |
| WHITE | 88.180 | 94.710 | 105.900 | 0.305 | 0.328 | 0.193 | 0.467 |

GAMMA CHARACTERISTIC

TERMINAL AND INPUT/OUTPUT CHARACTERISTIC MEASUREMENT METHOD AND CALCULATION APPARATUS FOR DISPLAY DEVICE

This application is a divisional of application Ser. No. 09/262,010, filed Mar. 4, 1999 now U.S. Pat. No. 6,504,950.

BACKGROUND OF THE INVENTION

1. Field of the Invention

The present invention relates to a terminal that has a keyboard and a display for a user to communicate with a data processing system or the like, and that adjusts the color reproduction of the screen of a display device.

The invention also relates to an input/output characteristic measurement method and an input/output characteristic calculation apparatus for obtaining the input/output characteristics, i.e., the electro-optical conversion characteristics, of a display such as a CRT display device or a liquid crystal display device.

The invention further relates to a display profile creation method and display profile creation apparatus for creating a profile relating to the color appearance of the display device.

Furthermore, the invention relates to a display calibration method and calibration apparatus that enable adjustments relating to the profile, etc. of the display device to be made in a simple manner.

The present invention further relates to a recording medium recording a program that may advantageously be used, for example, when adjusting the color appearance, etc. of a screen or when calculating the input/output characteristics of a display.

2. Description of the Related Art

With increasing prevalence of high-performance personal computers (hereinafter, personal computers may also be referred to as PCs) and the decreasing prices of image input devices such as scanners and image output devices such as color printers, the opportunities for individuals to handle color images are increasing. However, as more individuals have come to handle color images, color reproducibility is becoming a problem. That is, the problem concerns the difficulty in color matching between an original image and an image produced on a display, or between an original image and an image printed by a printer, or further between an image produced on a display and an image printed by a printer. Such a problem arises because color characteristics such as a color producing mechanism and a color gamut differ between different input/output devices.

A color management system (hereinafter sometimes referred to as the CMS) is a technique for matching color appearance between different input/output devices such as displays, scanners, color printers, etc. Using the CMS, it becomes possible to match color appearance between an image read by a scanner and an image displayed on a display and also between such an image and an image output by a color printer, and an image processing system can be constructed that does not give the user the feeling of unnaturalness about the color appearances of the various images output from different input/output devices.

In recent years, it has become common to incorporate a CMS framework at the OS level, such as ICM (Image Color Matching) 1.0 in Windows 95 and ColorSync 2.0 in the Macintosh environment. Manufacturers of input/output devices provide users with device profiles conforming to ICM 1.0 or ColorSync 2.0 so that the users can view color images without unnatural differences in color between images produced by different image output devices, for example, an image produced on a display and an image printed by a printer.

Device profiles for ICM 1.0 and ColorSync 2.0 conform to the ICC profiles proposed by the International Color Consortium (ICC). With manufacturers of input/output devices providing device profiles conforming to the ICC Profile Specification, users, in the Windows environment and the Macintosh environment alike, can obtain images free from unnaturalness in color appearance and can use various input/output devices without having to worry about differences in color appearance.

When using a CMS in a computing environment today, the ICC profiles are generally used as information holding the characteristics of input/output devices.

FIG. 51 conceptually shows the format of an ICC profile Ip. FIG. 52 shows dump data in hexadecimal to illustrate the format of the ICC profile Ip in a specific example.

As shown in FIGS. 51 and 52, the ICC profile Ip consists of a fixed length 128-byte profile header Ph containing information on the profile itself and information on the target device (input/output device), a variable length tag table Tt indicating what information is stored where, and tag element data Ted of variable length containing actual information.

In the ICC profile Ip, each necessary data element is described within the tag table Tt using a 12-byte tag consisting of a 4-byte signature tag Ta, a 4-byte storage address tag Tb, and a 4-byte size tag Tc indicating the size of the data element. A 4-byte tag count tag Tn at the head of the tag table Tt contains a count of the number of tags, (n), in the tag table itself. It is therefore seen that the total number of bytes in the tag table Tt is given by 4+12n bytes. In the example of FIG. 52, the tag count n is 4 (that is, 00000004h (h indicating hexadecimal notation)).

To describe in further detail the contents of the first 12-byte tag labeled profileDescriptionTag PDT (see FIG. 52) following the 4-byte tag count tag Tn in the tag table Tt, the first four bytes (6465 7363) as the signature tag Ta indicate information (name) unique to the profile, and the next four bytes (0000 00b4) as the storage address tag Tb represent the starting address (row b and column 4) in the tag element data Ted. The last four bytes (0000 0074) as the size tag Tc show that the data size is 74h=116. The tag element data Ted having the size of 74h is also a Profile Description Tag PDT and contains information (name, etc.) unique to the profile.

The tag element data Ted specified by the next 12-byte tag labeled mediaWhitePointTag (also referred to as wtptTag) wtpt contains CIEXYZ values of white (w). The tag element data Ted specified by the next 12-byte tag labeled redColorantTag (also referred to as rXYZTag) rXYZ contains normalized CIEXYZ values of red (r). The last 12-byte tag labeled redTRCTag (also referred to as rTRCTag) rTRC stores input/output characteristic values of red (r); in the example of FIG. 52, values of 16 points are stored in the last 32 bytes (two bytes for each point). In the CCC profile Ip, the stored CIEXYZ values are normalized with respect to the standard illuminant of D50.

FIG. 53 shows the color gamut of a display, such as a CRT display, plotted on an u', v' chromaticity diagram. In FIG. 53, the horseshoe-shaped region containing the triangle bounding the range of reproducible colors (color gamut) indicates the limits of chromaticities distinguishable by the human eye. FIG. 54 shows an example of CIEXYZ measurements. Further, FIG. 55 shows an example of the gamma characteristic (electro-optical conversion characteristic) as an input/output characteristic of a display.

In the case of a display, if the CIEXYZ values (see FIG. 54) when the primary colors R, G, and B are at their maximum values (Rmax, Gmax, and Bmax), as shown in FIG. 53, and the input/output characteristic for each of the R, G, and B colors, such as shown in FIG. 55, are known, then a gamma coefficient value can be calculated using the gamma coefficient calculation formula (IEC 1966-3) shown in equation (1) below defined by the International Electrotechnical Commission (IEC), and the display characteristics of the display can be determined using equations (2) to (5) below which are known linear conversion equations. Here, the CIEXYZ values of the R, G, and B colors define the range of reproducible colors (color gamut), and the input/output characteristic of the display is represented by the gamma characteristic.

$$\gamma = \frac{1}{D}\left(n\sum_{i=1}^{n} P_i q_i - \sum_{i=1}^{n} P_i \sum_{n=1}^{n} q_i\right) \qquad (1)$$

where $P_i = \log_{10} x_i$ ($x_i$=input voltage)

$q_i = \log_{10} y_i$ ($y_i$=display luminance)

$$D = n\sum_{i=1}^{n} P_i^2 - \left(\sum_{i=1}^{n} q_i\right)^2$$

In equation (1), $x_i$ represents the value of input voltage and $y_i$ the value of displayed luminance.

$$x = X/(X+Y+Z) \qquad (2)$$

$$y = Y/(X+Y+Z) \qquad (3)$$

$$u' = 4X/(X+15Y+3Z) \qquad (4)$$

$$v' = 9X/(X+15Y+3Z) \qquad (5)$$

As earlier described, in the ICC profile Ip for a display, the CIEXYZ values of the R, G, and B colors (refer, for example, to FIG. 54) are stored in the rXYZ, gXYZ, and bXYZ tags (in FIG. 52, the rXYZ tag is shown as an example) as information indicating the range of reproducible colors. As for the gamma characteristic, the input/output point values for the R, G, and B colors are respectively stored in the rTRC, gTRC, and bTRC tags. When the number of points in the tag is 0, it means that the gamma coefficient for that color is 1.0, and when the number of points is 1, the gamma coefficient value itself is stored. When the number of points is 2 or larger, the same number of input/output point values as the number of points are stored. In the example of FIG. 52, input/output point values for 16 points are stored in the last 32 bytes, and 16 output values are shown for 16 inputs dividing the section 0.0 to 1.0 in 16 equal parts, i.e., 0, 1/16, 2/16, . . . , 15/16. In other words, when the stored data elements are $Y_1, Y_2, \ldots, Y_n$, for example, (in the example of FIG. 52, n=16), relations (input, output)=(0/n, $Y_1$), (1/n, $Y_2$), . . . , ((n−1)/n, $Y_n$) are stored.

In addition to the above, the CIEXYZ values (refer, for example, to FIG. 54) when white is at its maximum value (Wmax) are contained in the wtpt tag as the standard white information of the display.

In the ICC profile Ip for a display, it is usual practice to store these seven items of information (the normalized CIEXYZ values of the R, G, and B colors, the input/output point values for the R, G, and B colors, and the normalized maximum value information of white). These seven items of information can be obtained by displaying colors on the display based on color data, and by measuring the displayed luminance and CIEXYZ values using a measuring instrument (colorimeter such as a spectroradiometer). Usually, at the manufacturer, a reference display is prepared and, using the just mentioned measuring instrument, the luminance and CIEXYZ values of displayed colors are measured on the reference display; based on the obtained values, an ICC profile Ip is created which is supplied to the user.

When creating a profile, such as the ICC profile Ip, for a display, the input/output characteristics of the display must be measured.

For example, when a manufacturer delivers a new display unit to a user or performs color matching on the existing display unit that the user has, the practice has been such that the manufacturer's staff carries color data of measurement colors to be displayed on the display unit, an application for displaying colors from the color data, a signal generator for directly displaying colors on the display unit, a measuring instrument for measuring the colors displayed on the display unit, etc. to the user site and, using these resources, measures the input/output characteristics of the display unit. Then, based on the measurement results, the manufacturer's staff calibrates the display unit or creates a profile for color display correction for the display unit and installs it on the system in which the display unit is used.

Of course, the calibration of the display or creation of a profile for the display may be done at factory before shipment or by sending the user's display unit to the factory, but since colors displayed on the display are greatly influenced by the reflection of ambient lighting (surrounding light) on the display, it is desirable that the display setup or the creation of the profile be done at the site where the display is actually used, that is, at the user site.

Further, the display calibration work by the manufacturer as described above would be costly and not practical for ordinary users who use their personal computers in their homes. Therefore, in most cases, a profile that comes with a purchased display unit or a profile conforming to the ICC profile Ip and included as standard with an operating system such as Windows 95 is used as the profile data for the display.

Manufacturers display images on a reference display using various image data, measure luminance and chromaticity on the display surface using a specialized measuring instrument, create a profile for color conversion, and supply the created profile to users.

However, not all display manufacturers provide profiles, and furthermore, even in the case of a display shipped with a profile, the attached profile may not match the display used because of variations among individual display units or may become unusable because of aging or other factors.

On the other hand, if the user desires to calibrate his display by himself, he will need a measuring instrument for measuring the luminance and chromaticity on the display and image data (special data used for calibration, also called reference data) for displaying images on the display for the measurement.

Color calibration of a display requires the use of calibration image display data as reference data for collecting display calibration data and a measuring instrument for measuring the displayed image. Color reproduction on the display must account for the effects of surrounding light, such as ambient lighting, as well as the color display characteristics unique to the display used.

Accordingly, it has been common practice for the manufacturer's staff to carry a special measuring instrument and other resources to the user site and calibrate the user's display on site.

However, since the task of creating a profile by measuring the display using a measuring instrument involves extremely complicated procedures, the display calibration work has been a cost increasing factor for both the manufacturer and the user.

For users who cannot afford the expense of display calibration using professional equipment, the only choice left is to use profiles provided by the manufacturer.

However, the color output of a display varies depending on the environment where the display is used, the production lot, aging, etc. Furthermore, because of variations among individual units, there is no guarantee that the profile provided by the manufacturer will always match the user's display.

Accordingly, if a profile is to be obtained that matches the user's display, a profile must be created from the color display characteristics of the user's display itself.

If the user desires to create a profile for his own display, however, he will need a specialized measuring instrument for measuring the luminance and chromaticity on his display and reference data for displaying images to obtain measurement data; the problem here is, as earlier described, such a measuring instrument is expensive and not readily purchasable by an individual user. Furthermore, the reference data for obtaining measurement data is quite special, and data suitable for use as such reference data has not been made public.

On the other hand, display characteristics not only vary depending on the make and model, but also differ even between units of the same model, depending on the lot number, the length of time used, the use environment (particularly, lighting environment), etc. It is therefore not too much to say that each individual display unit has unique display characteristics.

Accordingly, creation of a profile such as one conforming to the ICC profile format requires that the display characteristics unique to the display be measured and the measurement results be reflected into the profile, but for reasons of cost, space, etc., it is difficult for an individual user to own a measuring instrument capable of measuring the display characteristics of a display, and the user ends up being unable to create a profile for his display, that is, a profile unique to his own display.

SUMMARY OF THE INVENTION

The present invention has been devised in view of the above-enumerated problems, and it is an object of the present invention to provide a terminal that makes it possible to measure in a simple manner the input/output characteristics, i.e., the electro-optical conversion characteristics, of a display such as a CRT display device or a liquid crystal display device attached to it.

It is another object of the present invention to provide an input/output characteristic measurement method and input/output characteristic calculation apparatus for a display device that enable the input/output characteristics to be measured and calculated in a simple manner at the user side.

It is a further object of the present invention to provide a profile creation method and profile creation apparatus for a display device that enable the user to create a profile relating to the color appearance of the display without using a specialized measuring instrument.

It is still another object of the present invention to provide a calibration method and calibration apparatus for a display device that enable the user to perform calibration relating to the profile, etc. of the display without the need for special reference data.

It is yet another object of the present invention to provide a recording medium recording a program that makes it possible, for example, to adjust the color appearance, etc. of a screen, or to calculate the input/output characteristics of a display.

A terminal according to the present invention is configured to simultaneously display on a display device: a pattern image region consisting of first pixels of first luminance and second pixels of second luminance in prescribed proportions to provide prescribed luminance by an average luminance value taken over the first and second pixels; and a grayscale image region consisting of pixels of uniform luminance. According to this configuration, an input/output characteristic of the display device can be measured in a simple manner based on the displayed results.

In this case, the input/output characteristic measurement can be further simplified by subdividing the grayscale image region into smaller regions each having different luminance.

It is also possible to further simplify the input/output characteristic measurement by providing regularity in the arrangement of the first and second pixels in the pattern image region.

An input/output characteristic measurement method according to the present invention comprises: a displaying step for simultaneously displaying on a display device a pattern image consisting of a plurality of colors and a grayscale image consisting of a single color lying between the plurality of colors used for the formation of the pattern image; and an input/output characteristic deriving step for obtaining an input/output characteristic of the display device based on the displayed images. Since the pattern image and grayscale image are displayed simultaneously, the input/output characteristic can be calculated easily.

In this case, if the pattern image is displayed as an image consisting of first pixels of first luminance and second pixels of second luminance in prescribed proportions to provide prescribed luminance by an average luminance value taken over the first and second pixels, and the grayscale image is displayed as an image consisting of pixels of uniform luminance, the input/output characteristic can be obtained easily.

For example, a grayscale pattern image containing a plurality of grayscale patches of gradually varying gray scale may be displayed on the display device, simultaneously with the pattern image, or alternatively, while keeping the pattern image displayed on the display device, the grayscale patch images forming the grayscale pattern image may be sequentially presented for display one at a time.

In a preferred mode, the pattern image is displayed as a dot pattern image consisting of black pixels and white pixels and the grayscale image as a grayscale pattern image containing a plurality of patches consisting of gray pixels with the gray scale varying in steps from one patch to the next; then, the patch having brightness closest to the brightness of the dot pattern image is selected from the grayscale pattern image, and the input/output characteristic of the display device is obtained based on the selected patch. In this way, the input/output characteristic of the display device for gray color can be obtained easily.

Further, by displaying the pattern image as a dot pattern image consisting, for example, of black pixels and non-black pixels and the grayscale image as a grayscale pattern image containing a plurality of patches consisting of like non-black pixels with the gray scale varying in steps from one patch to the next, the input/output characteristic for an arbitrary color can be obtained.

Furthermore, if R, G, and B colors, for example, are sequentially selected as the color of the non-black pixels in the dot pattern image while sequentially presenting the grayscale image pattern of the same color as the selected color, the input/output characteristic for each of the R, G, and B colors can be obtained.

Moreover, the input/output characteristic obtained for white color or a predesignated non-black color (which may include any one of the R, G, and B colors), for example, may be substituted for all or part of the input/output characteristics for the R, G, and B colors.

If the dot pattern image is displayed as a checkerboard pattern image consisting, for example, of black pixels and non-black pixels, the image can advantageously be used for sequential scan type displays.

By determining the displayed size of each color of the checkerboard pattern image according to the resolution of the display device, an artifact such as moire can be prevented from being generated in the displayed image, and the measurement can thus be made easily.

If the ratio between the black pixels and non-black pixels in the dot pattern image is set at a value other than 1:1, the generation of moire, etc. in the displayed image can be prevented more effectively.

By determining the black/non-black pixel ratio according to the resolution of the display device, a dot pattern image optimized for the display device can be produced.

The input/output characteristic obtained in the above method is, for example, the gamma characteristic representing the electro-optical conversion characteristic of the display device. The method can thus be applied to almost all types of display device.

In another preferred mode, the pattern image is displayed as a stripe pattern image consisting of lines of first pixels of first luminance and lines of second pixels of second luminance, the lines running parallel to the horizontal scanning direction of the screen of the display device, and the grayscale image is displayed as an image consisting of pixels of uniform luminance. This serves to eliminate the difference between the density represented by a data value and the actually displayed density that occurs, for example, due to the horizontal scanning frequency of a raster scan type display device.

For example, the lines consisting of the first pixels of the first luminance can be constructed from lines of black pixels and the lines consisting of the second pixels of the second luminance from lines of white pixels. The same effect can also be obtained if the pattern image is displayed as a stripe pattern image consisting of lines of black pixels and lines of non-black pixels, the lines running parallel to the horizontal scanning direction of the screen of the display device.

In an input/output characteristic calculation apparatus according to the present invention, display control means presents the pattern image and grayscale image simultaneously for display on the display device based on the pattern image data and grayscale image data read out of pattern image data holding means and grayscale image data holding means, and input/output characteristic calculation means obtains the input/output characteristic of the display device based on the display of the pattern image and grayscale image. Since the pattern image and grayscale image are displayed simultaneously, the input/output characteristic can be easily calculated.

In this case, a grayscale pattern image containing a plurality of grayscale patches of gradually varying gray scale, for example, may be displayed on the display device, simultaneously with the pattern image, or alternatively, while keeping the pattern image displayed on the display device, the grayscale patch images forming the grayscale pattern image may be sequentially presented for display one at a time.

In a preferred mode, the pattern image is displayed as a dot pattern image consisting of black pixels and white pixels and the grayscale image as a grayscale pattern image containing a plurality of patches consisting of gray pixels with the gray scale varying in steps from one patch to the next; then, the patch having brightness closest to the brightness of the dot pattern image is selected from the grayscale pattern image, and the input/output characteristic of the display device is obtained based on the selected patch. In this way, the input/output characteristic of the display device for a gray can be obtained easily.

Further, if the pattern image is displayed as a checkerboard pattern image consisting, for example, of black pixels and non-black pixels, the image can be advantageously used, for example, for sequential scan type displays.

By determining the displayed size of each color of the checkerboard pattern image according, for example, to the resolution of the display device, an artifact such as moire can be prevented from being generated in the displayed image, and the measurement can thus be made easily.

Further, if, for example, the ratio between the black pixels and non-black pixels in the dot pattern image is set at a value other than 1:1, the generation of moire, etc. in the displayed image can be prevented more effectively.

Furthermore, by determining the black/non-black pixel ratio according, for example, to the resolution of the display device, a dot pattern image optimized for the display device can be produced.

The input/output characteristic calculated by the apparatus is, for example, the gamma characteristic representing the electro-optical conversion characteristic of the display device. The apparatus can thus be applied to almost all types of display device.

In another preferred mode, the pattern image is displayed as a stripe pattern image consisting of lines of first pixels of first luminance and lines of second pixels of second luminance, the lines running parallel to the horizontal scanning direction of the screen of the display device. This serves to eliminate the difference between the density represented by a data value and the actually displayed density that occurs, for example, due to the horizontal scanning frequency of a raster scan type display device.

When the pattern image is displayed as a stripe pattern image consisting, for example, of lines of black pixels and lines of white pixels, the lines running parallel to the horizontal scanning direction of the screen of the display device, it becomes possible to eliminate the difference between the density represented by a data value and the actually displayed density that occurs, for example, due to the horizontal scanning frequency of a raster scan type display device. The same effect can also be obtained if the pattern image is displayed as a stripe pattern image consisting of lines of black pixels and lines of non-black pixels, the lines running parallel to the horizontal scanning direction of the screen of the display device.

If, for example, the dot pattern image or the stripe pattern image, whichever is suitable, can be selected for display as the pattern image, the apparatus can be applied to a wide variety of display devices.

In a profile creation method for a display device according to the present invention, the pattern image and grayscale image are displayed on the display device, an input/output characteristic is obtained based on the display of the pattern image and grayscale image, and the profile of the display device is created based on the obtained input/output characteristic. Since the pattern image and grayscale image are displayed simultaneously on the display device; the profile of the display device can be created in a simple manner.

In this case, if the pattern image is displayed as an image consisting of first pixels of first luminance and second pixels of second luminance in prescribed proportions to provide prescribed luminance by an average luminance value taken over the first and second pixels, and the grayscale image is displayed as an image consisting of pixels of uniform luminance, the profile of the display device can be created in a simpler manner.

In a preferred mode, the pattern image is displayed as a dot pattern image consisting of black pixels and white pixels and the grayscale image as a grayscale pattern image containing a plurality of patches consisting of gray pixels with the gray scale varying in steps from one patch to the next; then, the patch having brightness closest to the brightness of the dot pattern image is selected from the grayscale pattern image, and the input/output characteristic of the display device is obtained based on the selected patch. In this way, the input/output characteristic of the display device for a gray color can be obtained easily, and a profile based on the input/output characteristic for the gray color can be created. The same effect can be obtained if the pattern image is displayed as a dot pattern image consisting, for example, of black pixels and non-black pixels.

In the profile creation step, the profile is created based on color gamut information as well as on the input/output characteristic. This enhances the accuracy of the created profile.

By holding color gamut information for a plurality of representative display devices, a profile can be created that matches the target display device.

Provisions may be made to modify the existing profile of the display device based, for example, on the obtained input/output characteristic. This enables quick and accurate creation of a customized profile.

If R, G, and B colors, for example, are sequentially selected as the color of the non-black pixels in the dot pattern image while sequentially presenting the grayscale image pattern of the same R, G, or B color as the selected color, the input/output characteristic for each of the R, G, and B colors can be obtained, thus making it possible to produce a profile with greater fidelity to the display device.

Further, if the input/output characteristic previously obtained for a predesignated color is employed, for example, for all or part of the input/output characteristics for the R, G, and B colors, the input/output characteristic can be obtained quickly, and as a result, the profile of the display device can be quickly created.

If the dot pattern image is presented, for example, as a checkerboard pattern image consisting of black pixels and non-black pixels, a profile with greater adaptability to a sequential scan type display, for example, can be created.

Furthermore, if the dot pattern image is presented, for example, as a dot pattern image consisting of black pixels and non-black pixels in proportions other than 1:1, the generation of moire or other artifacts is prevented, facilitating the measurement.

By employing the gamma characteristic as the input/output characteristic to be obtained, input/output characteristics applicable to almost all kinds of display devices can be calculated.

In this case, by calculating a plurality of input value versus output value relations based, for example, on the obtained gamma coefficient value, and by creating the profile of the display device by including therein the thus calculated input value versus output value relations, profiles applicable to almost all kinds of display devices can be created.

For example, by obtaining the input/output characteristic for gray color using a stripe pattern image consisting of lines of black pixels and lines of white pixels, a profile for a raster scan type display or the like can be created.

Further, by obtaining the input/output characteristic for an arbitrary color using a stripe pattern image consisting of lines of black pixels and lines of white pixels, for example, a profile for a raster scan type display or the like can be created.

In a profile creation apparatus for a display device according to the present invention, the pattern image and grayscale image are displayed on the display device, an input/output characteristic is obtained based on the display of the pattern image and grayscale image, and the profile of the display device is created based on the obtained input/output characteristic. Since the pattern image and grayscale image are displayed simultaneously on the display device, the profile of the display device can be created in a simple manner.

In this case, if the pattern image is displayed as an image consisting of first pixels of first luminance and second pixels of second luminance in prescribed proportions to provide prescribed luminance by an average luminance value taken over the first and second pixels, and the grayscale image is displayed as an image consisting of pixels of uniform luminance, the profile of the display device can be created in a simpler manner.

In a preferred mode, the pattern image is displayed as a dot pattern image consisting of black pixels and white pixels and the grayscale image as a grayscale pattern image containing a plurality of patches consisting of gray pixels with the gray scale varying in steps from one patch to the next; then, the patch having a brightness closest to the brightness of the dot pattern image is selected from the grayscale pattern image, and the input/output characteristic of the display device is obtained based on the selected patch. In this way, the input/output characteristic of the display device for gray color can be obtained easily, and a profile based on the input/output characteristic for the gray color can be created.

The same effect can be obtained if the pattern image is displayed as a dot pattern image consisting, for example, of black pixels and non-black pixels.

The profile creation means creates the profile based on color gamut information as well as on the input/output characteristic. This enhances the accuracy of the created profile.

By holding color gamut information for a plurality of representative display devices, a profile can be created that matches the target display device.

In this case, provisions may be made to modify the existing profile of the display device based, for example, on the obtained input/output characteristic. This enables quick and accurate creation of a customized profile.

If R, G, and B colors, for example, are sequentially selected as the color of the non-black pixels in the dot pattern image while sequentially presenting the grayscale image pattern of the same R, G, or B color as the selected color, the input/output characteristic for each of the R, G, and B colors can be obtained, thus making it possible to produce a profile with greater fidelity to the display device.

Further, if the input/output characteristic previously obtained for a predesignated color is employed, for example, for all or part of the input/output characteristics for the R, G, and B colors, the input/output characteristic can be obtained quickly, and as a result, the profile of the display device can be quickly created.

If the dot pattern image is presented, for example, as a checkerboard pattern image consisting of black pixels and non-black pixels, a profile with greater adaptability to a sequential scan type display, for example, can be created.

Furthermore, if the dot pattern image is presented, for example, as a dot pattern image consisting of black pixels and non-black pixels in proportions other than 1:1, the generation of moire or other artifacts is prevented, facilitating the measurement.

By employing the gamma characteristic as the input/output characteristic to be obtained, input/output characteristics applicable to almost all kinds of display devices can be calculated.

In this case, by calculating a plurality of input value versus output value relations based on the obtained gamma coefficient value, and by creating the profile of the display device by including therein the thus calculated input value versus output value relations, profiles applicable to almost all kinds of display devices can be created.

For example, by obtaining the input/output characteristic for gray color using a stripe pattern image consisting of lines of black pixels and lines of white pixels, a profile applicable, for example, to a raster scan type display or the like can be created.

Further, by obtaining the input/output characteristic for an arbitrary color using a stripe pattern image consisting of lines of black pixels and lines of white pixels, for example, a profile applicable, for example, to a raster scan type display or the like can be created.

In a calibration method for a display device according to the present invention, calibration data relating to a profile for a display device provided at second equipment is transmitted from first equipment to the second equipment via a network, and a calibration image and guidance based on the calibration data is displayed on the display device at the second equipment; thereafter, data relating to the profile of the display device is collected when an operation is performed in accordance with the guidance. In this way, the profile of the display device can be created easily based on the collected data. Text, pictorial symbols, voice, etc. can be included in the guidance. Here, the first equipment may be configured, for example, as a server, and the second equipment as a client.

In a preferred mode, a reference profile is held at the first equipment, and calibration data relating to the reference profile is transmitted to the second equipment; then, data relating to the profile is collected at the second equipment, and the collected data is transmitted as display calibration information to the server. Based on this display calibration information, the first equipment modifies and updates the reference profile and holds it as a new reference profile. Since the profile is modified based on the reference profile, an accurate, customized profile can be created in a simple manner.

In this case, the reference profile may be held at the second equipment, and the profile be modified at the first equipment.

Conversely, the reference profile may be held at the first equipment, and the profile be modified at the second equipment.

Alternatively, calibration data relating to the profile of the display device provided at the second equipment may be held at the first equipment, and data relating to the profile of the display device be collected at the second equipment based on the calibration data, thereby to modify the reference profile held at the second equipment.

In this case, provisions may be made to automatically incorporate the new modified reference profile into a profile created in compliance with an ICC profile in a color management system at the second equipment.

In another preferred mode, calibration data relating to the profile of the display device provided at the second equipment is transmitted from the first equipment to the second equipment via a network, and a calibration image and guidance based on this calibration data are displayed on the display device at the second equipment. When display adjusting means provided on the display device is operated, the setting of the display adjusting means is changed. Calibration of the display device can thus be done at the second equipment even when the calibration data is not held at the second equipment.

Preferably, data indicating the month, day, and year that the calibration data was sent to the second equipment is held at the first equipment, and when a predetermined period has elapsed from the calibration data transmission date, a notification reminding the second equipment of the arrival of time to calibrate the display device is sent to the second equipment so that the settings of the display device at the second equipment are periodically updated.

In a calibration apparatus for a display device according to the present invention, second equipment is connected to first equipment via a network, and the first equipment holds calibration data and transmits it to the second equipment. Display control means at the second equipment displays a calibration image and guidance based on the thus transmitted calibration data on the display device, and when an operation is performed in accordance with the guidance, data relating to the profile of the display device is modified by display calibration information collecting means at the second equipment. Adjustments relating to the profile can thus be made at the second equipment even when the calibration data is not held at the second equipment.

In a preferred mode, a reference profile is held at the first equipment, and calibration data relating to the reference profile is transmitted to the second equipment; then, data relating to the profile is collected at the second equipment, and the collected data is transmitted as display calibration information to the first equipment. Based on this display calibration information, the first equipment modifies and updates the reference profile and holds it as a new reference profile. Since the profile is modified based on the reference profile, an accurate, customized profile can be created in a simple manner.

In this case, the reference profile may be held at the second equipment, and the profile be modified at the first equipment.

Conversely, the reference profile may be held at the first equipment, and the profile be modified at the second equipment.

Of course, calibration data relating to the profile of the display device provided at the second equipment may be held at the first equipment, and data relating to the profile of the display device be collected at the second equipment based on the calibration data, thereby to modify the reference profile held at the second equipment.

In this case, provisions may be made to automatically incorporate the new modified reference profile into a profile created in compliance with an ICC profile in a color management system at the second equipment.

In another preferred mode, calibration data relating to the profile of the display device provided at the second equipment is transmitted from the first equipment to the second equipment via a network, and a calibration image and guidance based on this calibration data are displayed on the display device at the second equipment. When display adjusting means provided on the display device is operated, the setting of the display adjusting means is changed. Calibration of the display device can thus be done at the second equipment even when the calibration data is not held at the second equipment.

Preferably, data indicating the month, day, and year that the calibration data was sent to the second equipment is held at the first equipment, and when a predetermined period has elapsed from the calibration data transmission date, a notification reminding the second equipment of the arrival of time to calibrate the display device is sent to the second equipment so that the settings of the display device at the second equipment are periodically updated.

In this case, the transmission may be performed using electronic mail.

For example, the first equipment may be configured as a WWW server, and the display control means at the second equipment as a browser.

A recording medium according to the present invention records a program for implementing the steps of displaying pixels of first luminance and pixels of second luminance in prescribed proportions in a first region of a screen, and displaying a grayscale image consisting of pixels of uniform luminance in a second region of the screen. Accordingly, when the program is loaded into a computer, the color appearance of the screen, for example, can be adjusted using the computer.

Further, a recording medium recording a program for implementing the steps of displaying pixels of first luminance and pixels of second luminance in prescribed proportions in a first region of a screen of an apparatus, displaying in a second region of the screen a grayscale image consisting of a plurality of smaller regions each containing pixels of uniform luminance, the luminance varying from one smaller region to the next, determining which of the smaller regions has been selected from the grayscale image, and calculating an input/output characteristic of the apparatus in accordance with the selected smaller region. Accordingly, when the program is loaded into a computer, the input/output characteristic of the apparatus can be calculated using the computer.

BRIEF DESCRIPTION OF THE DRAWINGS

Further features and advantages of the present invention will be apparent from the following description with reference to the accompanying drawings, in which:

FIG. 37 is a diagram showing an example of calibration data in the form of an HTML source program;

FIG. 52 is a diagram showing a specific example of ICC profile format;

FIG. 54 is diagram showing an example of CIEXYZ values, etc.; and

DESCRIPTION OF THE PREFERRED EMBODIMENTS

Figure 1:
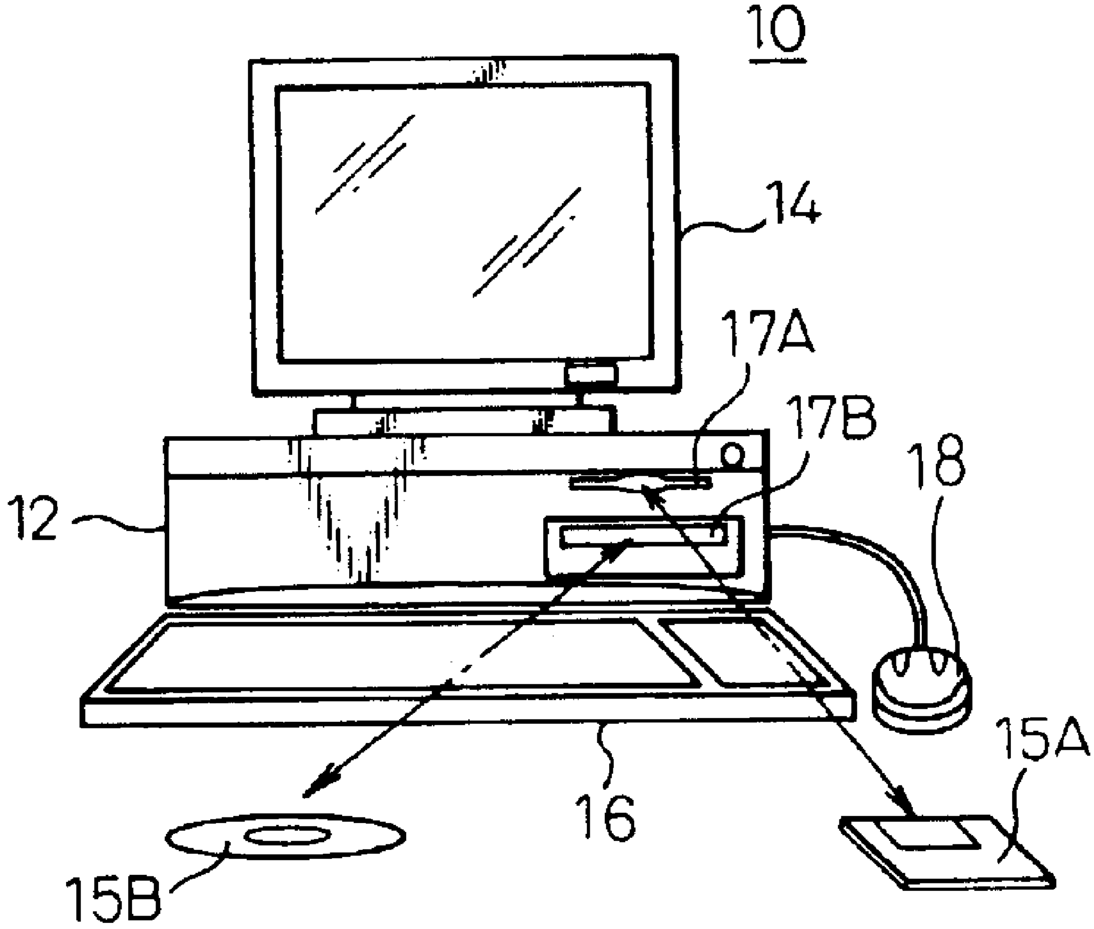
FIG. 1 is a diagram showing the configuration of a computer to which one embodiment of the present invention is applied.

Embodiments of the present invention will be described below. Throughout the description hereinafter given, like or corresponding parts are designated by like reference numerals.

FIG. 1 shows the configuration of a computer 10 as a user terminal to which the present invention is applied. As is well known, the computer 10 comprises a computer main unit 12 and a display,(display means) 14, keyboard 16, and mouse 18 attached to the main unit 12.

The computer main unit 12 contains, though not specifically shown here, a central processing unit (CPU) functioning as judging, calculating, and control means, a semiconductor memory device used to store control programs and application programs, a semiconductor memory device used to provide a work area, various other storage devices (holding means and storage means) such as a hard disk and other large-capacity auxiliary storage devices for storing image data, etc., input/output interfaces such as an AD converter and D/A converter, and various connecting interfaces providing connections with other devices.

The display device 14 such as a CRT display as an image output means, the keyboard 16 with cursor movement keys that functions as a data input means, selection means, or designating means, and a pointing device (input device, selection means) such as the mouse 18 are connected to the computer main unit 12 via the connecting interfaces.

Figure 2:
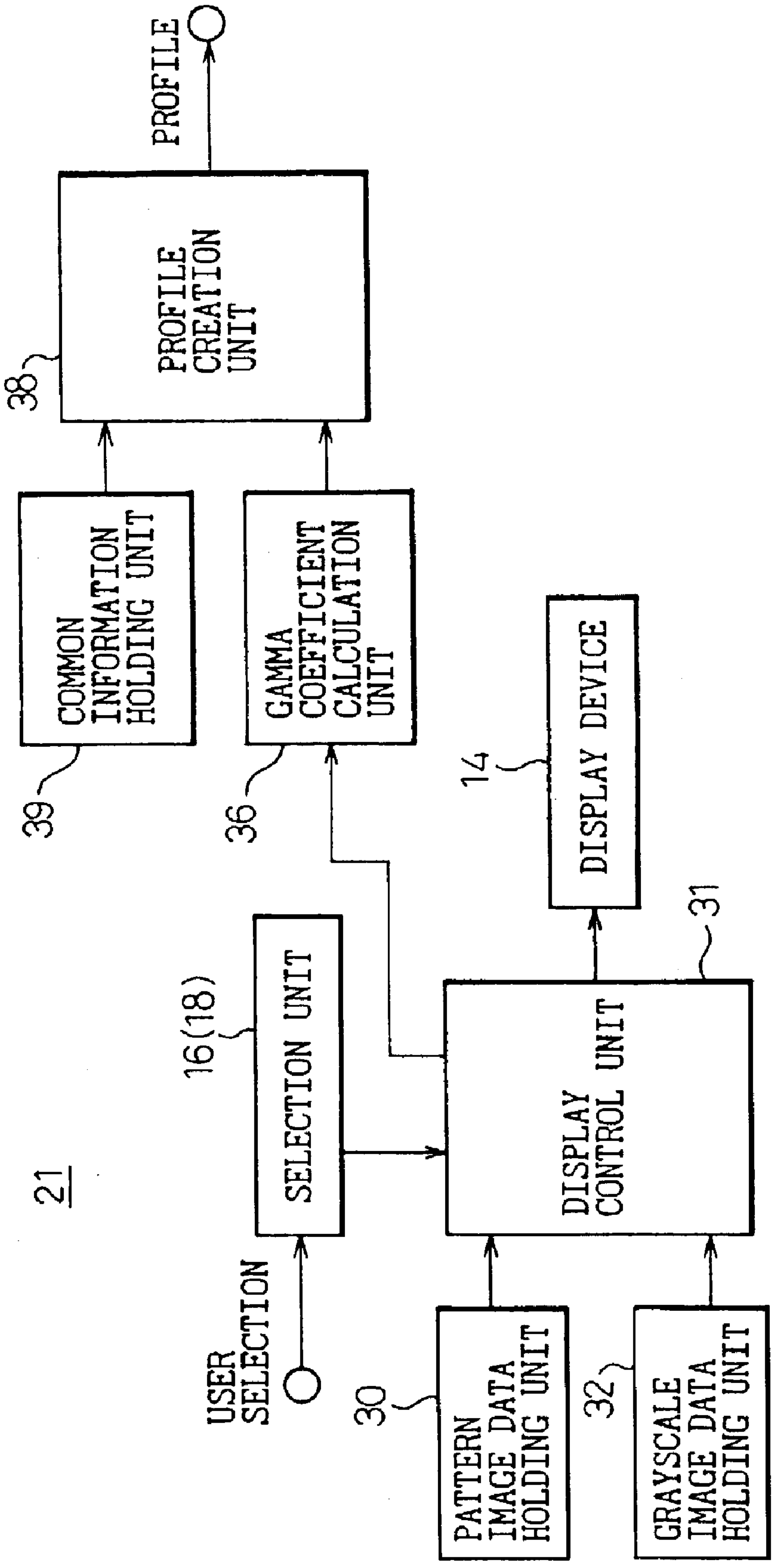
FIG. 2 is a block diagram showing the configuration of a profile creation apparatus according to one embodiment of the present invention, as applied to the computer of FIG. 1.

FIG. 2 shows a functional block diagram showing the configuration of a profile creation apparatus 21 according to one embodiment of the present invention, as applied to the computer 10 shown in FIG. 1. The constituent elements of the profile creation apparatus 21, other than the selection unit 16 (18) and display device 14, are means for implementing the functions carried out by the computer main unit 12 with software installed thereon. The software is recorded as a program on a recording medium such as a floppy disk 15A or CD-ROM 15B which is loaded into a floppy disk drive 17A or CD-ROM drive 17B in the computer 10 so that the program can be used by being installed, for example, on a hard disk or the like incorporated in the computer 10.

The profile creation apparatus 21 includes a pattern image data holding unit 30 which holds therein pattern image data representing a pattern image consisting of a plurality of colors, a grayscale image data holding unit 32 which holds therein grayscale image data consisting of a single color, and a display control unit 31 which reads out the pattern image data and grayscale image data from the pattern image data holding unit 30 and grayscale image data holding unit 32 and presents the pattern image and grayscale image simultaneously for display on the screen of the display device 14.

The profile creation apparatus 21 further includes the selection unit 16 (18) which, in accordance with user selection, selects a grayscale image patch of the brightness closest to the brightness of the pattern image displayed on the display device 14, a gamma coefficient calculation unit 36 (input/output characteristic calculation means) which obtains a gamma coefficient associated with the input/output characteristic of the display device 14 based on the selected patch, a common information holding unit 39 which stores information other than the gamma coefficient, that is, common information such as color gamut information and standard white information, and a profile creation unit 38 which creates a profile for the display device 14, for example, the ICC profile Ip (see examples of FIGS. 51 and 52), based on the gamma coefficient value calculated by the gamma coefficient calculation unit 36 and on the common information stored in the common information holding unit 39.

Next, a detailed explanation of the pattern image data and grayscale image data stored and held in the pattern image data holding unit 30 and grayscale image data holding unit

32 will be given in association with displays produced on the display device 14.

Figure 3:
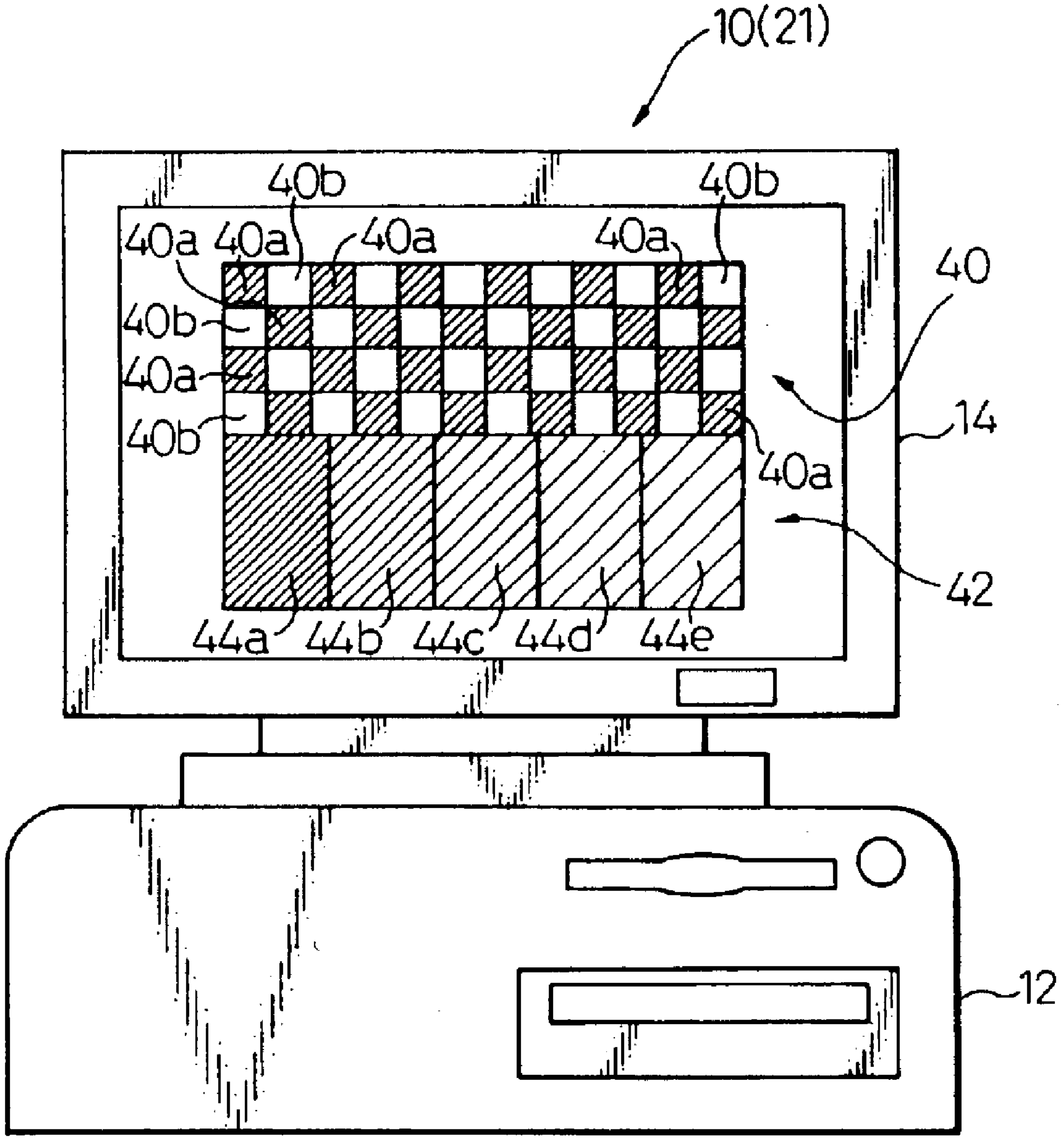
FIG. 3 is a diagram showing an example of a screen display produced on the display device of the profile creation apparatus.

As shown in FIG. 3, the pattern image 40 expressed by the pattern image data stored in the pattern image data holding unit 30 and the grayscale image 42 expressed by the grayscale image data stored in the grayscale image data holding unit 32 are presented via the display control unit 31 for display, separately, in different regions but simultaneously on the same screen of the display device 14 in the computer 10 (profile creation apparatus 21). In the region of the pattern image 40, first pixels 40*a* of first luminance (in the example of FIG. 3, sets of black pixels indicated by hatching) and second pixels 40*b* of second luminance (in the example of FIG. 3, sets of white pixels) are basically arranged in prescribed proportions (in the example FIG. 3, a checkerboard pattern consisting of black pixels and white pixels in proportions of 1:1) to provide prescribed luminance by an average luminance value taken over the first and second pixels (in the example of FIG. 3, a value intermediate between black and white). FIG. 3 shows an example of the pattern image 40 constructed from a combination of two colors, black and white, but checkerboard patterns of other color combinations may be used, as will be described later. Further, the number of colors need not be limited to two, but three, four, or more colors may be used; in other words, the pattern image may be constructed from a combination of first to n-th pixels having first to n-th luminance values.

On the other hand, the region of the grayscale image 42 consists of one or more uniform luminance regions (in the example of FIG. 3, five regions).

While the pattern image 40 consists of a plurality of colors, each uniform luminance region of the grayscale image 42 consists of a single color lying between the plurality of colors. In the example of FIG. 3, the pattern image 40 consists of the black pixels 40*a* and white pixels 40*b*, and each region of the grayscale image 42 is displayed in gray, a color considered to lie between the black and white colors.

The construction of the pattern image 40 and grayscale image 42 will be described in further detail.

First, as shown in FIG. 3, the grayscale image 42 is an image that contains a grayscale patch 44 consisting of a plurality of regions with the gray scale varying in steps from one region to the next (in the example of FIG. 3, a total of five grayscale patches, i.e., a grayscale patch 44*a* of gray closest in tone to black, a grayscale patch 44*b* of gray slightly lighter than the grayscale patch 44*a*, a grayscale patch 44*c* of gray slightly lighter than the grayscale patch 44*b*, a grayscale patch 44*d* of gray slightly lighter than the grayscale patch 44*c*, and a grayscale patch 44*e* of gray slightly lighter than the grayscale patch 44*d*, in decreasing order of hatching density). That is, the color of the grayscale patches 44*a* to 44*e* forming the grayscale image 42 is gray, a color lying between the black and white colors, as described above.

When the plurality of grayscale patches 44*a* to 44*e* are displayed simultaneously on the same screen, the grayscale image 42 is then called a grayscale pattern image. Instead of displaying the grayscale image 42 as a grayscale pattern image, the grayscale patches 44*a* to 44*e* of varying gray scale may be presented for display one at a time, switching from one patch to another. When displaying the image by switching, a grayscale patch 44 of uniform density (one of the grayscale patches 44*a* to 44*e*) is displayed in the entire region where the five grayscale patches 44*a* to 44*e* are displayed in FIG. 3. In either case, the pattern image 40 is displayed at all times, that is, simultaneously with the grayscale image 42.

Figure 4:
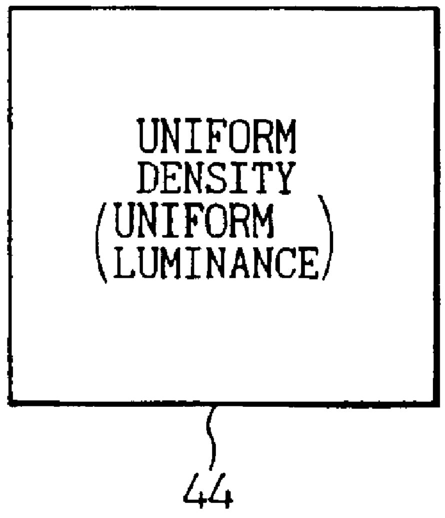
FIG. 4 is a diagram for explaining a grayscale image.

In FIG. 3, the grayscale patches 44*a* to 44*e* are shown by hatching to indicate varying tonal densities, but in actuality, each of the grayscale patches 44 (44*a* to 44*e*) forming the grayscale pattern image 42 is displayed as an image consisting of a single color of uniform density (in the illustrated example, uniform luminance), as schematically shown in FIG. 4, and the density (luminance) of the grayscale patch 44 can be varied by varying input image data values (RGB values).

For example, in the computer 10, the color of an image is expressed by R, G, and B colors each represented by 8-bit data. Therefore, in the case of the grayscale patch 44 of gray color, by varying the R, G, and B image data values such that (R, G, B)=(0, 0, 0), (1, 1, 1), (2, 2, 2), . . . , (255, 255, 255), the color of the grayscale patch 44 to be displayed can be varied from black with the RGB image data value (R, G, B)=(0, 0, 0) to white with the RGB image data value (R, G, B)=(255, 255, 255) by way of gray of intermediate shades with the RGB image data value (R, G, B)=(x, x, x).

In the display 14, each of the R (red), G (green), and B (blue) colors forms one pixel, as is well known, but in the present embodiment, it is assumed that one RGB set forms one pixel to facilitate the understanding of the invention. It will be recognized, however, that the present invention is also applicable if it is assumed that each of the R, G, and B colors forms one pixel.

Figure 5:
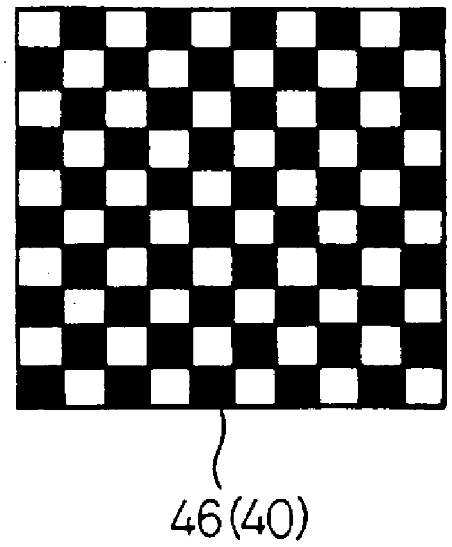
FIG. 5 is a diagram for explaining a pattern image.

Next, a description will be given of the pattern image 40. As shown in FIG. 5, the pattern image 40 is a dot pattern image 46 consisting of pixels of two colors, for example, black color pixels (also called black pixels) and non-black color pixels, for example, white color pixels (also called white pixels); more specifically, the image consists of white pixels, i.e., pixel dots with the RGB image data value (R, G, B)=(255, 255, 255), and black pixels, i.e., pixel dots with the RGB image data value (R, G, B)=(0, 0, 0).

The dot pattern image 46 consisting of such white pixels and black pixels is displayed on the display device 14, as shown in FIG. 3, simultaneously with the grayscale pattern image 42 containing the grayscale patches 44 of varying gray scale levels. As earlier noted, the grayscale patches 44 forming the grayscale pattern image 42 may be presented for display one at a time.

The color used is not limited to gray, but other colors may be used for the pattern image 40 and grayscale image 42. For example, in the case of red color, the color of the grayscale patches 44 in the grayscale pattern image 42 can be varied from black to red by varying the R, G, and B image data values such that (R, G, B)=(0, 0, 0), (1, 0, 0), (2, 0, 0), . . . , (255, 0, 0). In this case, the dot pattern image 46 should be presented as an image consisting of black pixels, i.e., pixel dots with the RGB image data value (R, G, B)=(0, 0, 0), and red color pixels (also called red pixels) as non-black pixels, i.e., pixel dots with the RGB image data value (R, G, B)=(255, 0, 0).

To facilitate understanding, the following description deals primarily with examples of the pattern image 40 consisting of white pixels and black pixels and its corresponding grayscale image 42, but the same description is equally applicable for other color combinations such as red and black, blue and black, green and black, red and white, blue and white, and green and white.

The dot pattern arrangement in the dot pattern image 46, for example, the dot ratio, can be varied as desired by varying the proportions of black pixels versus non-black pixels.

Figure 6:
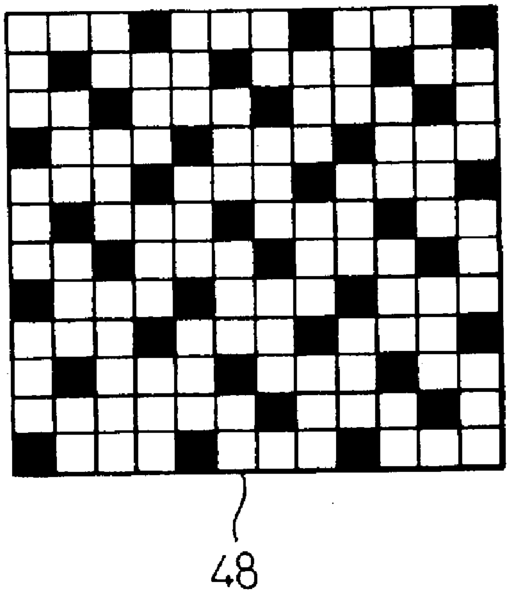
FIG. 6 is a diagram for explaining another example of the pattern image.

While the dot pattern image 46 shown in FIG. 5 is a so-called checkerboard pattern image with a white/black dot ratio of 1:1, the dot pattern image 48 shown in FIG. 6 has a white/black dot ratio of 3:1 with white pixels and black pixels contained in proportions of 3:1. In this way, the density of the dot pattern image, i.e., the pattern image 40, can be varied. The size of each dot forming the dot pattern image 46 is chosen to be small enough that the image appears as if the entire image were a halftone image when the screen of the display 14 was viewed straight-on from a suitable distance.

By varying the dot ratio in the case of the pattern image 40 and RGB data values in the case of the grayscale image 42, as described above, the image density (luminance) can be varied as desired.

Next, a description will be given of how gamma can be measured and calculated by the gamma coefficient calculation unit 36 based on the pattern image 40 and grayscale image 42 displayed on the display device 14. Gamma characteristic characterizes a CRT display, but the method hereinafter described can be applied not only to the CRT display but also for the measurement and calculation of the input/output characteristics (electro-optical conversion characteristics) of various other display devices such as liquid crystal display devices and plasma display devices.

For simplicity, the following description is given by ignoring the offset value and cutoff voltage of the display device 14 as negligible values. Denoting the output of the display device 14, i.e., the displayed luminance, as B(y), and the input to the display device 14, i.e., the input voltage, as E(x), the displayed luminance B is given in relation to the input voltage E by the following equation (6). In any equation given hereinafter, including equation (6), the symbol "$\hat{0}$" is used to represent a power; for example, $E\hat{0}\gamma$ means E raised to the power γ.

$$B=E\hat{0}\gamma \tag{6}$$

Figure 55:
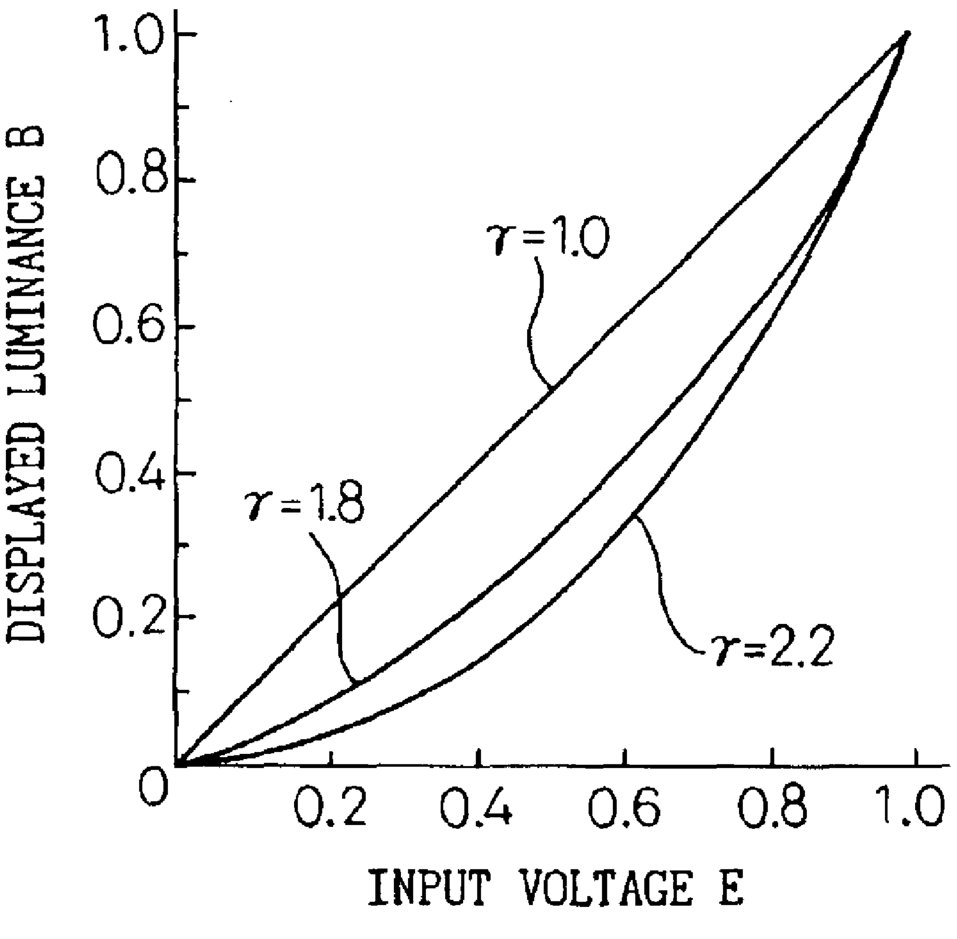
FIG. 55 is a graph for explaining the gamma characteristic.

The value of γ in this equation is called the gamma coefficient value, and the input/output characteristic defined by γ is called the gamma characteristic (see FIG. 55). If the input voltage E and displayed luminance B at any one point, except the points at (E, B)=(0, 0) and (1, 1), on the graph shown in FIG. 55 are known, the gamma coefficient value can be obtained using the above equation (1), etc.

Figure 7:
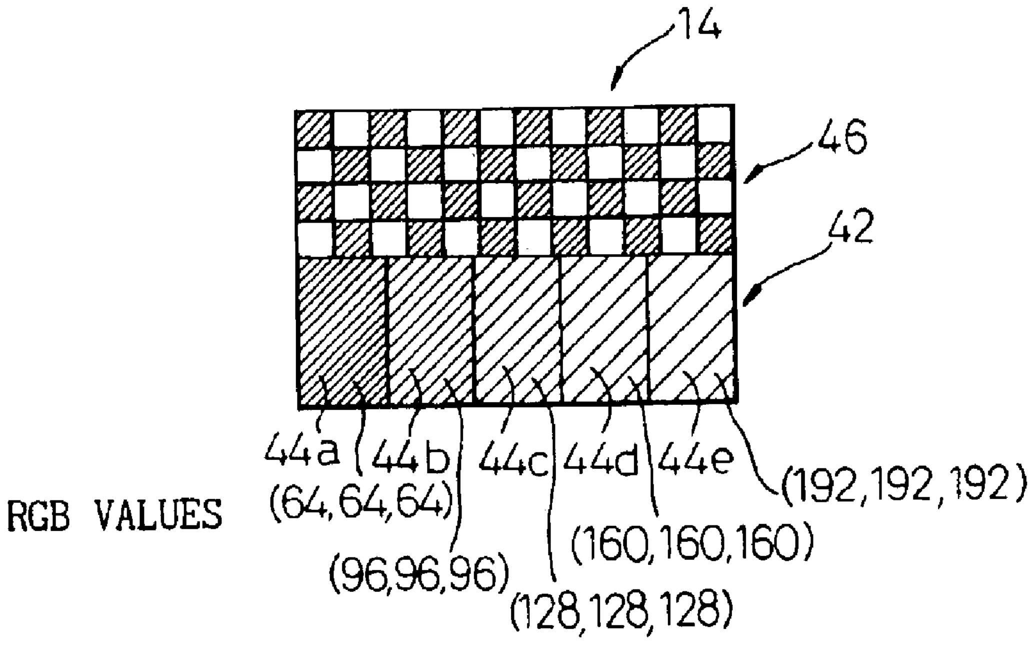
FIG. 7 is a diagram showing an example of simultaneous display of a dot pattern image and grayscale pattern image.

Here, suppose that when the checkerboard dot pattern image 46 and five-level grayscale pattern image 42 were simultaneously displayed on the display device 14, as shown in FIG. 7, the grayscale patch 44*e* appeared the same in color (luminance) as the dot pattern image 46. The displayed luminance B(yi) of the checkerboard dot pattern image 46 with a white/black ratio of 1:1 is yi=0.5. If, at this time, the RGB value of the tonal path 44 is RGB=(192, 192, 192), as shown in FIG. 7, then the input value E(xi) is xi=192/255=0.753. This means that the point with (input, output)=(E, B)=(xi, yi)=(0.753, 0.5) has been measured (determined) as one point on the gamma characteristic curve of the display device 14.

Then, in the gamma coefficient calculation unit 36, when the three points with (input, output)=(0, 0), (0.753, 0.5), and (1.0, 1.0) are substituted in equation (1) to solve for γ, γ=2.45 can be derived as the gamma coefficient value.

In this way, by simultaneously displaying the dot pattern image 46 and grayscale pattern image 42 for comparison on the screen of the display device 14 to be measured, or by sequentially displaying the grayscale patches 44*a* to 44*e* for comparison with the dot pattern image 46 displayed on the screen, one of the grayscale patches 44*a* to 44*e* that appears the same in color as the dot pattern image 46 is determined, and the gamma coefficient value can be derived using the known RGB value (see FIG. 7) of the thus determined grayscale patch 44. By further comparing the grayscale pattern image 42 (or each grayscale patch 44) with the dot pattern image 48 of a different luminance value such as shown in FIG. 6, a plurality of points can be obtained on the gamma characteristic curve; in this way, a gamma coefficient value (gamma characteristic) of higher accuracy can be obtained.

As previously stated, for the dot pattern image 46 (the pattern image 40) and its corresponding grayscale pattern image 42, not only the combination of white pixels and black pixels but other color combinations, such as red and black, blue and black, green and black, red and white, blue and white, and green and white, can also be used.

Figure 8:
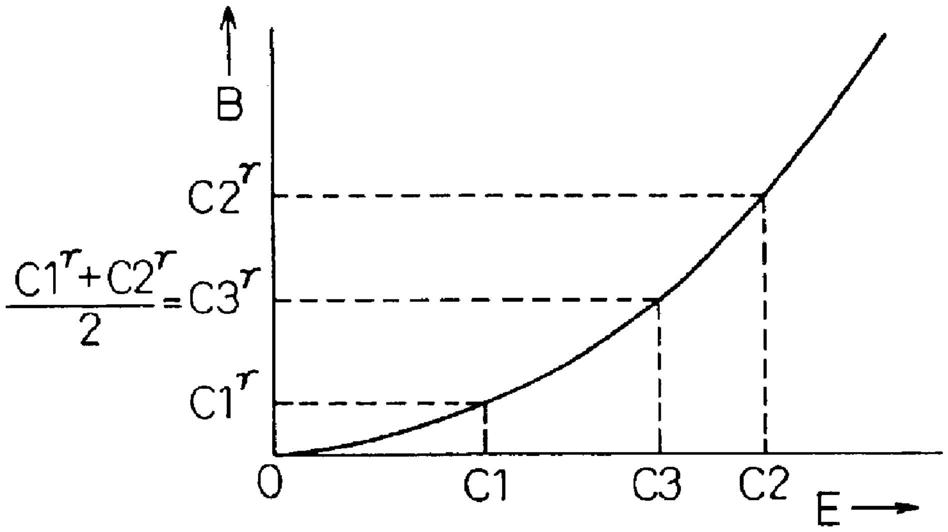
FIG. 8 is a diagram for explaining how a gamma characteristic is calculated for an arbitrary color.

For example, as shown in FIG. 8, when two colors each having the same image data value for R, G, and B are displayed in the form of a gray dot pattern image 46 with (R, G, B)=K1(C1, C1, C1) and K2(C2, C2, C2) (C1 and C2 are different values), the luminance of the dot pattern image 46 is given by $(C1\hat{0}\gamma+C2\hat{0}\gamma)/2$.

If this dot pattern image 46 appears the same in color as a gray grayscale patch 44 with an RGB image data value of (R, G, B)=K3(C3, C3, C3), then the relation $(C1\hat{0}\gamma+C2\hat{0}\gamma)/2=C3\hat{0}\gamma$ holds. From this equation, the gamma coefficient value can be derived.

Accordingly, (R, G, B)=K1(C1, 0, 0), K2 (C2, 0, 0), and K3(C3, 0, 0) should be used as the RGB image data values to obtain the gamma coefficient value for red, (R, G, B)=K1(0, C1, 0), K2 (0, C2, 0), and K3(0, C3, 0) should be used as the RGB image data values to obtain the gamma coefficient value for green, and (R, G, B)=K1(0, 0, C1), K2(0, 0, C2), and K3(0, 0, C3) should be used as the RGB image data values to obtain the gamma coefficient value for blue.

In the above example, the offset value and cutoff voltage of the display device 14 have been ignored as negligible values when obtaining the gamma coefficient value, but depending on the type of display device 14, there can occur a situation where a profile with high accuracy cannot be created if these values are ignored. In such cases, the gamma coefficient value must be calculated using an equation that takes the offset value and cutoff voltage into account.

Here, denoting the offset values for R, G, and B as Kor, Kog, and Kob, and the cutoff voltages as Ro, Go, and Bo, respectively, the outputs of R, G, and B, denoted Er, Eg, and Eb (in FIG. 55, letter B was used to denote displayed luminance, but to avoid confusion with B in RGB, letter E is used here) can be expressed by the following equations (7), (8), and (9), respectively.

$$Er=(R-Ro)\hat{0}\gamma R+Kor \tag{7}$$

$$Eg=(G-Go)\hat{0}\gamma G+Kog \tag{8}$$

$$Eb=(B-Bo)\hat{0}\gamma B+Kob \tag{9}$$

where $\hat{0}\gamma R$, $\hat{0}\gamma G$, and ^^γB are the gamma coefficient values for R, G, and B, respectively. The cutoff voltages Ro, Go, and Bo represent the input value (RGB value) at which the output luminance E begins to change when the input RGB value is applied to the display device under measurement.

Figure 9:
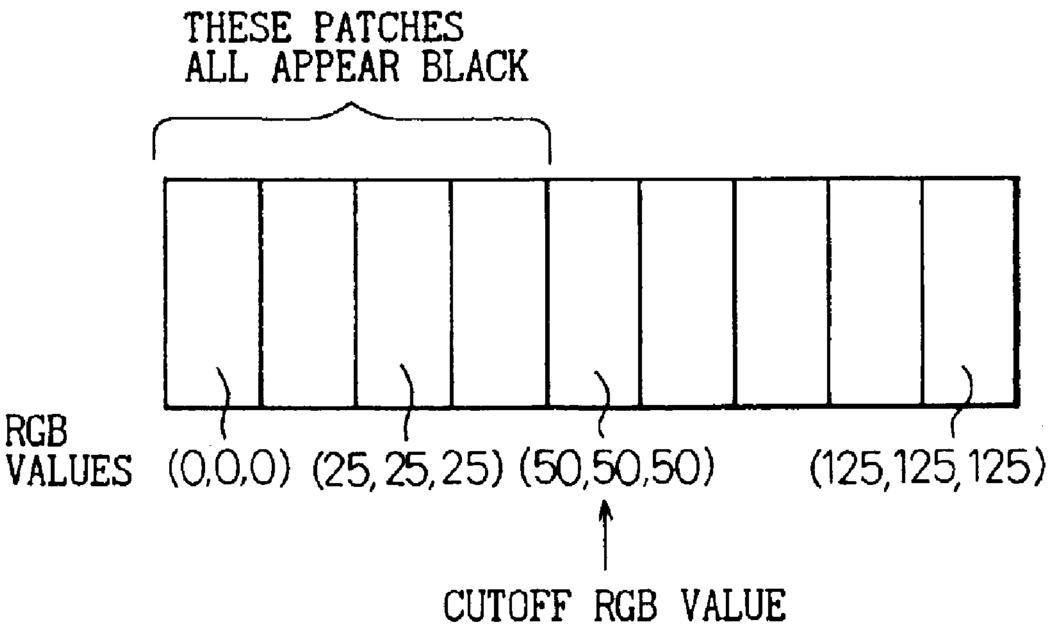
FIG. 9 is a diagram for explaining the relationship between grayscale patches and RGB values.

More specifically, when a plurality of grayscale patches with different RGB values are arranged in increasing order of the RGB value and displayed with the blackest patch at the leftmost end as shown in FIG. 9 (in the example of FIG.

9, nine grayscale patches are displayed), the RGB value at the point where color appears to change is the cutoff RGB value, which is (R, G, B)=(50, 50, 50) in the example of FIG. 9. In the example of FIG. 9, the four gtayscale patches at the left all appear black, as shown in the figure.

As for the offset value, the screen of the display device 14 when power is cut off is compared with the screen when a black image (RGB value is (RGB)=(0, 0, 0)) is displayed, and if the difference is not distinguishable, the offset value can be assumed to be zero and be ignored. If the difference is distinguishable, brightness or contrast should be adjusted on the display device 14, before starting the measurement, to vary the brightness or contrast setting so that the offset value can be ignored. By making measurements on the display device 14 in this condition, the characteristics of the display device 14 can be measured under good conditions where there is no need to consider the offset value.

Figure 10:
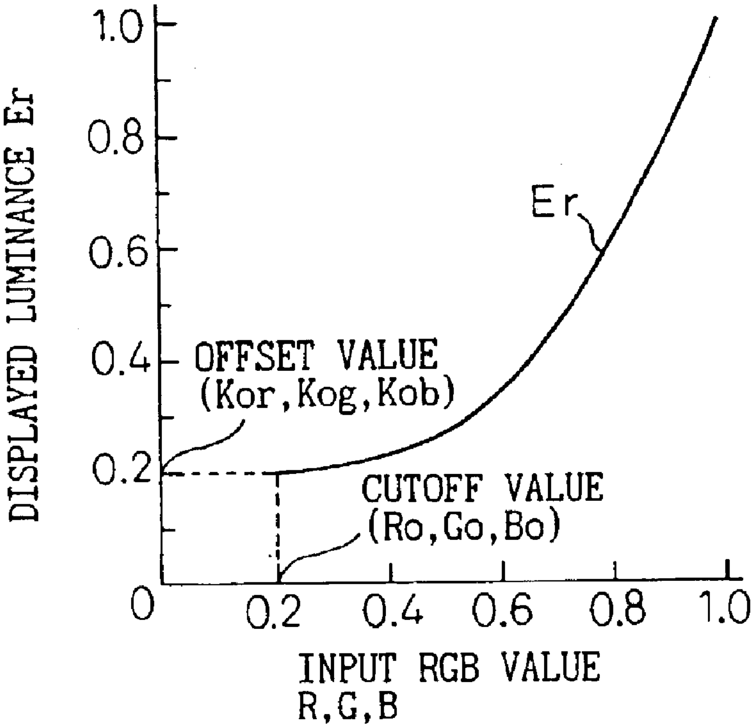
FIG. 10 is a diagram for explaining gamma characteristic offset and cutoff voltage.

FIG. 10 shows the offset values Kor, Kog, and Kob and cutoff voltages (cutoff values) Ro, Go, and Bo in relation to the gamma characteristic. When the display is successfully adjusted to a point where the offset values Kor, Kog, and Kob can be ignored, the offset values Kor, Kog, and Kob become zero, i.e., Kor=Kog=Kob=0.

Figure 11:
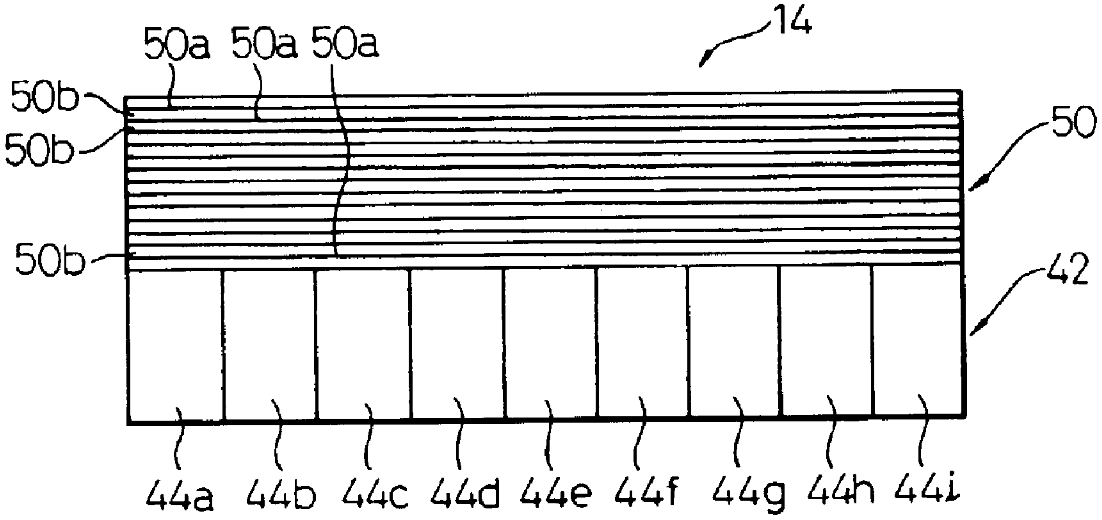
FIG. 11 is a diagram showing an example of simultaneous display of a stripe pattern image and grayscale pattern image.

In the above embodiment, the pattern image data stored in the pattern image data holding unit 30 has been described as being image data representing the checkerboard dot pattern image 46 (see FIG. 5) with a black/non-black pixel ratio of 1:1 or pattern image data representing the dot pattern image 48 (see FIG. 6) consisting of black pixels and non-black pixels in proportions other than 1:1. However, depending on the type of display device 14, there are cases where a gamma coefficient value with higher accuracy can be obtained if a stripe pattern image 50 is used that consists of lines 50*a* of black pixels and lines 50*b* of non-black pixels running parallel to the horizontal scanning direction of the display device 14, as schematically shown in FIG. 11 (in the example of FIG. 11, the black pixel lines 50*a* are equal in thickness to the non-black pixel lines 50*b* (in this example, white lines), and the ratio between the black pixels and white pixels is 1:1). In FIG. 11, the grayscale pattern image 42 is displayed as an image consisting of a plurality of grayscale patches 44 (44*a* to 44*i*) like the one shown in FIG. 9.

Generally, in a raster scan display device such as a CRT display, as the horizontal scanning frequency increases, the possibility that the input RGB value may not match the display RGB value increases in the case of the dot pattern image 46 or 48; accordingly, the gamma coefficient value can be measured and calculated with higher accuracy if the stripe pattern image 50 shown in FIG. 11 is used in place of the dot pattern image 46 or 48.

Figure 12:
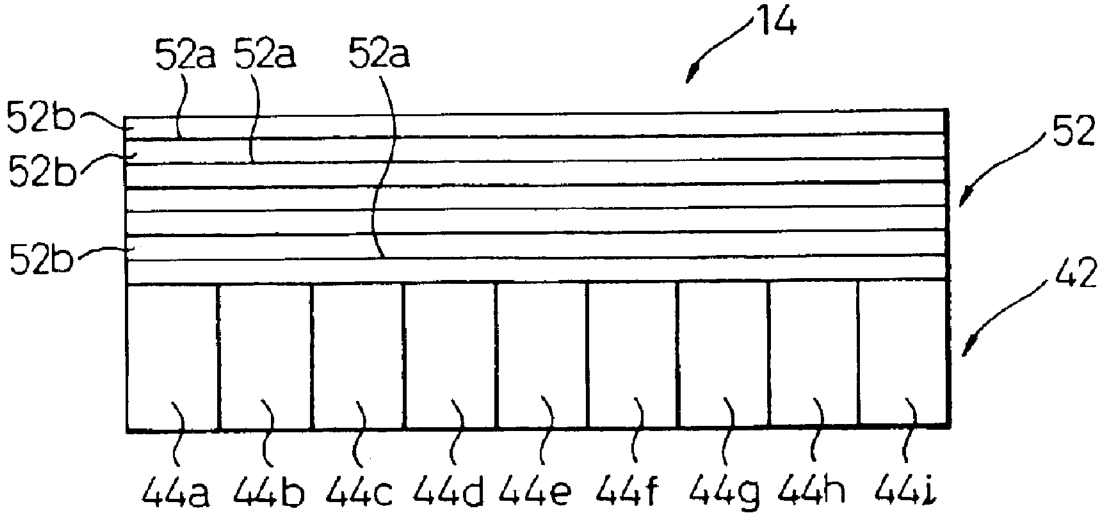
FIG. 12 is a diagram showing an example of simultaneous display of a stripe pattern image, with its white line/black line ratio changed, and grayscale pattern image.

In this case also, the accuracy of the gamma coefficient value can be enhanced by making measurements using a stripe pattern image 52 consisting of black pixel lines 52*a* and non-black pixel lines 52*b* with black pixels and white pixels contained in proportions other than 1:1, as shown in FIG. 12.

In contrast, in a sequential scan display device such as a liquid crystal display device or a plasma display device, the input and display RGB values are generally in good agreement compared with the CRT display; therefore, in most cases it is preferable to use the dot pattern image 46, etc.

For example, in a liquid crystal display device or a plasma display device, since the gamma coefficient value is close to 1.0 compared with the CRT display or the like, the dot pattern image 46, consisting of black pixels ((R, G, B)=(0, 0, 0)) and white pixels ((R, G, B)=(255, 255, 255)), appears close in color to the grayscale patch 44 of the intermediate gray color ((R, G, B)=(128, 128, 128)).

Accordingly, if the pattern image data representing the dot pattern images 46 and 48 and the pattern image data representing the stripe pattern images 50 and 52 are both stored in the pattern image data holding unit 30 with provisions made to selectively supply the pattern image data to the display device 14 through the selection unit 16 (18) which also functions as a pattern image selection means, it becomes possible to supply optimum pattern image data to the display device 14, whether it is a CRT display, a liquid crystal display device, or a plasma display device.

Figure 13:
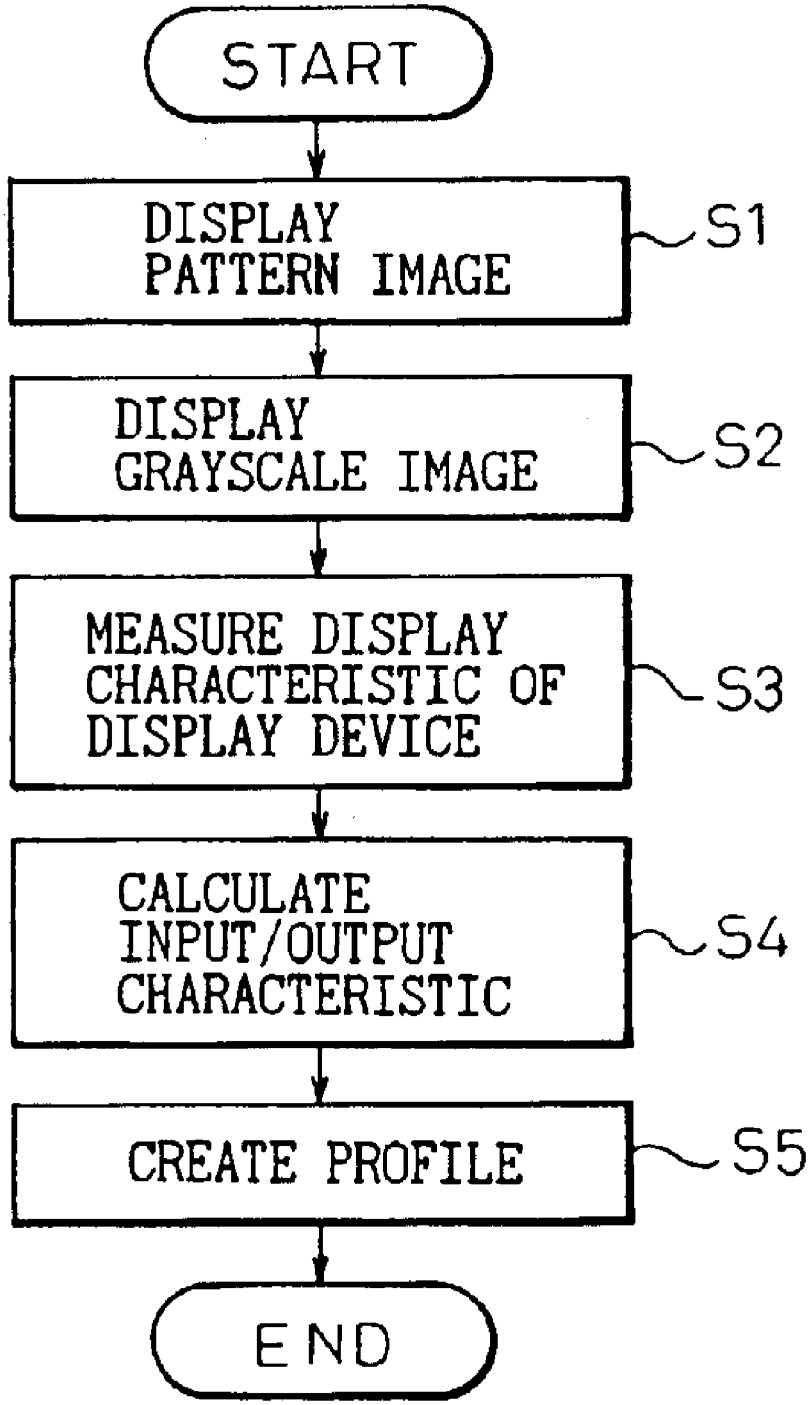
FIG. 13 is a flowchart for explaining the operation of the profile creation apparatus of FIG. 2.

Next, the operation of the profile creation apparatus 21 of the embodiment shown in FIG. 2 will be described with reference to the flowchart of FIG. 13.

First, the display control unit 31 reads out the pattern image data from the pattern image holding unit 30 and presents the pattern image 40, represented by the pattern image data, for display on the display device 14 (step S1), and also reads out the grayscale image data from the pattern image holding unit 30 and presents the grayscale image 42, represented by the grayscale image data, for display (step S2).

At this time, while keeping the pattern image 40 displayed on the screen, either the grayscale image 42 is displayed by sequentially presenting the grayscale patches 44 of varying tonal densities, or the grayscale pattern image 42 consisting of a plurality of grayscale patches 44 of varying tonal densities is displayed; in this condition, the grayscale patch 44 that appears the same in color (brightness) as the pattern image 40 is determined and measured (step S3). This determination can be made with high accuracy by using a specialized measuring instrument, but since the measurement is made through a comparison, the determination can also be made with fairly high accuracy by the human eye. In other words, according to the present invention, the grayscale patch that definitely appears the same to the human eye can be determined.

Using the selection unit 16 (18) such as the keyboard 16 or the mouse 18, the mouse cursor, not shown, is pointed at the grayscale patch 44 that appears the same in color, and the mouse 18 is clicked on it. In this way, the determination can be made with high accuracy without using a specialized measuring instrument.

When the result of the determination and selection made by operating the selection unit 16 (18) is fed back to the display control unit 31, the RGB value of the grayscale patch 44 determined to be the same in color (brightness) as the pattern image 40 is supplied from the display control unit 31 to the gamma coefficient calculation unit 36. The gamma coefficient calculation unit 36 obtains from the RGB value a coordinate point on the gamma characteristic curve, as previously described, and calculates from the obtained coordinate point the gamma coefficient characteristic as the input/output characteristic (step S4).

Next, based on the thus obtained gamma coefficient value, an ICC profile Ip (see FIG. 52) is created by the profile creation unit 38 (step S5).

As explained with reference to FIG. 52, the ICC profile Ip contains white color information and color gamut information as well as the gamma characteristic. However, unlike the gamma characteristic, the white color and color gamut of a display device 14 do not vary substantially among display devices 14 of the same kind and the same model; therefore, a profile having adequate precision can be created by using the white color and color gamut information of a reference display device without strictly measuring the white color and color gamut of each individual display device 14. In view of this, in the profile creation apparatus 21 of FIG. 2, reference white color information and reference color gamut information are stored in advance as common information in the common information holding unit 39. The profile creation unit 38 can thus create the ICC profile Ip by using the measured gamma coefficient value unique to the display device 14 and the common information such as the white color information and color gamut information common to the display devices 14 of the same model.

The following program is recorded on a recording medium such as the floppy disk 15A or CD-ROM 15B shown in FIG. 1. Referring, for example, to FIG. 3, the program contains instructions for executing the step of displaying the pixels 40*a* of a first luminance and pixels 40*b* of a second luminance in prescribed proportions in a first region of the screen (the region of the pattern image 40) (step S1) and the step of displaying the grayscale image 42, consisting of pixels of uniform luminance, in a second region of the screen (the region of the grayscale image 42) (step S2). By loading this program into the computer 10, the color appearance of the screen of the display device 14, for example, can be adjusted using the computer 10.

Further, a recording medium such as the floppy disk 15A or CD-ROM 15B records a program for executing the step of displaying the pixels 40*a* of first luminance and pixels 40*b* of second luminance in prescribed proportions in a first region (for example, the region of the pattern image 40) of the screen of the display device 14 (see FIG. 3) (step S1), the step of displaying in a second region of the screen (for example, the region of the grayscale image 42) the grayscale image 42 consisting of a plurality of smaller regions (for example, the grayscale patches 44*a* to 44*e*) each containing pixels of uniform luminance, the luminance being different for each smaller region (for each of the grayscale patches 44*a* to 44*e*) (step S2), the step of determining which smaller region has been selected from among the smaller regions 44*a* to 44*e* of the grayscale image 42 (step S3), and the step of calculating the input/output characteristic of the display device 14 in accordance with the selected smaller region (step S4). By loading this program into the computer 10, the gamma coefficient value as the input/output characteristic of the display device (the display device 14 of the computer 10) can be calculated using the computer 10. A program for executing the step of creating the ICC profile Ip may also be recorded on the recording medium.

Figure 14:
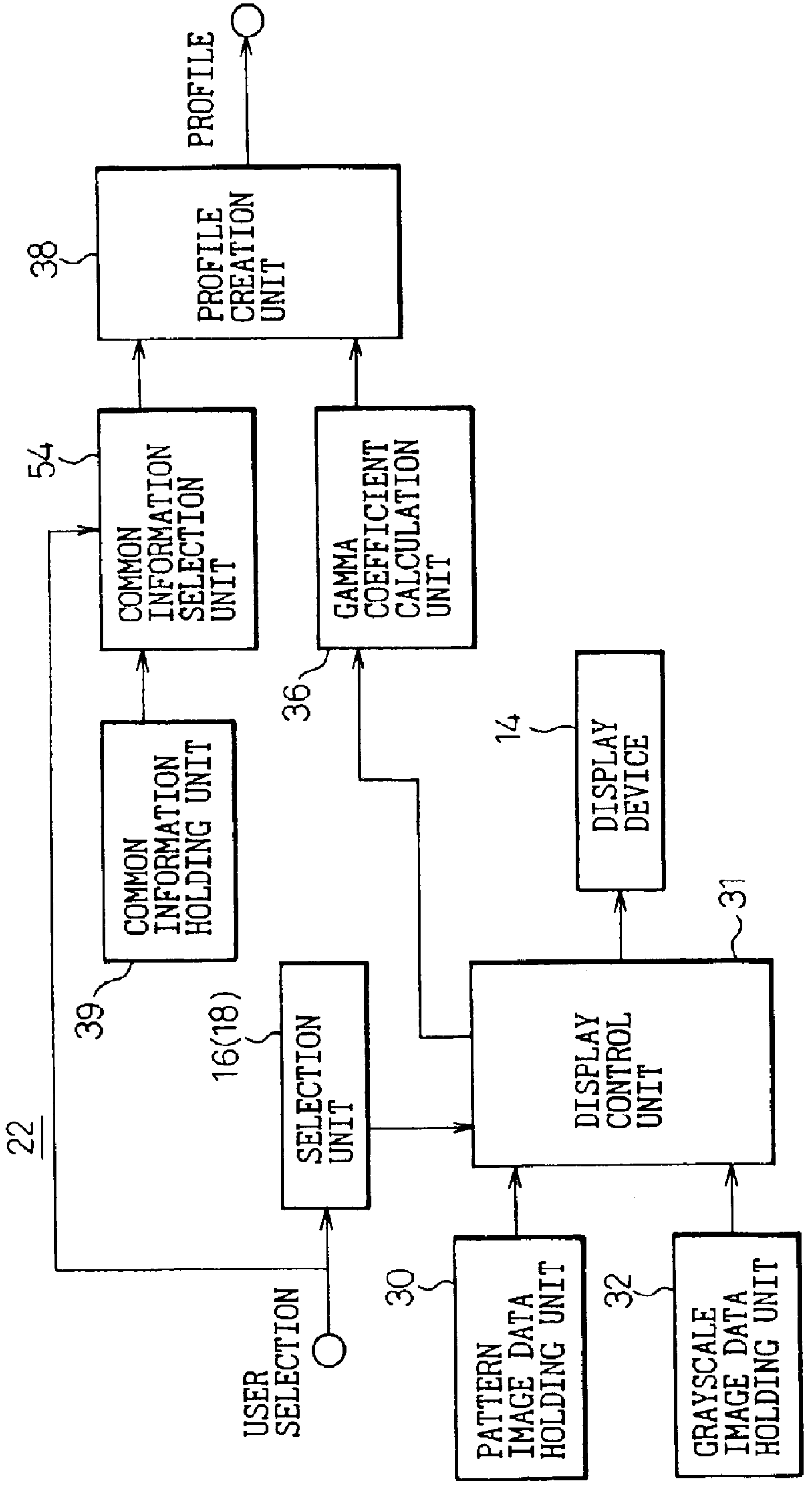
FIG. 14 is a block diagram showing the configuration of a profile creation apparatus according to another embodiment of the present invention.

FIG. 14 shows the configuration of a profile creation apparatus 22 according to another embodiment of the present invention.

The profile creation apparatus 22 includes a common information selection unit 54 which is interposed between the common information holding unit 39 and the profile creation unit 38. The common information holding unit 39 holds therein reference white color information and reference color gamut information for a plurality of representative display devices, for example, display devices classified by manufacturer. The user can select the common information corresponding to the type of his display device 14 via the common information selection unit 54.

Rather than having the user make the selection, provisions may be made so that the OS or the profile creation apparatus 22 itself makes the selection. For example, in the computer 10 in which an OS such as Windows 95 is installed, the display device 14 sends ID information to identify itself to the OS. Though not shown here, the computer 10 (the profile creation apparatus 22) can be configured to automatically respond to the ID information and selects, via the common information selection unit 54, the common information that best matches the ID information originating display unit 14 from among the information held in the common information holding unit 39.

As earlier described, under PC environments, color management systems using ICC profiles Ip have begun to be used, and manufacturers are selling display devices with their ICC profiles Ip included with them or attached to the OS. These existing ICC profiles Ip do not always match every individual user's display device 14 but are considered to have a certain level of precision.

One possible approach here is to produce a customized ICC profile Ip for the display device 14 by modifying an existing ICC profile, rather than creating an ICC profile Ip.

Figure 15:
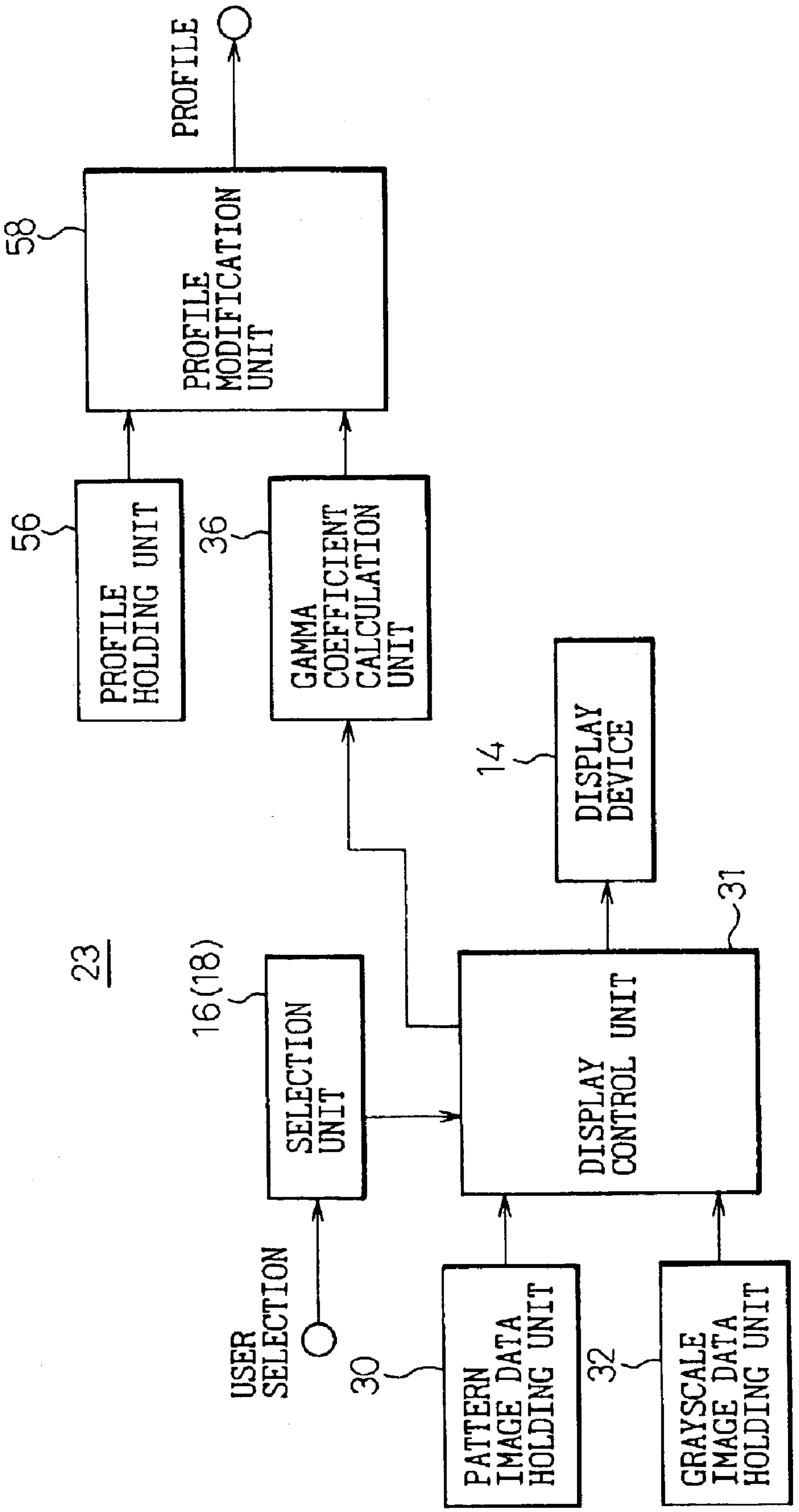
FIG. 15 is a block diagram showing the configuration of a profile creation apparatus according to still another embodiment of the present invention.

FIG. 15 shows the configuration of a profile creation apparatus 23 in accordance with an embodiment in which a customized ICC profile Ip is produced by modifying an existing ICC profile Ip. The profile creation apparatus 23 differs from the profile creation apparatus 22 of FIG. 14 in that the profile creation unit 38 is replaced by a profile modification unit 58, and in that a profile holding unit 56 holding therein existing ICC profiles Ip is connected to the profile modification unit 58.

Figure 16:
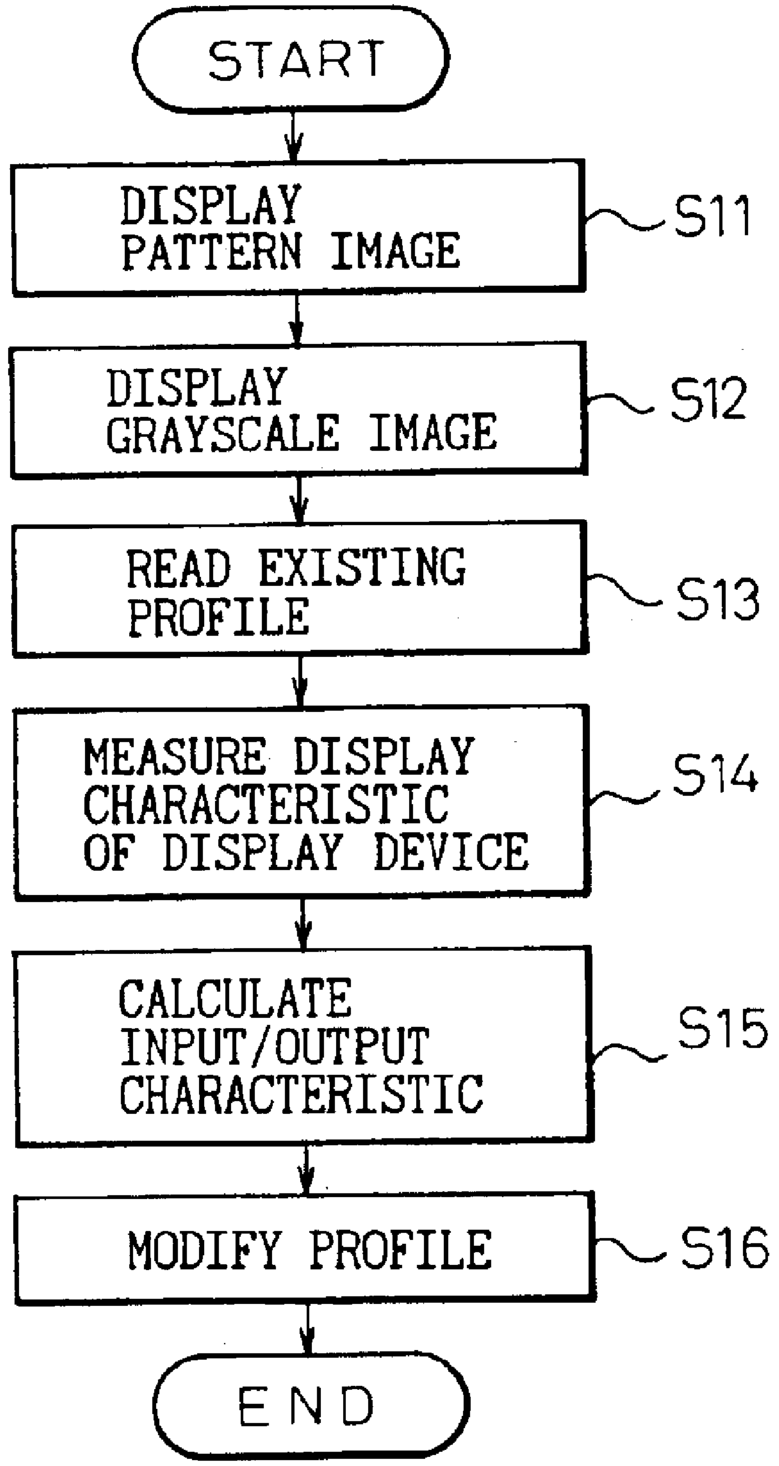
FIG. 16 is a flowchart for explaining the operation of the profile creation apparatus of FIG. 15.

The operation of the profile creation apparatus 23 will be described with reference to the flowchart of FIG. 16.

First, the display control unit 31 presents the pattern image 40 for display on the display device 14 (step S11), and also presents the grayscale image 42 for display (step S12). The profile modification unit 58 reads out an existing ICC profile Ip from the profile holding unit 56 (step S13).

The display control unit 31 measures display characteristics (step S14), and the gamma coefficient calculation unit 36 calculates the gamma coefficient value based on the measured display characteristics (step S15).

The profile modification unit 58 alters the contents of gamma characteristic information (the contents of the rTRC tag, gTRC tag, and bTRC tag, etc.) in the existing ICC profile Ip, but the contents of other information (rXYZ, gXYZ, bXYZ) are not altered and the existing values are used without modification. In this way, the profile modification unit 58 produces a customized ICC profile Ip by modifying the existing ICC profile Ip (step S16).

Using an existing ICC profile Ip, it becomes possible to create an ICC profile Ip with higher accuracy. It should, however, be noted that the display characteristics of the display device 14 change with age; therefore, by making provisions to store the customized ICC profile Ip in the profile holding unit 56 as an existing ICC profile Ip in case there arises a need to regenerate the ICC profile Ip in future, the accuracy of the ICC profile Ip can be maintained over a long period of time.

A description will be given below of modified examples of the input/output characteristic calculation and profile creation process that are applicable to any of the profile creation apparatuses 21 to 23 shown in FIGS. 2, 14, and 15.

Figure 17:
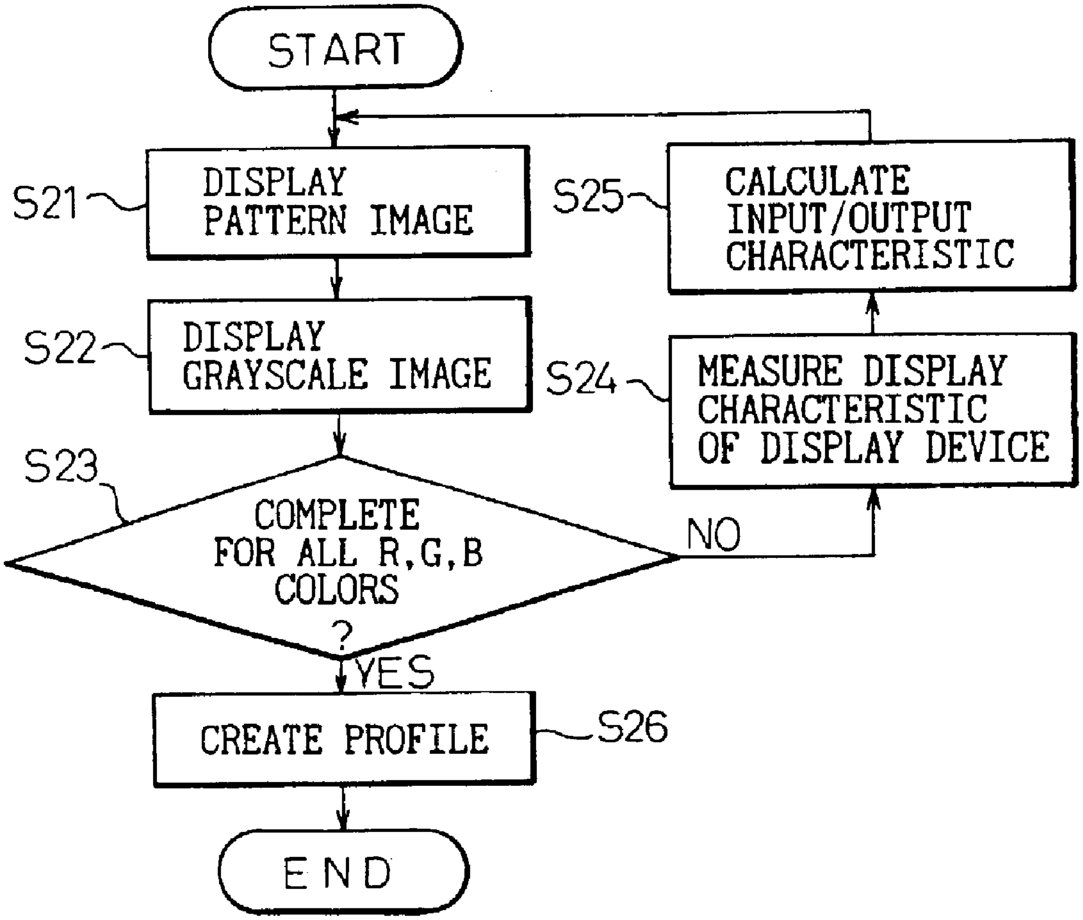
FIG. 17 is a flowchart showing a modified example of the profile creation process.

The processing example shown in FIG. 17 obtains the gamma characteristic for each of the R, G, and B colors. First, based on the color selection made via the selection unit 16 (18), the display control unit 31 presents the pattern image 40, consisting, for example, of black pixels and red (R) pixels as non-black pixels, and the grayscale pattern image 42 of red (R) for display on the display device 14 (steps S21, S22, S23), measures the display characteristic for red (step S24), and calculates the input/output characteristic for red (step S25).

Next, the pattern image 40, consisting of black pixels and green (G) pixels, and the grayscale pattern image 42 of green are displayed, the display characteristic for green is measured, and the input/output characteristic for green is calculated (steps S21 to S25).

Finally, the pattern image 40, consisting of black pixels and blue (B) pixels, and the grayscale pattern image 42 of blue are displayed, the display characteristic for blue is measured, and the input/output characteristic for blue is calculated (steps S21 to S25).

In this way, by obtaining the gamma characteristics for all of the R, G, B primaries producing color on the display device 14, an ICC profile Ip with higher accuracy can be created (step S26).

However, since the displayed luminance of the display device 14 is lower for blue than for red and green, and since the human eye is less sensitive to blue, there are cases where a highly accurate measurement cannot be made for blue. In such cases, the input/output characteristic measured for red or green may be substituted for the input/output characteristic for blue.

Figure 18:
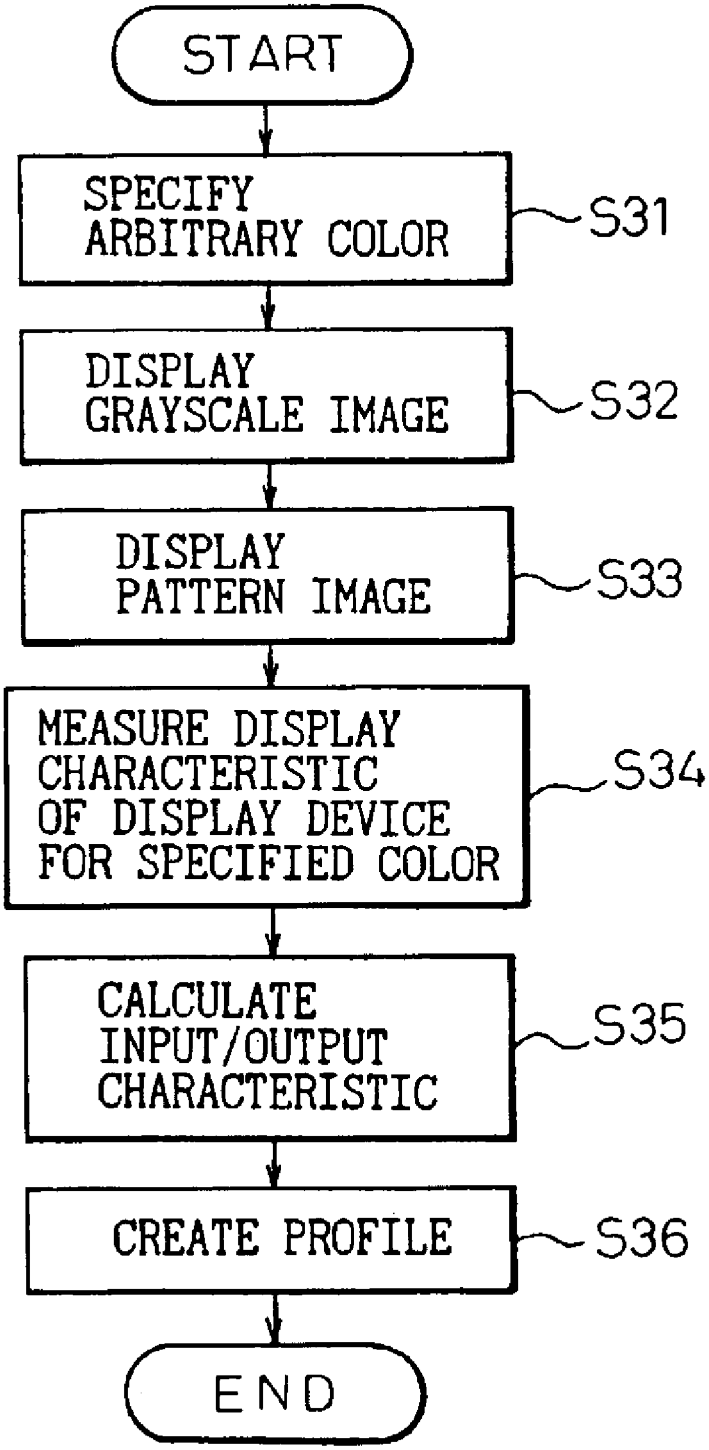
FIG. 18 is a flowchart showing a modified example of the profile creation process.

In view of this situation, the processing example shown in FIG. 18 specifies an arbitrary color by means of thelselection unit 16 (18) from among prestored colors (step S31). Next, the pattern image 40, consisting of black pixels and pixels of the specified color as non-black pixels, and the grayscale pattern image 42 of the specified color are presented for display (steps S31, S32, S33), the display characteristic for the specified color is measured (step S34), and the input/output characteristic for the specified color is calculated and is used directly as the input/output characteristic for a desired color (step S35). Then, the ICC profile Ip is created (step S36).

It will be appreciated that the color to be specified and the color to be measured can be interchanged, and also that, though not shown in the flowchart, the gamma characteristic for an already measured color can be substituted for the gamma characteristic for the specified color.

Figure 51:
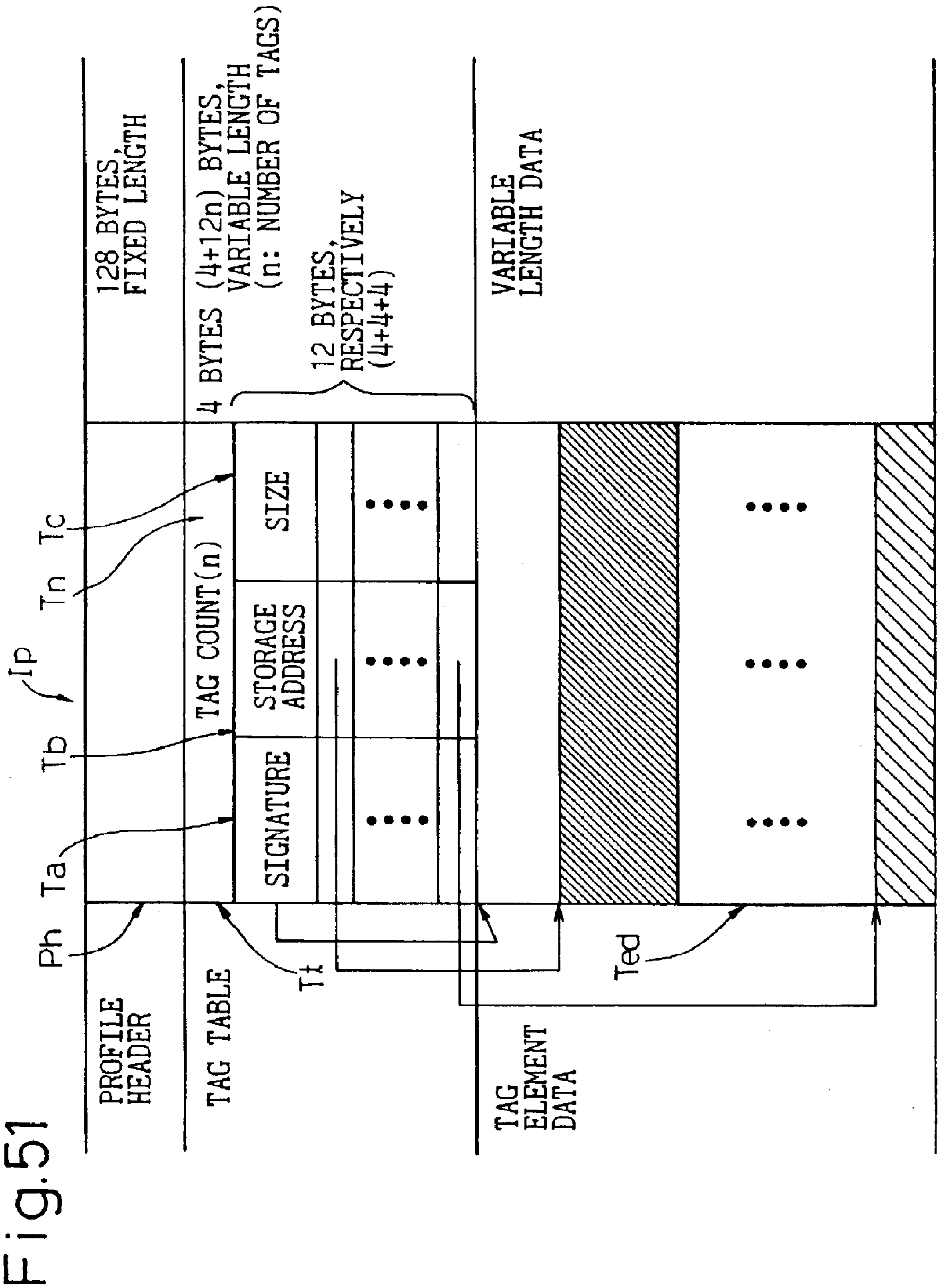
FIG. 51 is a diagram showing a generalized example of ICC profile format.

The gamma coefficient value storing field (rTRC tag, gTRC tag, bTRC tag) of the ICC profile Ip shown in FIG. 51 is capable of holding not only the gamma coefficient value itself, but also two or more input/output point values, as earlier described.

Figure 19:
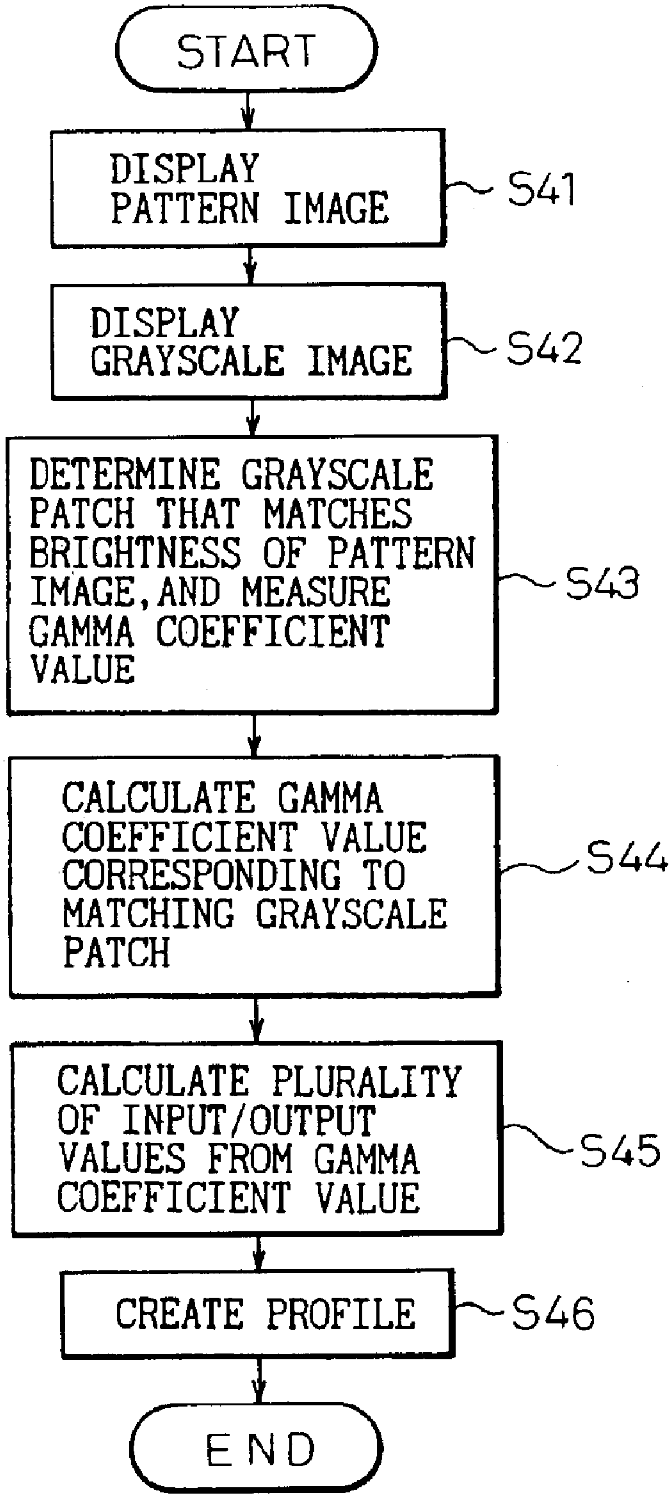
FIG. 19 is a flowchart showing a modified example of the profile creation process.

In the processing example shown in FIG. 19, the dot pattern image 46 (see FIG. 5) is displayed as the pattern image 40, and at the same time, the grayscale image 42 is displayed (steps S41, S42) (see the display shown in FIG. 7).

In the displayed condition of FIG. 7, the grayscale patch 44 that matches the brightness of the dot pattern image 46 is determined, and the gamma characteristic value is measured (step S43). In this example, it is assumed that the grayscale patch of (R, G, B)=(192, 192, 192) designated by reference numeral 44*e* in FIG. 7 matches the color appearance of the dot pattern image 46 having a white/black ratio of 1:1.

Figures 20, 21:
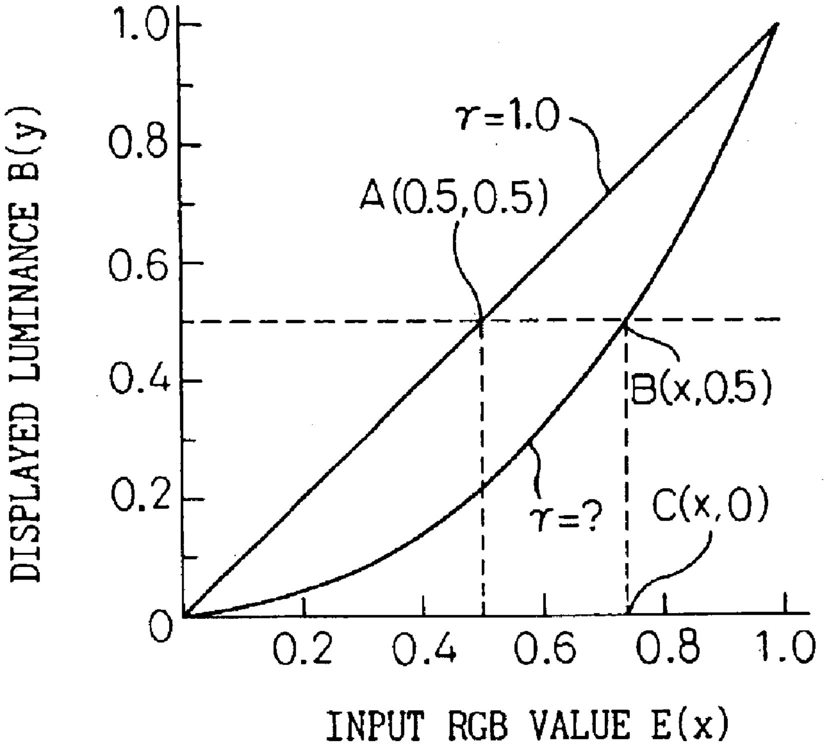
FIG. 20 is a diagram for explaining the calculation of a gamma coefficient value.
FIG. 21 is a diagram showing input/output values at six points, calculated from the calculated gamma characteristic and used for the creation of an ICC profile.

In this case, three points with (input, output)=(x, y)=(0, 0), (0.753, 0.5), and (1.0, 1.0) are obtained as values for measuring the gamma coefficient value, as shown in FIG. 20. Here, the numerical value B(y)=0.5 represents the displayed luminance of the dot pattern image 46 with a white/black ratio of 1:1, and the numerical value E(x)=0.753 represents the ratio of the measured RGB value 192 to the maximum value 255 of the input RGB value (192/255). FIG. 20 shows point A (0.5, 0.5) where the input RGB value E(x) is x=0.5 and the displayed luminance B(y) is y=0.5, point C (x, 0) where E(x) is x=x, and point B (x, 0.5) on a gamma characteristic curve whose gamma coefficient value is unknown, where the input RGB value E(x) is x=x and the displayed luminance B(y) is y=0.5.

By substituting the values of the above three points into equation (1), a gamma coefficient value of 2.443 is calculated (step S44).

Using the input/output characteristic equation (6), six outputs E^2.443=(0, 0.0196, 0.1066, 0.2871, 0.5798, 1.0) are calculated for six inputs E=(0, 0.2, 0.4, 0.6, 0.8, 1.0), as shown in FIG. 21 (step S45). By storing the thus calculated input/output values for six points (input/output sets) in the ICC profile Ip, a new ICC profile Ip can be produced (step S46).

Figure 22:
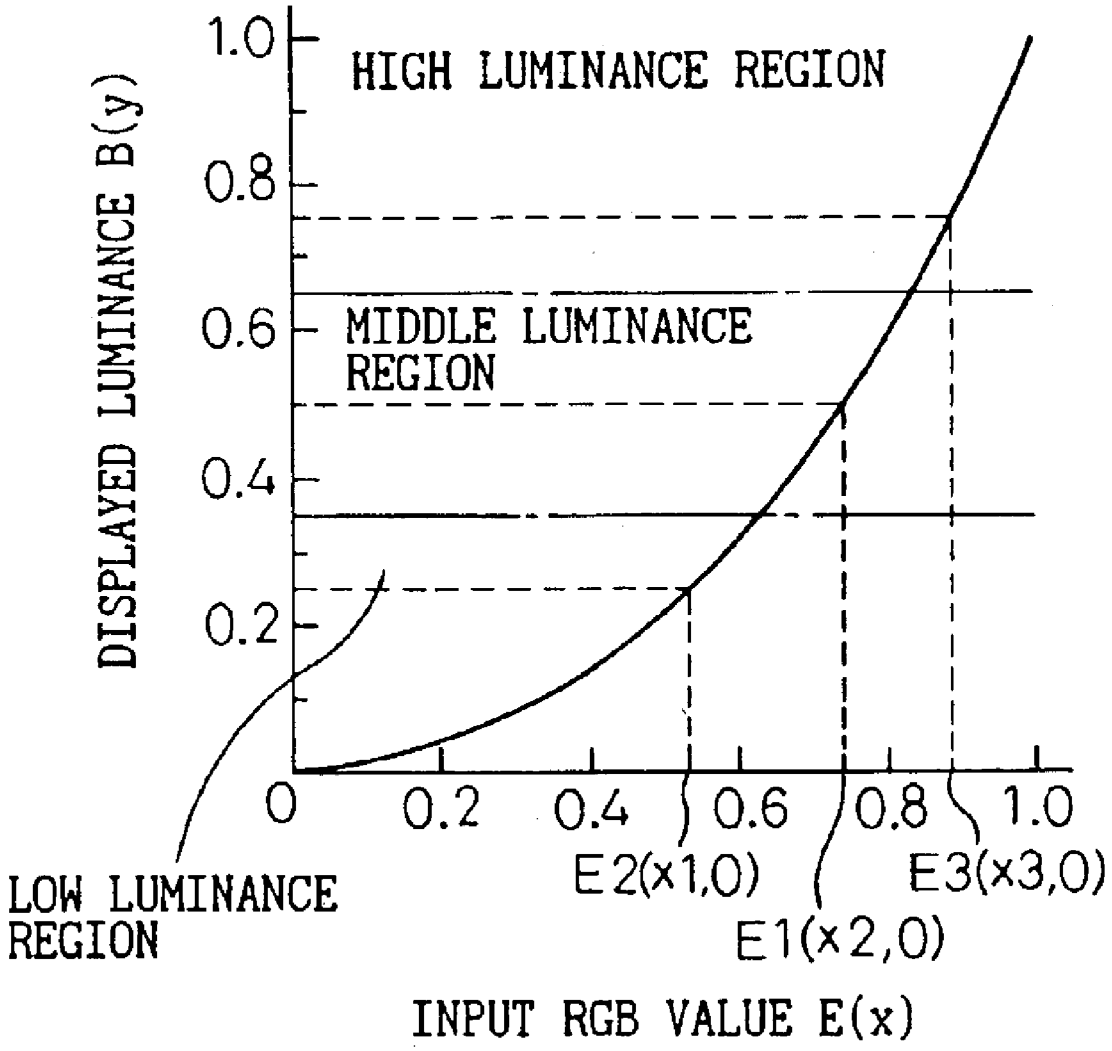
FIG. 22 is a diagram for explaining the calculation of a gamma coefficient value that matches the display luminance.

The gamma characteristic of the display device 14 generally obeys the relation B=E^γ previously shown in equation (6). However, in a low luminance region where the luminance is relatively low (for example, the region of the displayed luminance B(y)=0 to 0.35 in FIG. 22), or in a high luminance region where the luminance is relatively high (for example, the region of the displayed luminance B(y)=0.65 to 1.0 in FIG. 22), the luminance may deviate from the relation B=E^γ (6) obtained for the luminance B(y)=0.5.

Figure 23:
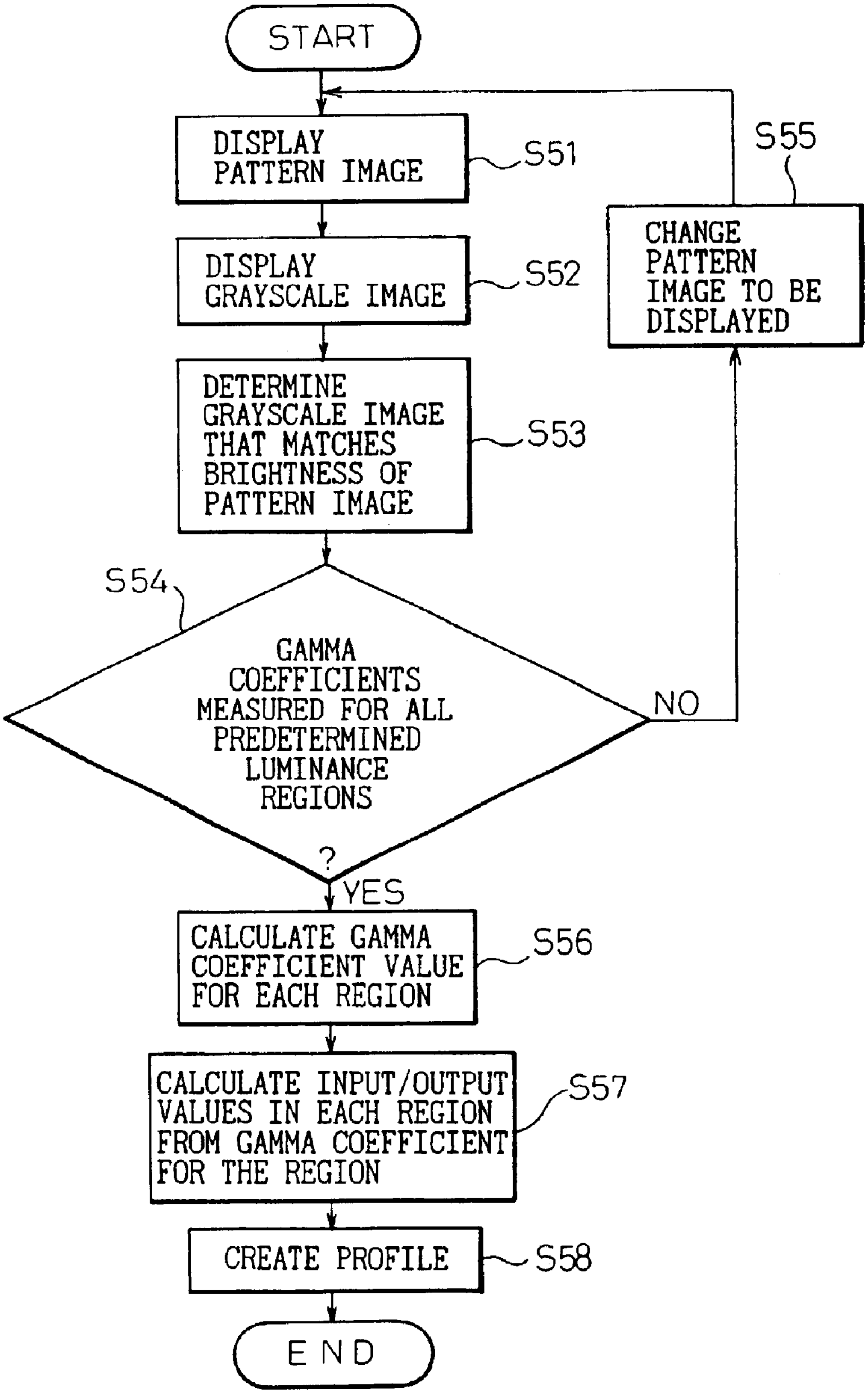
FIG. 23 is a flowchart for explaining the calculation of a gamma coefficient value that matches the display luminance.

A processing example that solves this problem is shown in FIG. 23. First, the gamma characteristic of the display device 14 is divided into a plurality of regions, that is, the low luminance region (the region of B(y)=0 to 0.35), the middle luminance region (the region of B(y)=0.35 to 0.65), and the high luminance region (the region of B(y)=0.65 to 1.0). Then, the pattern image 40 with a white/black ratio of 1:1 (in this case, the dot pattern image 46) and the grayscale pattern image 42 are displayed, the grayscale patch 44 that matches the brightness of the pattern image 40 is determined, and the input RGB value E2=E2(x2, 0) in the middle luminance region is measured (steps S51 to S54).

Next, the white/black ratio in the pattern image 40 to be displayed is changed to 1:3 (step S55), and the input RGB value E1=E1(x1, 0) in the low luminance region is measured (steps S51 to S54).

Finally, the white/black ratio in the pattern image 40 to be displayed is changed to 3:1 (step S55), and the input RGB value E3=E3(x3, 0) in the high luminance region is measured (steps S51 to S54).

Figure 24:
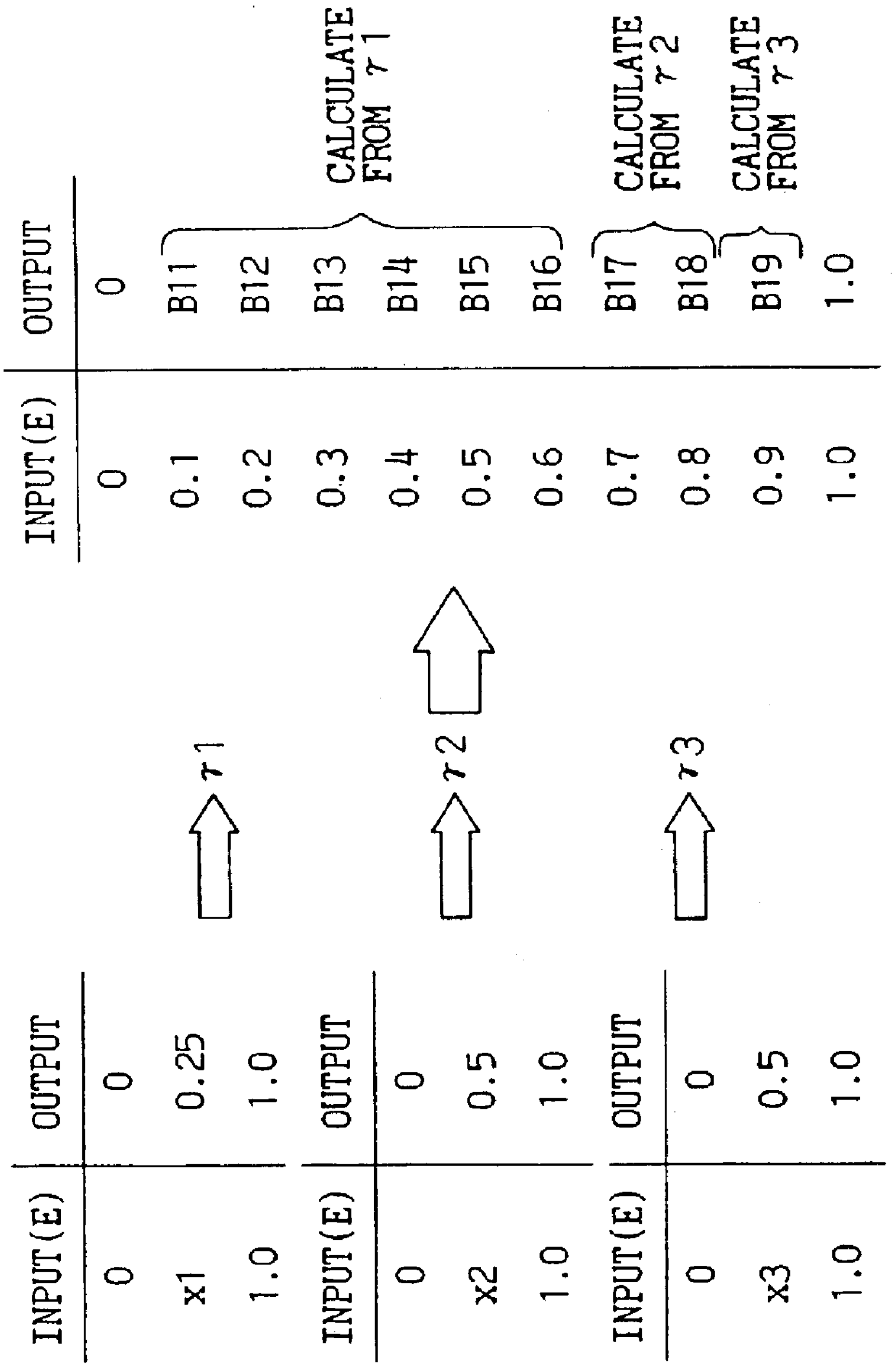
FIG. 24 is a diagram showing examples of gamma coefficient values calculated according to the display luminance.

Next, the gamma coefficient value for each luminance region is calculated in accordance with equation (1) (step S56). That is, as shown in FIG. 24, the gamma coefficient value γ1 for the low luminance region is calculated from the input/output relations (input, output)=(0, 0), (x1, 0.25), and (1.0, 1.0), the gamma coefficient value γ2 for the middle luminance region is calculated from the input/output relations (input, output)=(0, 0), (x2, 0.5), and (1.0, 1.0), and the gamma coefficient value γ3 for the high luminance region is calculated from the input/output relations (input, output)=(0, 0), (x3, 0.75), and (1.0, 1.0).

Then, using the thus calculated gamma coefficient values γ1, γ2, and γ3, the input/output relations in the respective luminance regions are calculated from the results of equation (6) obtained for the respective luminance regions (step S57). That is, as shown in FIG. 24, for inputs E(x)=0.1, 0.2, 0.3, 0.4, 0.5, and 0.6, outputs B(y)=B11, B12, B13, B14, B15, and B16 are calculated based on the gamma coefficient-value γ1; for inputs E(x)=0.7 and 0.8, outputs B(y)=B17 and B18 are calculated based on the gamma coefficient value γ2; and for an input E(x)=0.9, an output B(y)=B19 is calculated based on the gamma coefficient value γ3.

By storing these values in the ICC profile Ip, a new ICC profile Ip is produced (step S58). The thus produced ICC profile Ip has extremely high accuracy, faithfully reproducing the characteristics of the display device 14.

Since the ICC profile Ip is capable of storing the relations between the input and output values of the gamma characteristic, as described above, the measurement points obtained by comparing the pattern image 40 and grayscale pattern image 42 may be stored directly.

Figure 25:
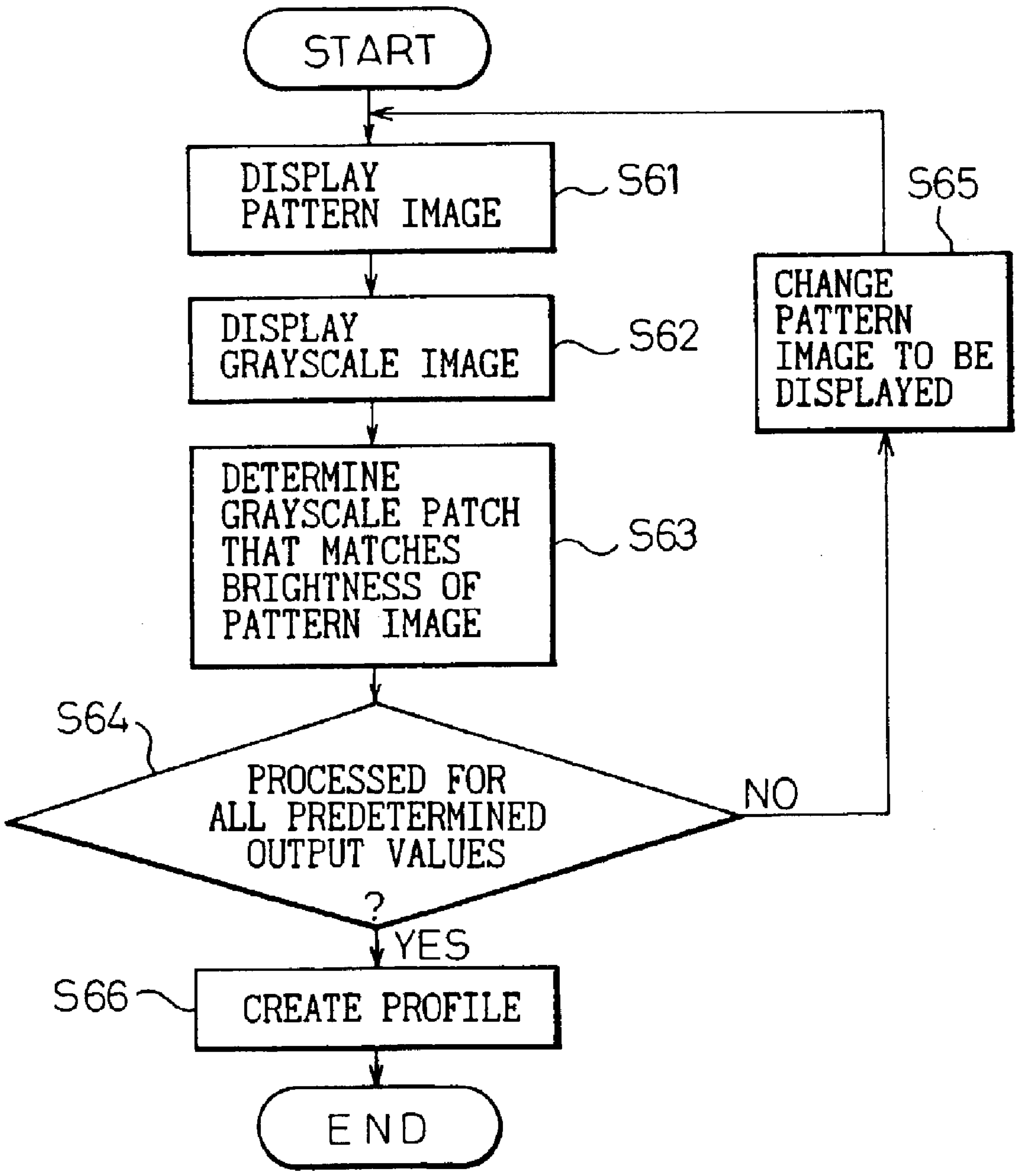
FIG. 25 is a flowchart for explaining a process for creating an ICC profile using a plurality of dot pattern images.
Figures 26, 27:
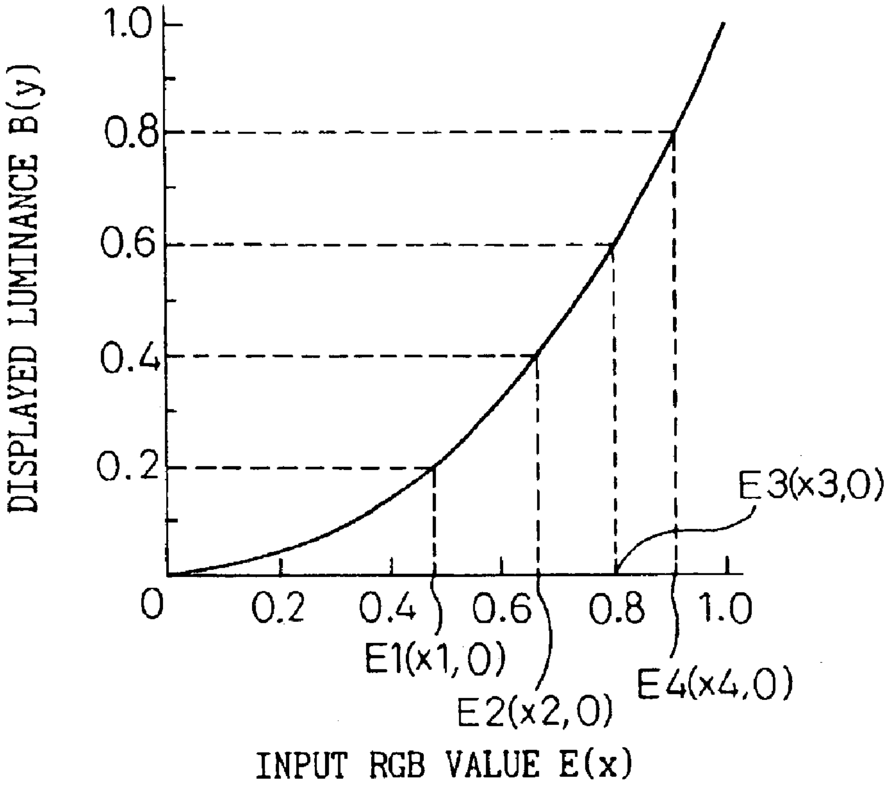
FIG. 26 is a diagram for explaining the process of FIG. 25.
FIG. 27 is a diagram showing data obtained for the creation of an ICC profile by the process of FIG. 25.

This is illustrated in the processing example shown in FIG. 25, in which dot pattern images 46 with white/black ratios of 1:4, 2:3, 3:2, and 4:1, respectively, are sequentially presented for display as the pattern image 40, and input values E(x)=x1, x2, x3, and x4 are obtained for four points with output values B(y)=0.2 (1/5), 0.4 (2/5), 0.6 (3/5), and 0.8 (4/5), as shown in FIG. 26 (steps S61 to S65).

After completing the measurement for the input values E(x) corresponding to the output values B(y) of the predetermined four points, the relations between the input and output values (see FIG. 27) are stored in the ICC profile Ip, and the ICC profile Ip is thus produced (step S66).

Figure 28:
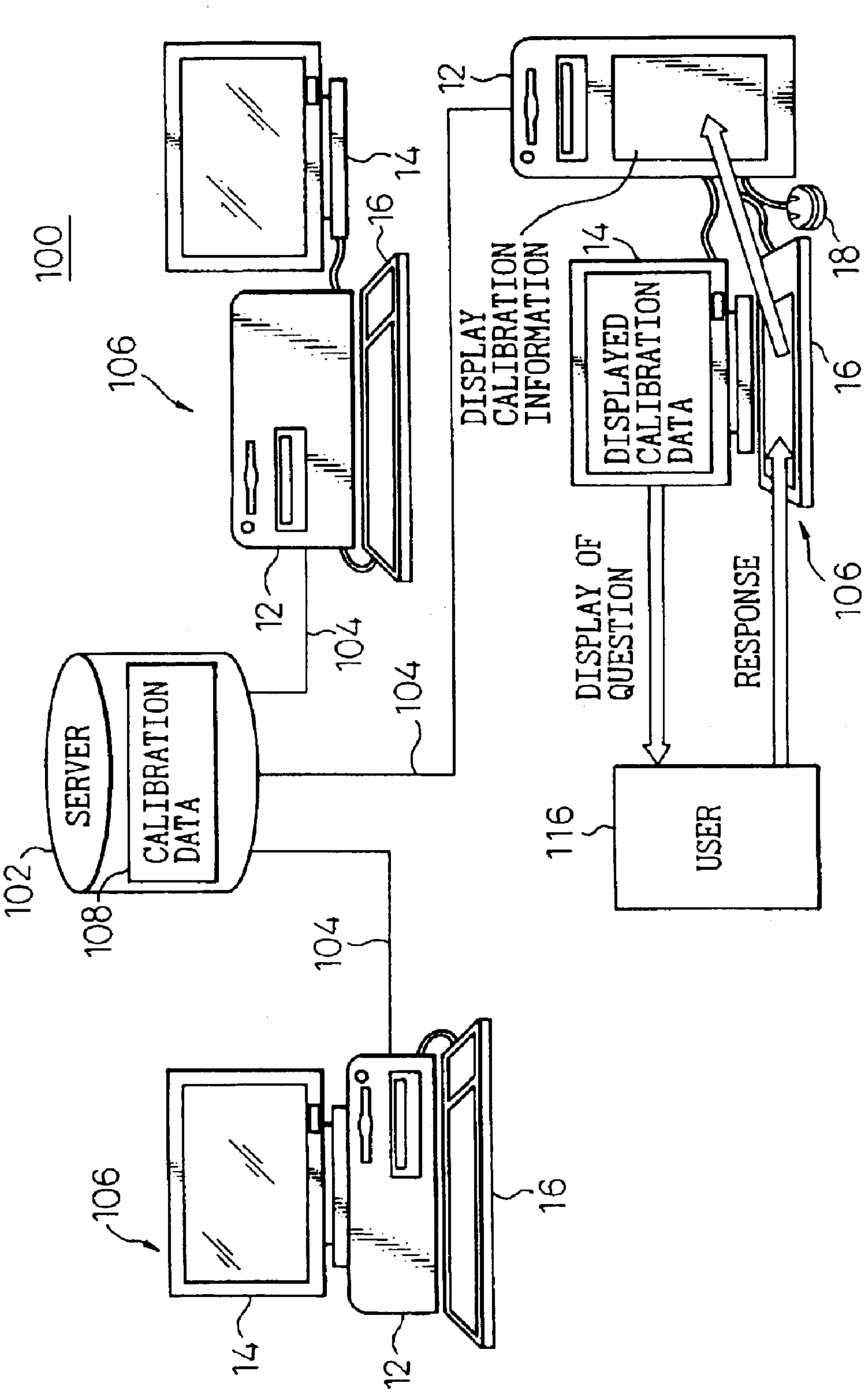
FIG. 28 is a diagram showing the conceptual configuration of a display calibration system to which another embodiment of the present invention is applied.
Figure 29:
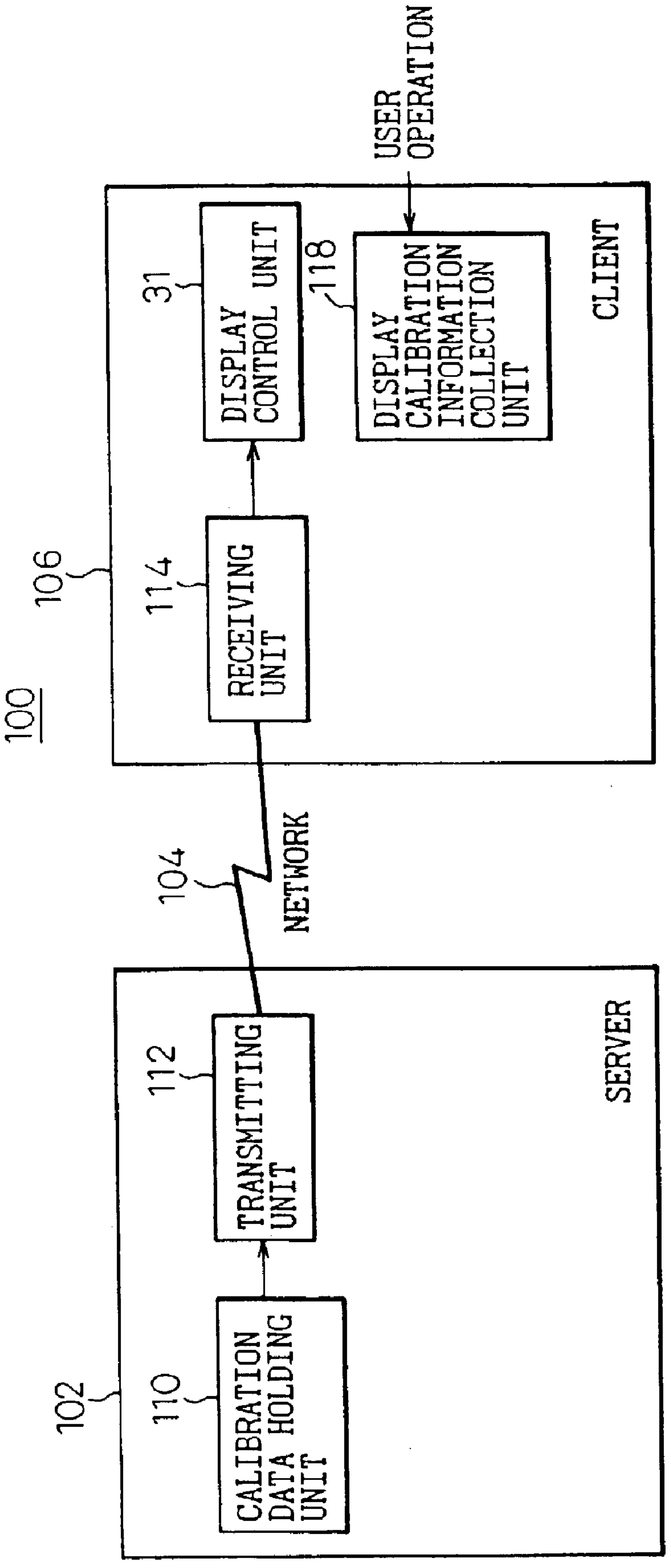
FIG. 29 is a block diagram showing a specific example of the configuration of the system of FIG. 28.

FIGS. 28 and 29 show the configuration of still another embodiment of the present invention. FIG. 28 illustrates the conceptual configuration of a display calibration system 100 according to this embodiment, and FIG. 29 shows a specific example of the configuration of the display calibration system 100 according to this embodiment (the same reference numeral 100 is used between the two figures).

In FIGS. 28 and 29, the display calibration system 100 comprises a server 102 as first equipment responsible for data storage, management, etc. and one or more clients 106 as second equipment connected to the server 102 via a network 104 which is a communications circuit such as a LAN or the Internet. Each individual equipment is, basically, a computer by itself. The server 102 performs processing in response to various requests made from the clients 106, and the clients 106 use the functions of the server 102. The network 104 is responsible for data transfers between the server 102 and the clients 106.

Since the server 102 and clients 106 are computers by themselves, each of them comprises a computer main unit 12, display device 14, keyboard 16, and mouse 18, as previously shown in FIG. 1.

The server 102 includes a calibration data holding unit 110 for holding therein calibration data 108 relating to the ICC profile Ip of the display device 14 provided at each client 106, and a transmitting unit 112 for transmitting the calibration data 108 to the target client 106 via the network 104.

Each client 106 includes a receiving unit 114 for receiving the calibration data 108 transmitted over the network 104, a display control unit 31 as a display producing application for displaying an image corresponding to the received calibration data 108 (including a calibration image displayed based on the calibration data 108 and characters displayed as guidance) on the display device 14, and a display calibration information collection unit 118 for collecting data relating to the profile of the display device 14 in response to the operation of the keyboard 16, etc. by a user 116.

In the display calibration system 100 of FIGS. 28 and 29, the calibration data 108 used for making adjustments relating to the profile of the display device 14 is stored only at the server 102.

Figure 30:
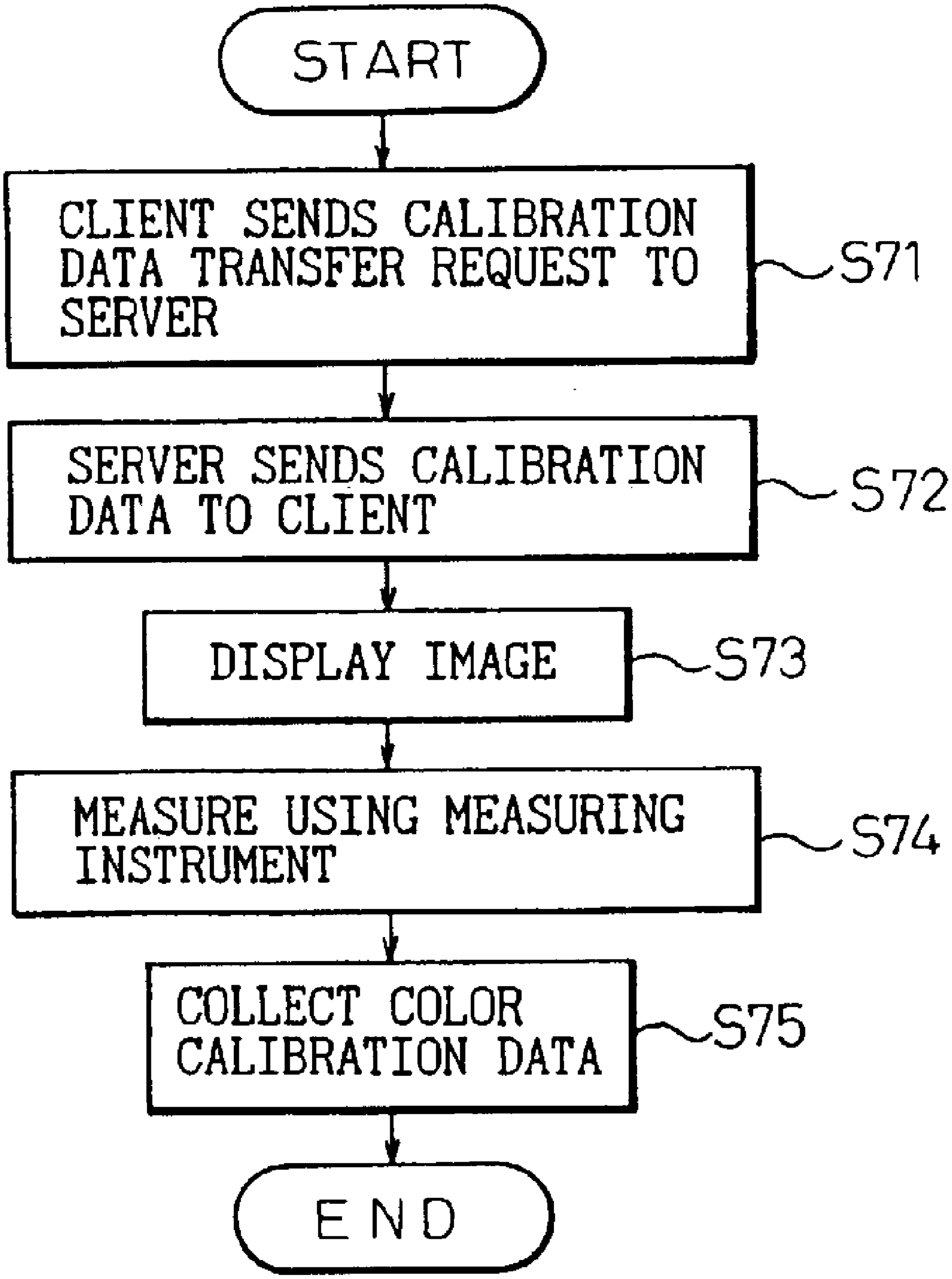
FIG. 30 is a flowchart for explaining the operation of the system shown in FIGS. 28 and 29.

Next, the operation of the display calibration system 100 shown in FIGS. 28 and 29 will be described with reference to the flowchart of FIG. 30.

First, when the user 116 wants to calibrate the display device 14 of the client 106, he sends a request to the server 102 via the receiving unit 113 of the client 106 for the transfer of the calibration data 108 held in the calibration data holding unit 110 (step S71).

In response to the transfer request, the server 102 sends the calibration data 108 to the receiving unit 114 of the client 106 via the transmitting unit 112 and via, the network 104 (step S72).

The display control unit 31, upon detecting the arrival of the calibration data 108 through the receiving unit 114, displays a calibration image based on the calibration data 108, along with a guidance message (text data), which reads, for example, "Measure CIE XYZ values using a measuring instrument," on the display device 14 (step S73).

In this case, a grayscale image consisting only of red color, for example, is displayed on the display device 14, and the user 116 measures color values for the red color display using a measuring instrument (not shown), as an example of the display calibration information collection unit 118, in accordance with the guidance message (step S74).

Figure 53:
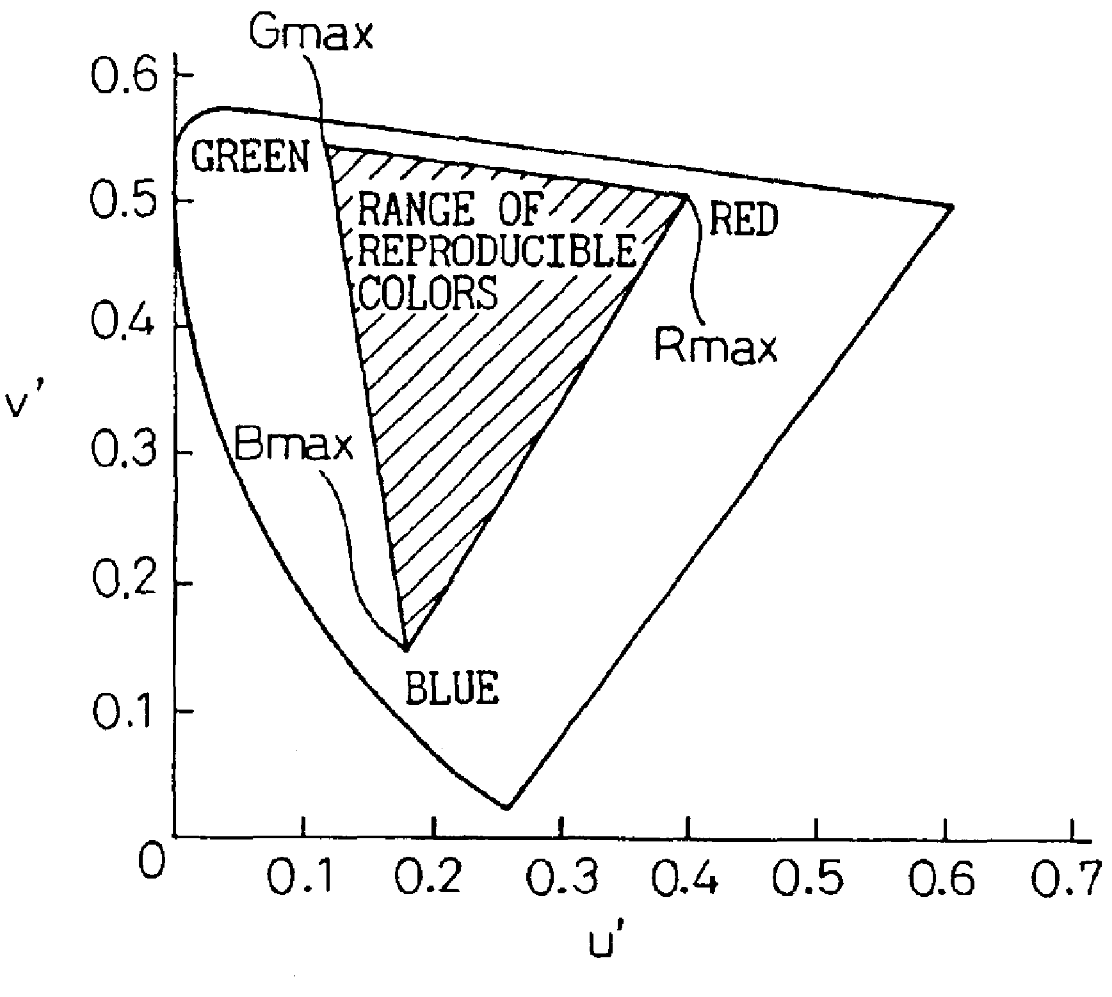
FIG. 53 is a diagram for explaining the color gamut of a display.

The color displayed on the display device 14 is usually measured in terms of X value, Y value, and Z value on the CIE XYZ chromaticity diagram (see FIG. 53). In addition to the CIE XYZ values, values used to describe colors include, RGB, xy, uv, and u'v', but all of these values can be derived by linear conversion from the CIE XYZ values.

In this way, display calibration information as color calibration data is collected through the display calibration information collection unit 118 (step S75).

By measuring several representative colors, such as blue, green, white, gray, and black, in addition to red, and obtaining their XYZ values, calibration can be performed relating to the ICC profile Ip, etc. of the display device 14.

According to the display calibration system 100 of this embodiment, if a measuring instrument is available, the user 116 can collect data (measurement data taken by using the measuring instrument) necessary for the color calibration of the display device 14 by having a calibration image based on the calibration data 108 displayed on the display device 14 via the network 104.

In this way, the user 116 of every client 106 connected to the network 104 can perform calibration relating to the ICC profile Ip, etc. of the display device 14 at the client 106 based, for example, on the same calibration data 108.

The calibration relating to the ICC profile Ip, etc. of the display device 14 can be performed without using a specialized measuring instrument.

Figure 31:
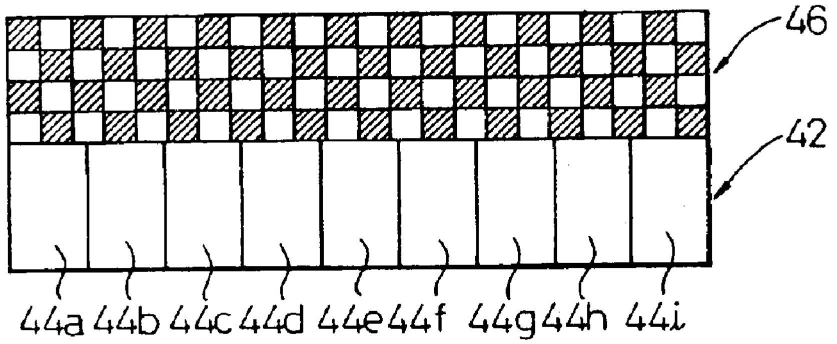
FIG. 31 is a diagram showing an example of an image and guidance displayed on the displace device of a client in the system shown in FIGS. 28 and 29.

In this case, as shown, for example, in FIG. 31, the dot pattern image 46 consisting of black pixels and non-black pixels (in this example, a checkerboard dot pattern image with a white/black ratio of 1:1) and the grayscale pattern image 42 consisting of a plurality of grayscale patches 44 (44*a* to 44*i*) of varying tonal densities are presented for display, along with such guidance messages as "Compare the top and bottom images", "Which bottom image appears closest to the density of the top image?", and "You can easily tell if you look at the screen from a distance."

As explained with reference to FIG. 55, the luminance B of the display device 14 exhibits a light-emission pattern that follows the gamma characteristic. With a gamma value of 1.0, the luminance of the white/black dot pattern image 46 would become equal to that of the grayscale patch 44 having the intermediate gray color ((R, G, B)=(127, 127, 127)) in the grayscale pattern image 42. However, since the gamma value of a CRT display or the like is greater than 1.0, the luminance of the white/black dot pattern image 46 becomes equal to that of the grayscale patch 44 having a gray color lighter than the intermediate gray. Accordingly, the gamma characteristic of the display device 14 can be obtained by selecting, using the keyboard 16, etc., the grayscale patch 44 that matches the luminance of the dot pattern image 46. In other words, the user 116 has only to operate the client 106 to answer the question in accordance with the guidance and the images 42 and 46 displayed on the display device 14; then, data relating to the ICC profile Ip of the display device 14 is collected by the display calibration information collection unit 118 of the client 106.

If the display device 14 has a relatively high resolution, an artifact called moire may appear on the display due to the interference between the frequency of the white/black dot pattern image 46 and the drawing frequency. The occurrence of moire may impair the accuracy of the visual comparison work of the user 116. To avoid this, the dot pattern image 46 is generated not on a dot-by-dot basis, but in blocks of two dots (for example, when contiguous two dots at the attention point are white dots, contiguous two dots horizontally and vertically adjacent to the white dots are displayed as black dots) or in blocks of three dots, while holding the white/black ratio at 1:1, in other words, in the so-called checkerboard pattern. Since this causes the dot frequency to shift from the drawing frequency, no interference occurs, and the measurement can be performed without the interference of moire.

While using larger dots can prevent the occurrence of moire, if the dot size becomes too large, it becomes difficult to perform a comparison with the grayscale patch 44. Since the comparison with the grayscale patch 44 can be accomplished easier as the dot size of the dot pattern image 46 becomes smaller, it is desirable not to make the dot size larger than necessary. Therefore, by checking the resolution or drawing frequency of the display device 14 in advance and by specifying the appropriate dot size, the comparative measurement can be performed using the smallest possible dot size that does not induce the occurrence of moire.

Since dot size is proportional to the resolution of the display device 14, the block size may be varied in accordance with the resolution of the display device 14. The resolutions of common displays for PCs, including the display device 14 of the computer 10, include VGA (640×480), SVGA (800×600), XGA (1024×768), SXGA (1280×1024), etc.

A plurality of image data with different block sizes for different resolutions are stored as the calibration data 108. In the profile creation apparatuses 21, 22, and 23, the data are stored in the pattern image data holding unit 30.

The user 116 can thus select the block size appropriate to the resolution of the display device 14.

Figure 32:
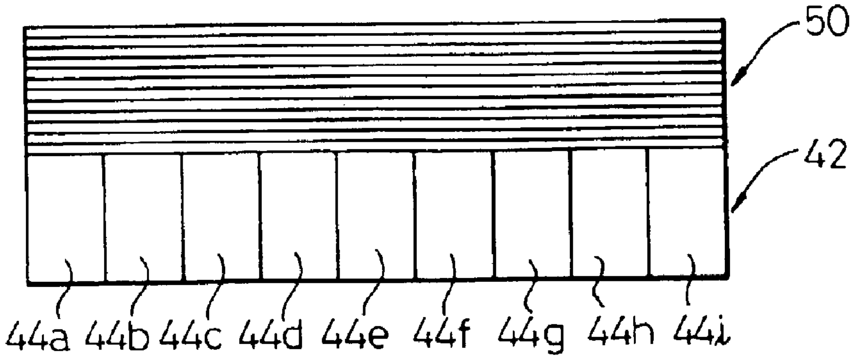
FIG. 32 is a diagram showing another example of an image and guidance displayed on the displace device of a client in the system shown in FIGS. 28 and 29.

When the display device 14 is a CRT display, as described above, since the drawing frequency in the horizontal direction is higher than that in the vertical direction, the color luminance level may drop in the case of an image, such as the dot pattern image 46, that is complex in the horizontal direction. In such cases, the stripe pattern image 50 schematically shown in FIG. 32, consisting only of low-frequency horizontal lines extremely low in frequency in the horizontal direction, is used instead of the white/black dot pattern image 46. In the example of FIG. 32 also, the white and black horizontal lines are identical in thickness (which means that the ratio between the black pixels and white pixels in the stripe pattern image 50 is 1:1).

On the other hand, when the display device 14 is a liquid crystal display device or the like, the luminance level seldom drops if a horizontally complex pattern image is displayed.

It is therefore preferable to select the image pattern according to the type of the display device 14, such as the stripe pattern image 50, when the display device 14 is a CRT display, and the checkerboard dot pattern image 46 in the case of a liquid crystal display device or the like.

As described above, in the display calibration system 100 shown in FIGS. 28 and 29, by responding to the question in the guidance message while viewing the images displayed on the display device 14 of the client 106, the user 116 can collect information representing the characteristics of the display device 14, on which the dot pattern image 46 and the pattern image 40 are displayed, without using a specialized measuring instrument. In this case, the calibration data used to obtain the information (calibration information) relating to the display device 14 need not be held at the client 106, but has only to be held in the calibration data holding unit 110 at the server 102, and the calibration of the display device 14 at every client 106 can be performed using the same calibration data 108.

The display calibration system 100 shown in FIGS. 28 and 29 has been described for the case where the calibration of the display device 14 at the client 106 is performed by connecting the server 102 and the client 106 via the network 104, but the present invention is not limited to the system consisting of the server 102 and clients 106 connected via the network 104; for example, the invention is also applicable to a system where personal computers, one as the first equipment and the other as the second equipment, are connected via the network 104. This also applies to the embodiments hereinafter described.

Figure 33:
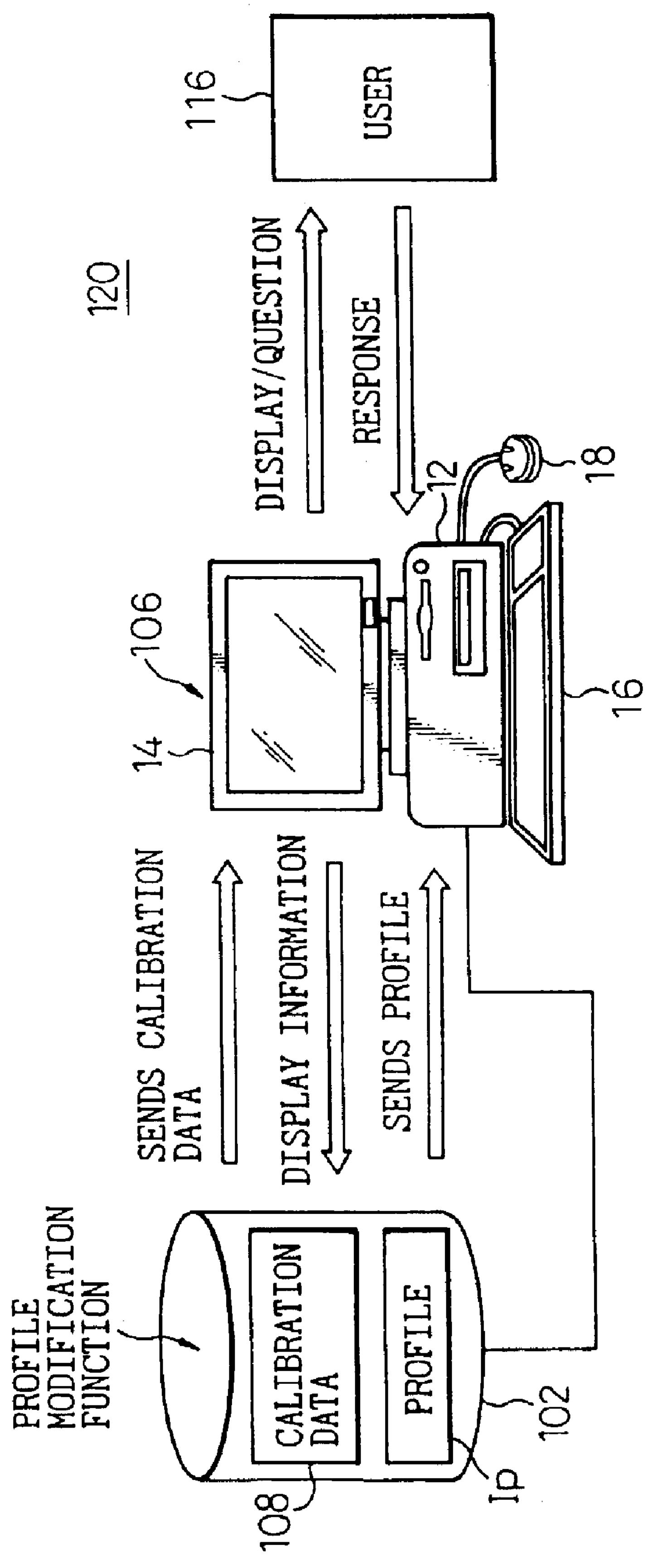
FIG. 33 is a diagram showing the conceptual configuration of a display calibration system to which still another embodiment of the present invention is applied.
Figure 34:
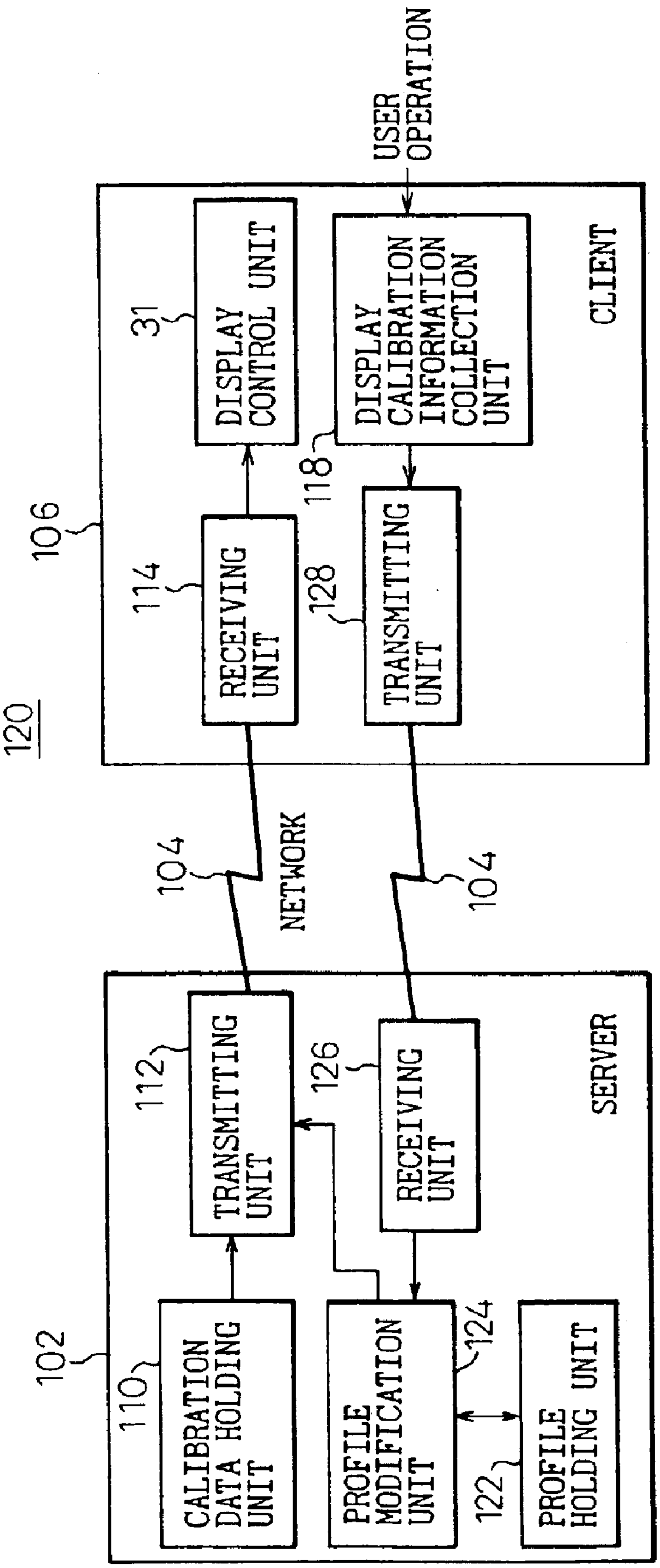
FIG. 34 is a block diagram showing a specific example of the configuration of the system of FIG. 33.

FIGS. 33 and 34 show the configuration of yet another embodiment of the present invention. FIG. 33 illustrates the conceptual configuration of a display calibration system 120, and FIG. 34 shows a specific example of the configuration of the display calibration system (designated by the same reference numeral 120).

To avoid complication, in the display calibration systems hereinafter described, including the one shown in FIGS. 33 and 34, elements corresponding to those of the above-described display calibration system 100 are designated by the same reference numerals, and detailed descriptions of such elements will be omitted.

The display calibration system shown in FIGS. 33 and 34 comprises a server 102 and one or more clients 106 connected to the server 102 via a network 104.

The server 102 includes a calibration data holding unit 110 for holding therein calibration data 108 relating to the ICC profile Ip of the display device 14 provided at each client 106, a profile holding unit 122 for holding as a reference profile the ICC profile Ip (see FIGS. 51 and 52) as a CMS framework for color appearance matching, a profile modification unit 124 for modifying the ICC profile Ip, and a transmitting unit 112 and receiving unit 126 for performing data transfers to and from the client 106 via the network. As earlier described, the ICC profile Ip is used, for example, in ICM 1.0 in the Windows environment and in ColorSync 2.0 in the Macintosh environment.

On the other hand, the client 106 includes a receiving unit 114, a display control unit 31, a display calibration information collection unit 118, and a transmitting unit 128 for transmitting the data, collected by the display calibration information collection unit 118 and relating to the ICC profile Ip of the display device 14, as display calibration information to the server 102 via the network 104.

Operation of the display calibration system 120 of FIGS. 33 and 34 will be described briefly. In this system 120, the profile modification unit 124 at the server 102 modifies the ICC profile Ip based on the ICC profile Ip held in the profile holding unit 122 at the server 102 and on the data supplied from the display calibration collection unit 118. The modified ICC profile Ip is sent to the client 106 as an ICC profile Ip specific to the display device 14 on which the measurements were taken. By incorporating this ICC profile Ip into the display control unit 31, the client 106 can match color appearance between images displayed on the display device 14 and images output on a different image input/output device, such as a printer, not shown.

Figure 35:
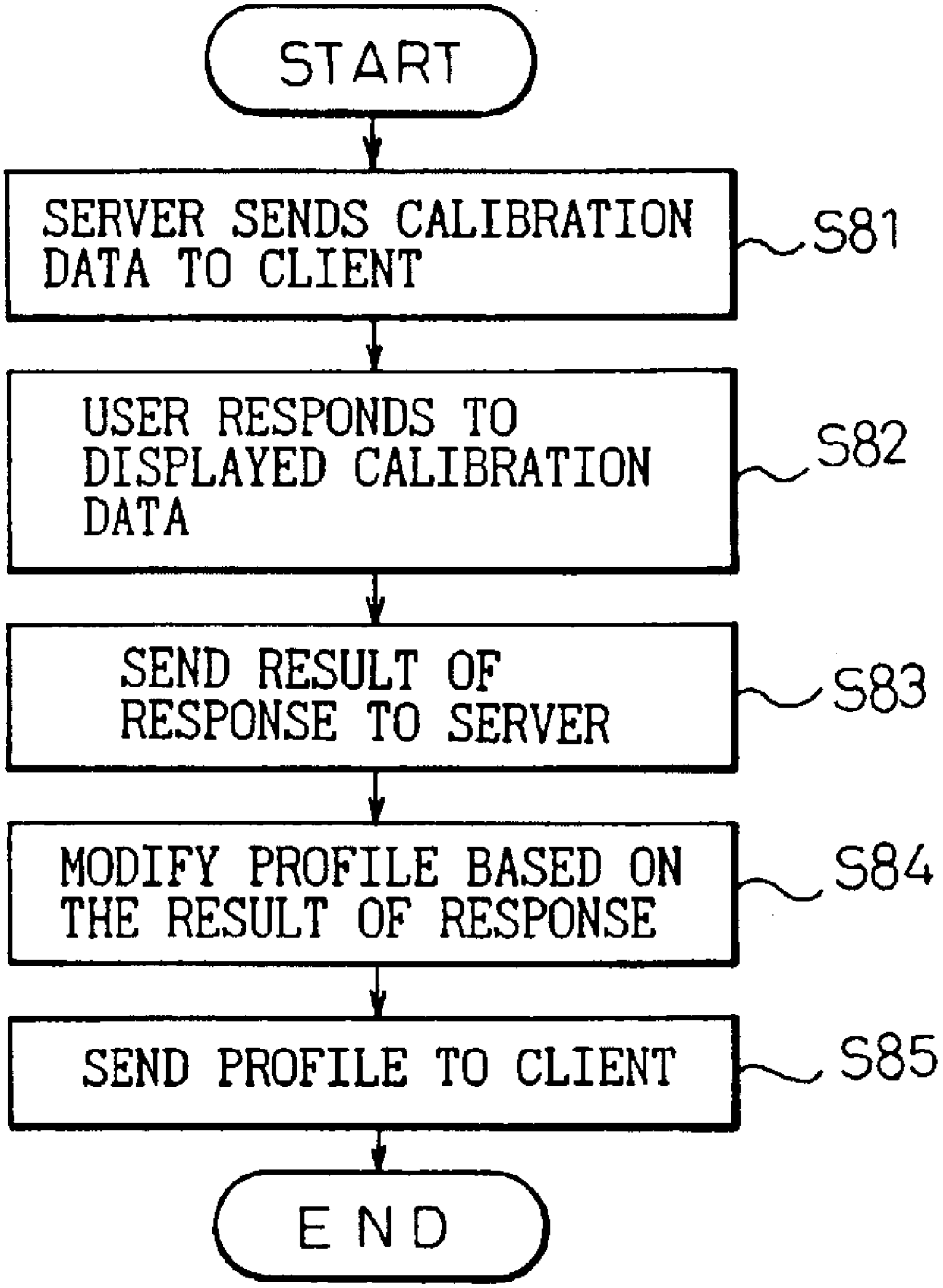
FIG. 35 is a flowchart for explaining the operation of the system shown in FIGS. 33 and 34.

Next, the operation of the display calibration system 120 of FIGS. 33 and 34 will be described in further detail with reference to the flowchart diagrammatically shown in FIG. 35.

First, the calibration data 108 held in the calibration data holding unit 110 at the server 102 is transmitted from the transmitting unit 112 to the display control unit 31 via the network 104 and via the receiving unit 114 at the client 106 (step S81).

Next, at the client 106, the dot pattern image 46 and grayscale pattern image 42, as pattern images based on the calibration data 108, are displayed on the display device 14 along with a guidance message (question) (see FIG. 31), and the user 116 responds to the question using the keyboard 16, etc. while viewing the displayed images (step S82).

This response is collected as display calibration information by the display calibration information collection unit 118, and the resulting display calibration information is transmitted from the transmitting unit 128 to the profile modification unit 124 via the network and via the receiving unit 126 at the server 102 (step S83).

Upon receiving the display calibration information, the server 102 activates a profile modification program and modifies the contents of the ICC profile Ip by calculating the gamma characteristic, etc. as previously described (step S84).

The modified ICC profile Ip is stored in the profile holding unit 122 by being associated with the display device 14 of the client 106 and, at the same time, is transmitted from the transmitting unit 112 via the network 104 to the receiving unit 114 at the client 106 for incorporation into the display control unit 31 (step S85).

In this way, in the display calibration system 120 shown in FIGS. 33 and 34, the ICC profile Ip of the display device 14 of the client 106 can be obtained at the client 106, though neither data nor the modification program relating to the ICC profile Ip is held at the client 106.

Figure 36:
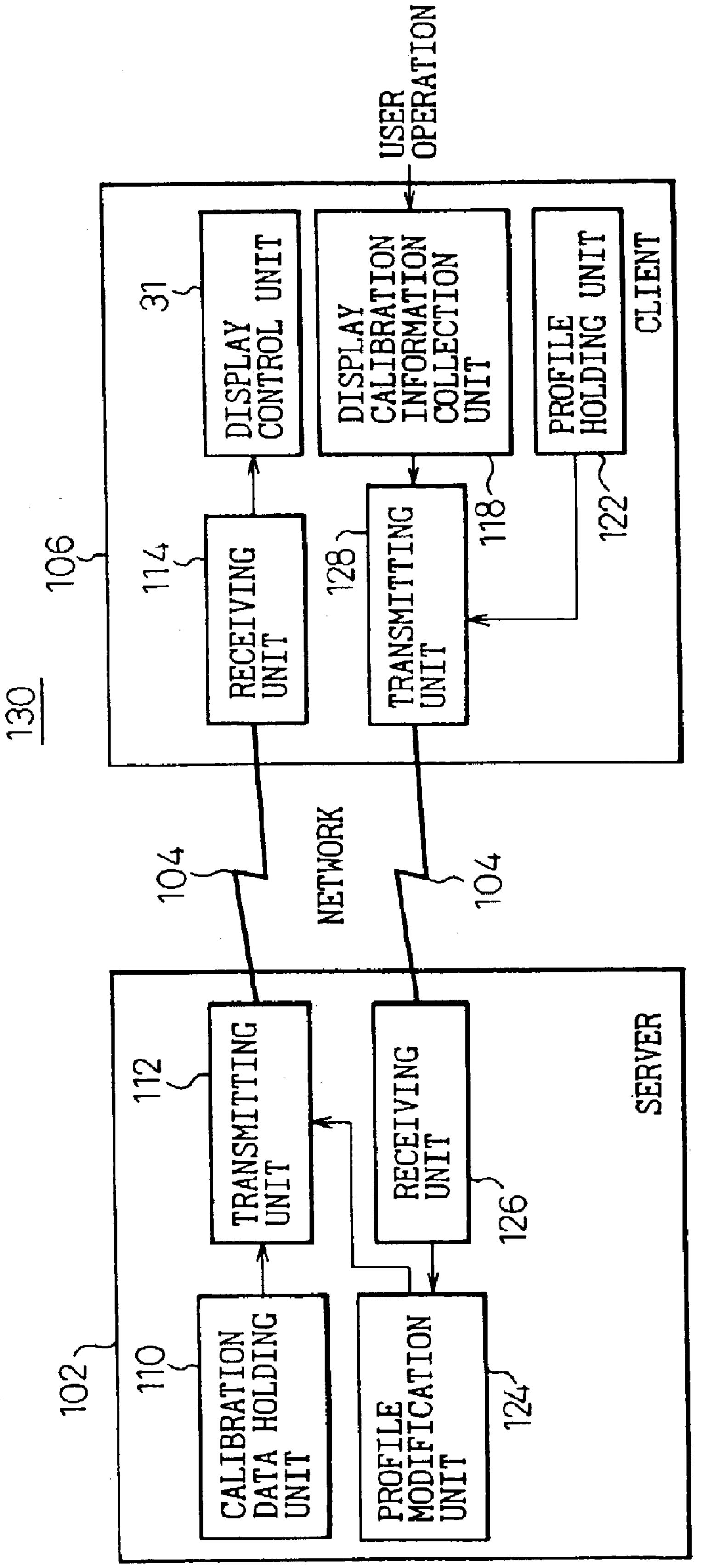
FIG. 36 is a diagram showing a specific example of the configuration of a display calibration system to which yet another embodiment of the present invention is applied.

FIG. 36 shows the configuration of a display calibration system 130 according to a further embodiment of the present invention. The display calibration system 130 differs in configuration from the display calibration system 120 shown in FIG. 34 in that the profile holding unit 122 for holding the ICC profile Ip is provided at the client 106, not at the server 102.

In the display calibration system 130 of FIG. 36, the ICC profile Ip held as a reference profile at the client 106 is sent to the server 109 along with the collected display calibration information. At the server 102, the profile modification unit 124 modifies the ICC profile Ip, and the modified ICC profile Ip is sent back to the client 106. The modified profile Ip as a new reference profile is not only incorporated into the display control unit 31, but is also held in the profile holding unit 122.

The display calibration system 130 of FIG. 36 has the advantage that the server 102 need not to hold the ICC profile Ip corresponding to each client 106, and yet the server 102 can update the ICC profile Ip previously generated for each specific client 106 and already used by that client 106.

Though not shown here, in the display calibration system 130, the profile holding unit 122 may also be provided at the server 102, like the server 102 in the display calibration system 120 of FIG. 34. In that case, if the ICC profile Ip held at the server 102 or the client 106 is corrupted unpredictably, the profile can be restored using the other ICC profile Ip.

In the display calibration systems 120 and 130 shown in FIGS. 34 and 36 where data are transferred in both directions, the Internet, a collection of interconnected networks all using the same protocol and same addressing schema, is used as the network 104.

In an example using the Internet, a World Wide Web (WWW) server (hereinafter also referred to as an http server) is used as the server 102 that sends data to the client 106.

In that case, the calibration data 108 held in the calibration data holding unit 110 is written using a WWW programming language, such as HTML (hypertext markup language) or Java.

FIG. 37 shows the calibration data 108 in the form of an HTML source program for displaying an image consisting of the guidance message and the checkerboard dot pattern image 46 and grayscale pattern image 42 shown in FIG. 31. When this source program is stored as the calibration data 108 at the server 102 as an http server, the user 116 can display an image based on the calibration data 108 shown in FIG. 31 on a WWW browser such as Netscape Navigator or Internet Explorer by accessing the server 102.

The server 102 as an http server takes as display calibration information the response that the user 116 sends by viewing the image displayed based on the calibration data 108, and modifies the existing ICC profile Ip using the profile modification unit 124.

In a system using the Internet, electronic mail (E-mail) is used as a method of sending the ICC profile Ip to the client 106 at the user 116. In this case, the functions of two servers, an http server for the WWW and a mail server (hereinafter called the SMTP server) for transferring mail, must be incorporated in the server 102. Of course, the http server and the SMTP server may be configured as different servers between which data are transferred.

In the display calibration system (designated by reference numeral 120 or 130) using the Internet, when the client 106 accesses the server 102 as an http server by using a WWW browser, the server 102 sends the ICC profile Ip by electronic mail to the E-mail address of the client 106. The client 106 extracts only the ICC profile Ip from the received electronic mail and incorporates (installs) it into the display control unit 31, etc.

In the display calibration systems 120 and 130 shown in FIGS. 34 and 36, the ICC profile Ip is modified and generated at the server 102, but the configuration is not limited to the above example. Rather, the system may be configured in other ways, such as the display calibration system 132 shown in FIGS. 38 and 39.

In this example, the server 102 sends the calibration data to the client 106, along with the source ICC profile Ip and a profile generation program, thereby enabling the profile modification unit 124 at the client 106 to generate an ICC profile Ip. The profile generation program is written using, for example, Java which is a programming language suited to the Internet WWW environment. The generation program is held at the server 102 as a WWW server, and the generation program itself, using Java, is sent to the client 106 at the request of the client 106, thus enabling the profile generation program to be run on the CPU (not shown) of the client 106.

In the above configuration, the display calibration information data for operating the profile modification unit 124 which is implemented by the profile generation program need not be sent to the server 102 via the network 104, eliminating the need to use the CPU of the server 102 for profile generation and thus alleviating the burden of the network 104 as well as the server 102.

Figure 38:
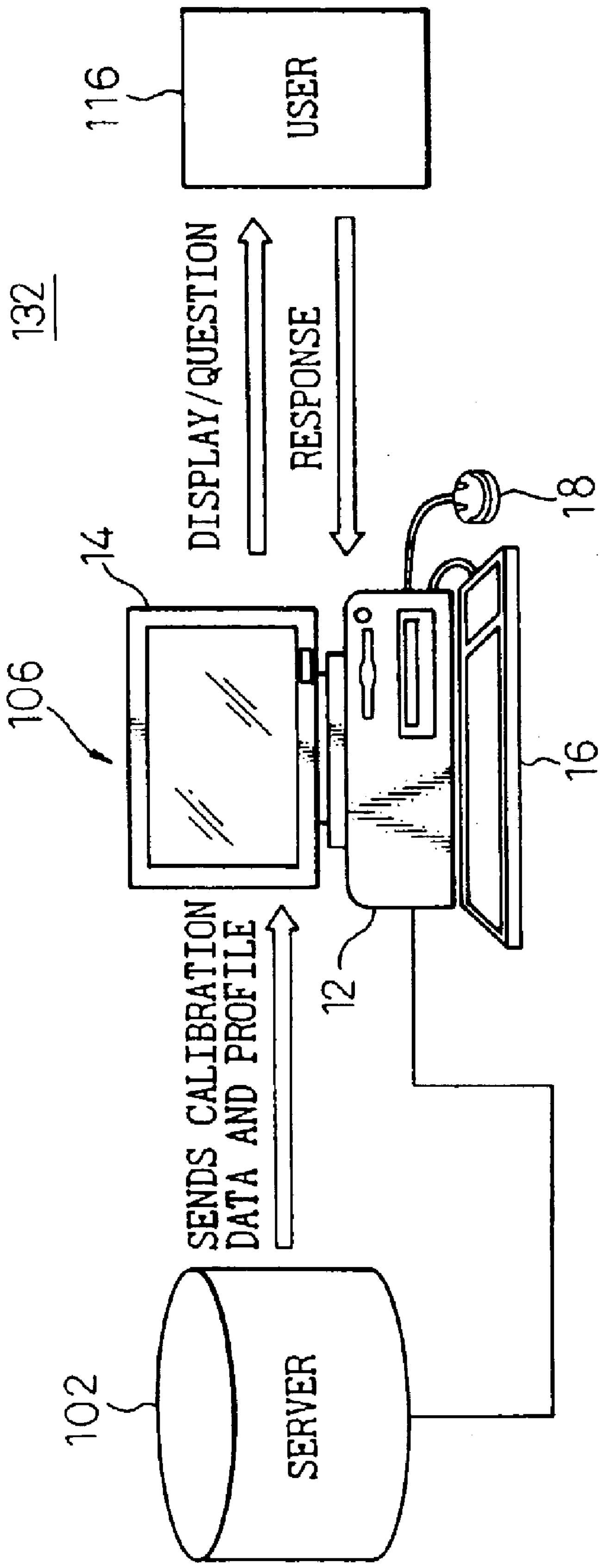
FIG. 38 is a diagram showing the conceptual configuration of a display calibration system to which a further embodiment of the present invention is applied.
Figure 39:
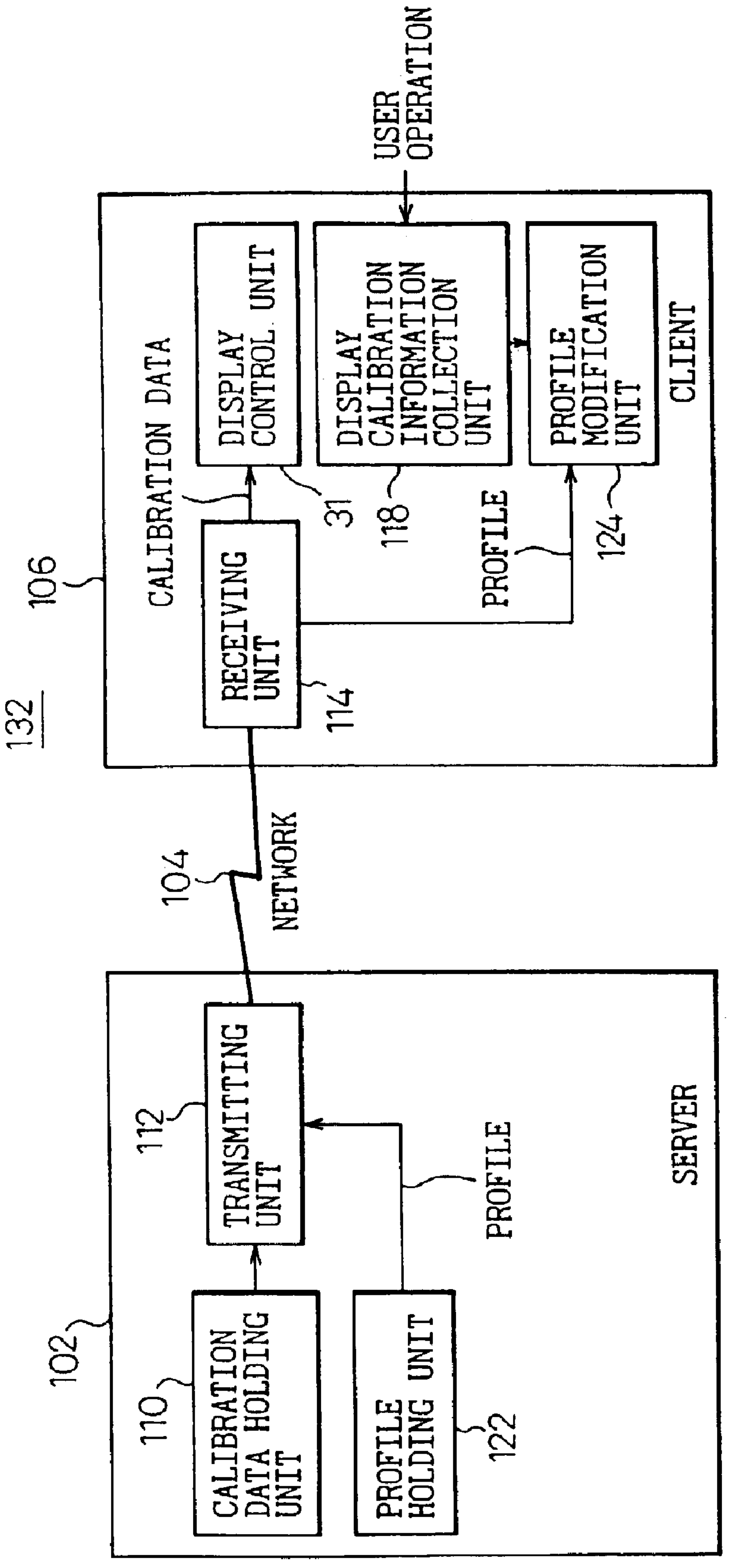
FIG. 39 is a block diagram showing a specific example of the configuration of the system of FIG. 38.
Figure 40:
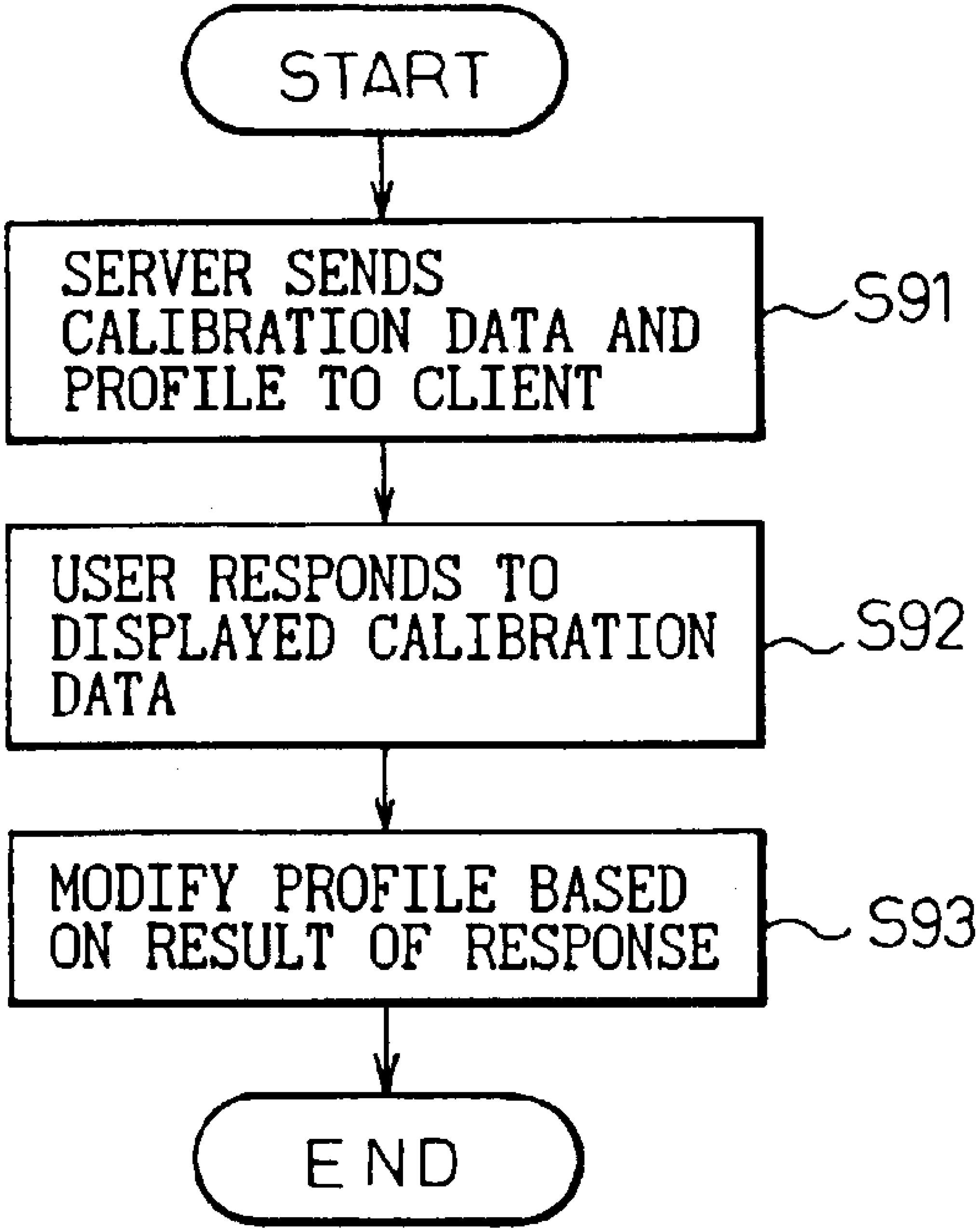
FIG. 40 is a flowchart for explaining the operation of the system shown in FIGS. 38 and 39.

More specifically, as shown in the flowchart of 40, in the display calibration system 132 shown in FIGS. 38 and 39, the ICC profile Ip, profile modification program, and calibration data 108 are sent from the server 102 to the client 106 (step S91), and the user 116 enters his response to the guidance message while viewing the image displayed based on the calibration data (step S92). Thereupon, the profile generation program is executed at the client 106, and the profile modification unit 124 modifies the ICC profile Ip based on the result of the user's response (step S93).

As earlier noted, Java can be employed as a programming language. On the Internet, a distributed data environment is realized. Data is held at each server 102, and data is transmitted at the request of the user 116. Java, developed as a network communication programming language, permits a Java program held at the server 102 to be sent to the user 116 along with the data requested by the user 116 so that the program can be run on the client 106, the computer at the user 116.

Figure 41:
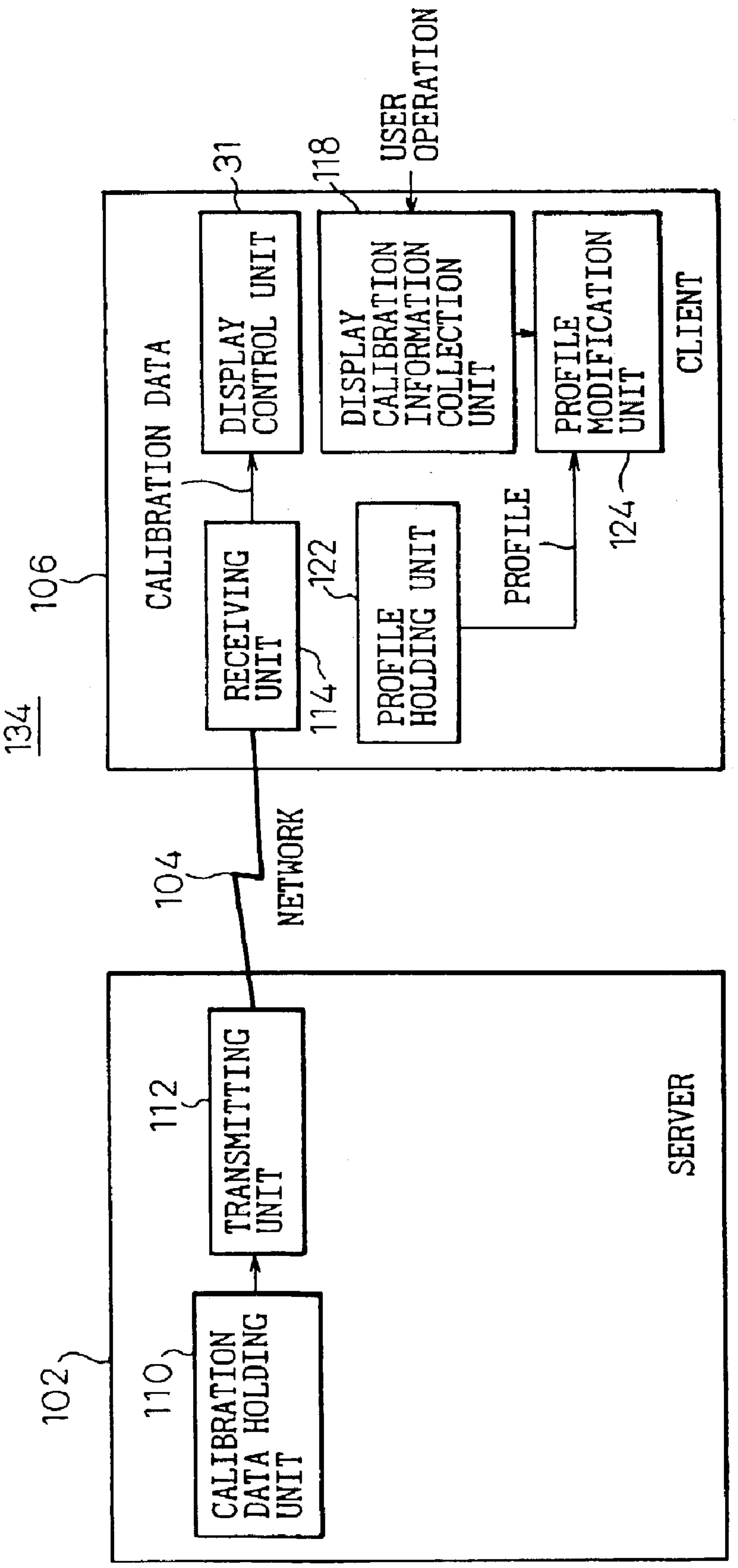
FIG. 41 is a diagram showing a specific example of the configuration of a display calibration system to which a still further embodiment of the present invention is applied.

The ICC profile Ip may be held at the client 106. An example of such a display calibration system 134 is shown in the block diagram of FIG. 41. In the example of FIG. 41, the server 102 sends the calibration data 108 to the client 106 along with the profile generation program, and the client 106 activates the profile modification unit 124 based on the profile generation program and modifies the ICC profile Ip based on the ICC profile Ip held in the profile holding unit 122.

In ICM 1.0 for Windows 95 or Windows 98, ICC profiles Ip are stored in the predesignated system-related folder (C:Windows System Color). This is the same for ColorSync 2.0 for Macintosh.

Figure 42:
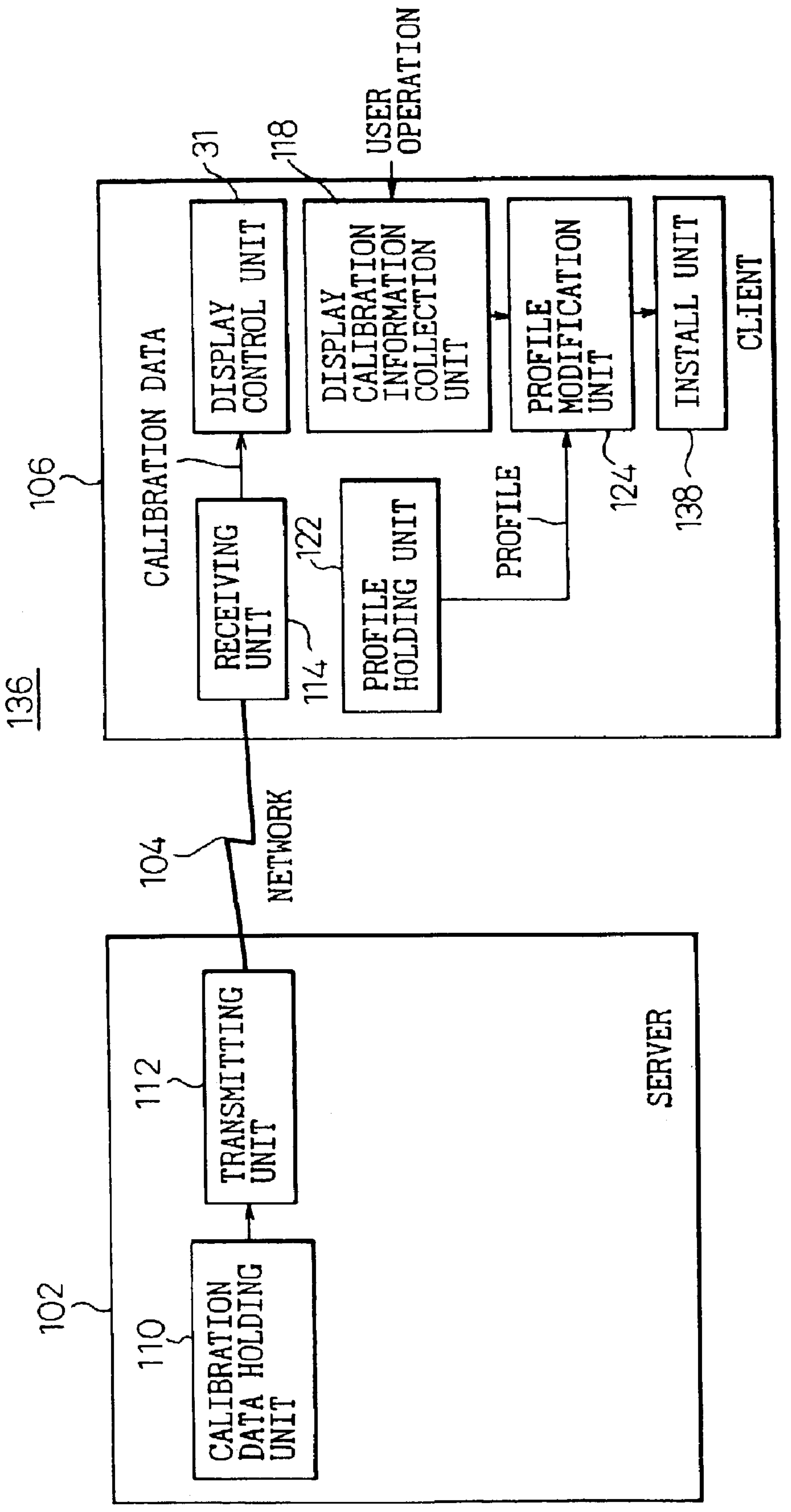
FIG. 42 is a diagram showing a specific example of the configuration of a display calibration system to which a still further embodiment of the present invention is applied.

In view of this, in a display calibration system 136 according to a still further embodiment of the present invention shown in FIG. 42, an install unit 138 is provided by which the ICC profile Ip modified by the profile modification unit 124 at the client 106 is automatically installed in the predesignated system-related folder, saving the user 116 the trouble of installing it himself.

Figure 43:
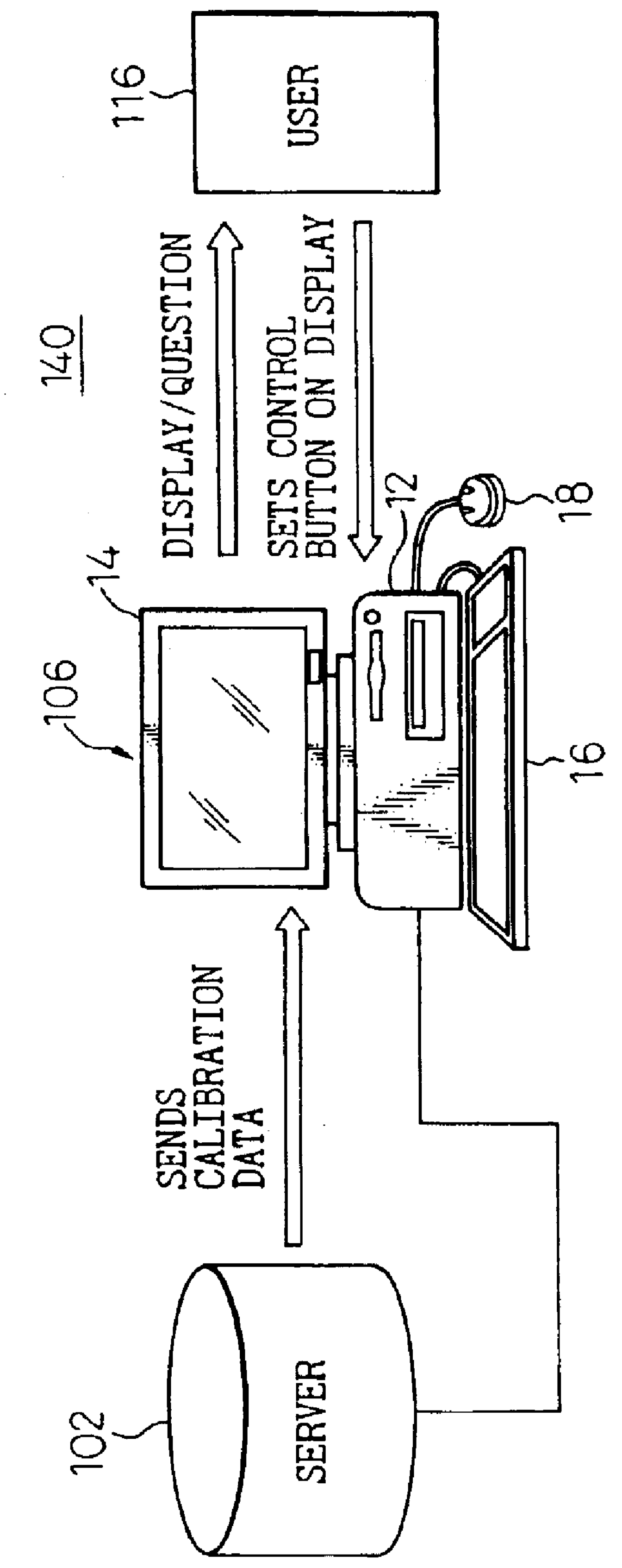
FIG. 43 is a diagram showing the conceptual configuration of a display calibration system to which a still further embodiment of the present invention is applied.
Figure 44:
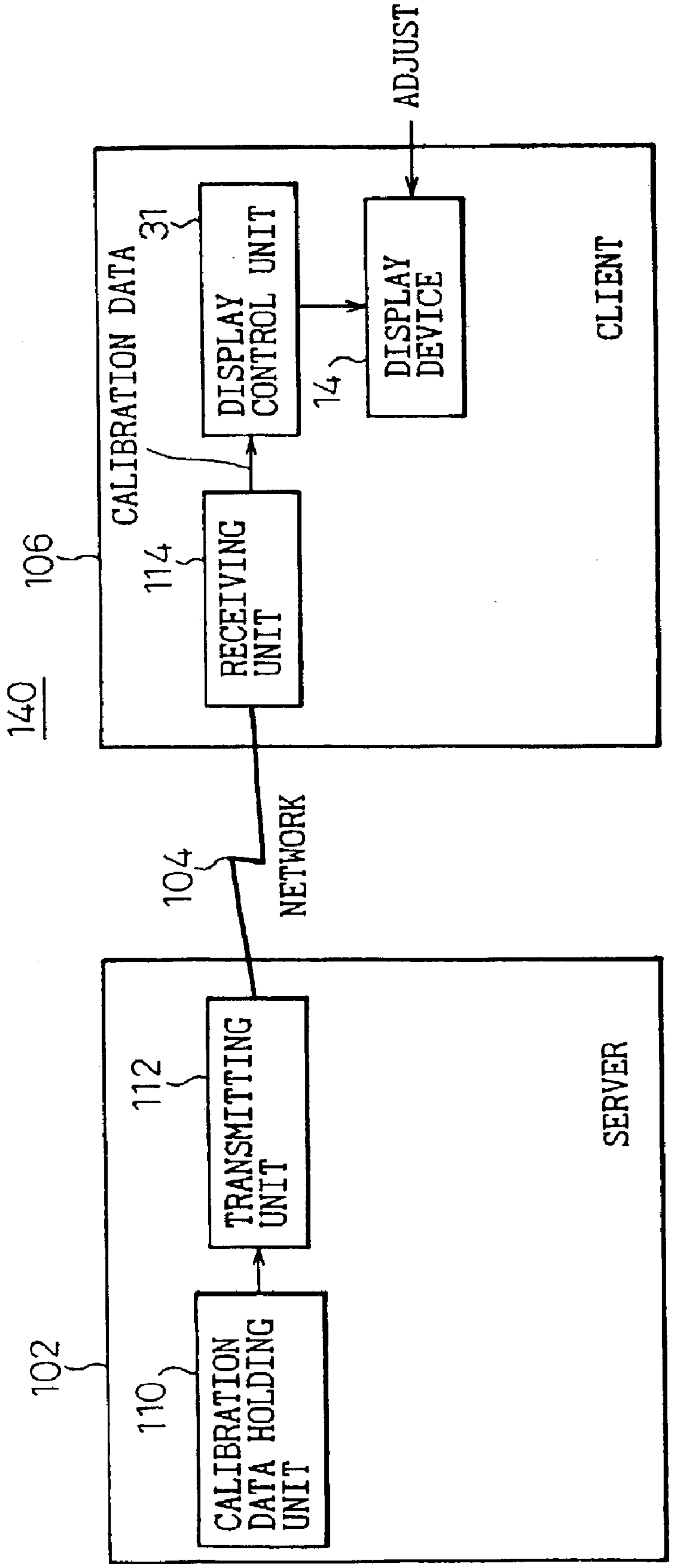
FIG. 44 is a block diagram showing a specific example of the configuration of the system of FIG. 43.

FIGS. 43 and 44 show the configuration of a still further embodiment of the present invention. The display calibration system 140 shown here is configured so that the user 116, based on the calibration data 108 sent from the server 102, can directly adjust the contrast, brightness, color temperature, convergence, monitor distortion, and other parameters that have significant effects on the display color of the display device 14, such as a CRT display, provided at the client 106.

More specifically, this example aims at achieving a certain degree of color appearance matching, not by using the ICC profile Ip, but by generalizing the settings of the display device 14 relating to the ICC profile Ip.

Figure 45:
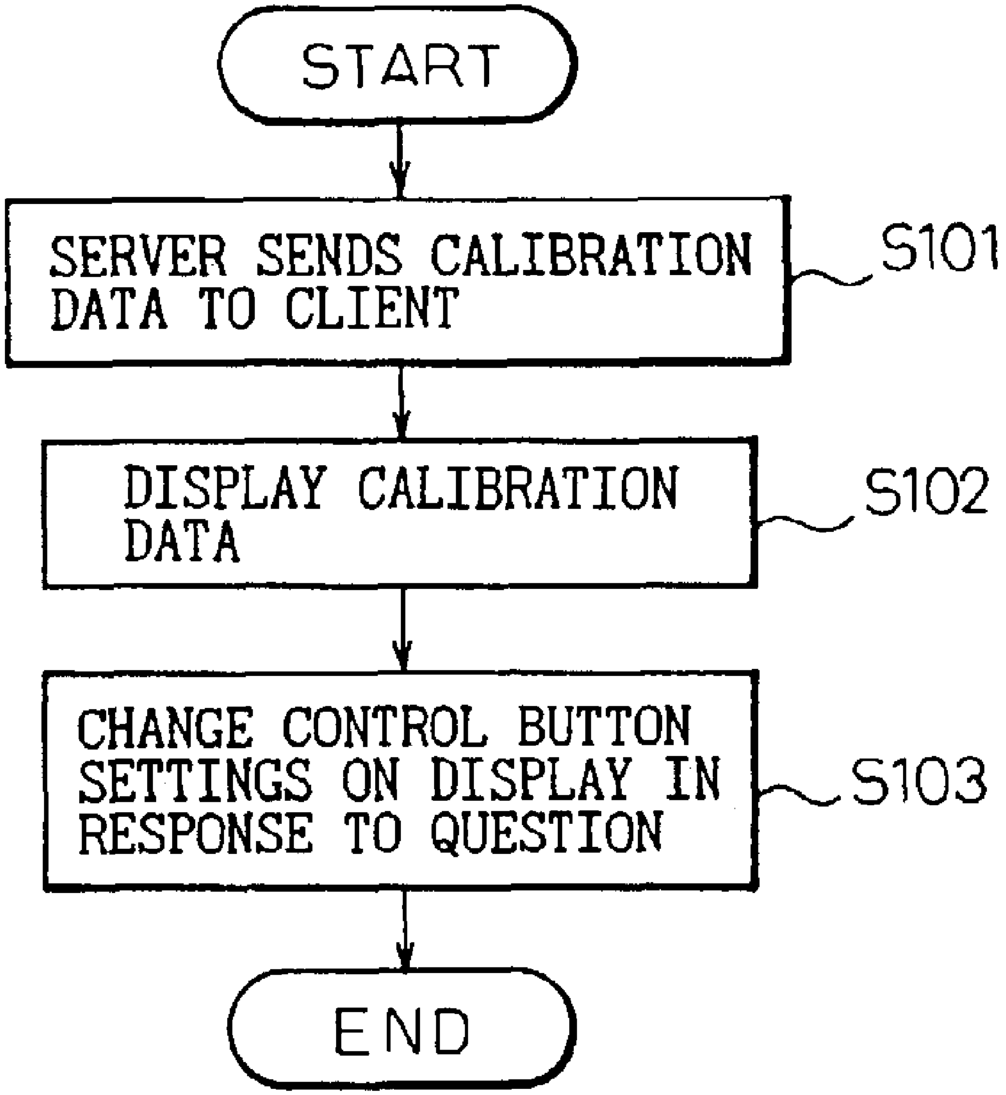
FIG. 45 is a flowchart for explaining the operation of the system shown in FIGS. 43 and 44.

The operation of the display calibration system 140 will be described with reference to the flowchart of FIG. 45. First, the server 102 sends the calibration data 108 to the client 106 (step S101).

Figure 46:
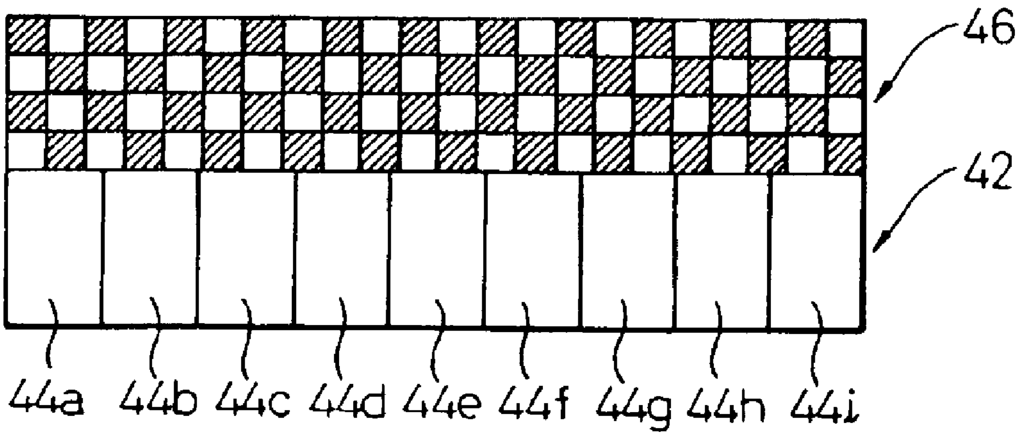
FIG. 46 is a diagram showing an example of a display calibration image and guidance.

The display control unit 31 presents the guidance and images (the dot pattern image 46 with a white/black ratio of 1:1 and the grayscale pattern image 42 (grayscale patches 44*a* to 44*i*)) based on the calibration data 108 for display on the display device 14, the guidance containing messages "Compare the top and bottom images," "Adjust the display contrast so that the third patch from right in the bottom grayscale image becomes closest in density to the top image," and "You can easily tell if you look at the screen from a distance," as shown in FIG. 46 (step S102).

In accordance with the guidance, the user 116 sets the contrast adjusting control (button), etc. (not shown) so that the third grayscale patch 44 from right appears the same in density as the dot pattern image 46 (step S103).

When all clients 106 connected to the network 104 have thus calibrated the respective display displays 14 in accordance with the calibration data 108 sent from the server 102, the color output of every display device 14 becomes substantially the same.

In the display calibration system 140 of FIGS. 43 and 44, since the ICC profile Ip is not used for the calibration of the display device 14, a certain degree of color appearance matching can be achieved in MS-DOS, UNIX, and other OS environments that do not support the ICC profile Ip.

That is, the display calibration system 140 can be applied to any client 106 connected to the network 104, regardless of the OS, since the display settings are adjusted using the control features provided in the display device 14 itself and without creating the so-called device profile.

When the display device 14 is, for example, a CRT display, the phosphors used therein deteriorate with time, degrading the crispness of displayed color. That is, the color that the display device 14 produces varies over time. Therefore, performing the calibration of the display device 14 (the adjustment of the ICC profile Ip or the adjustment of contrast, etc.) only once is not sufficient, but recalibration must be performed periodically to compensate for variations in the characteristics of the display device 14 over time.

Figure 47:
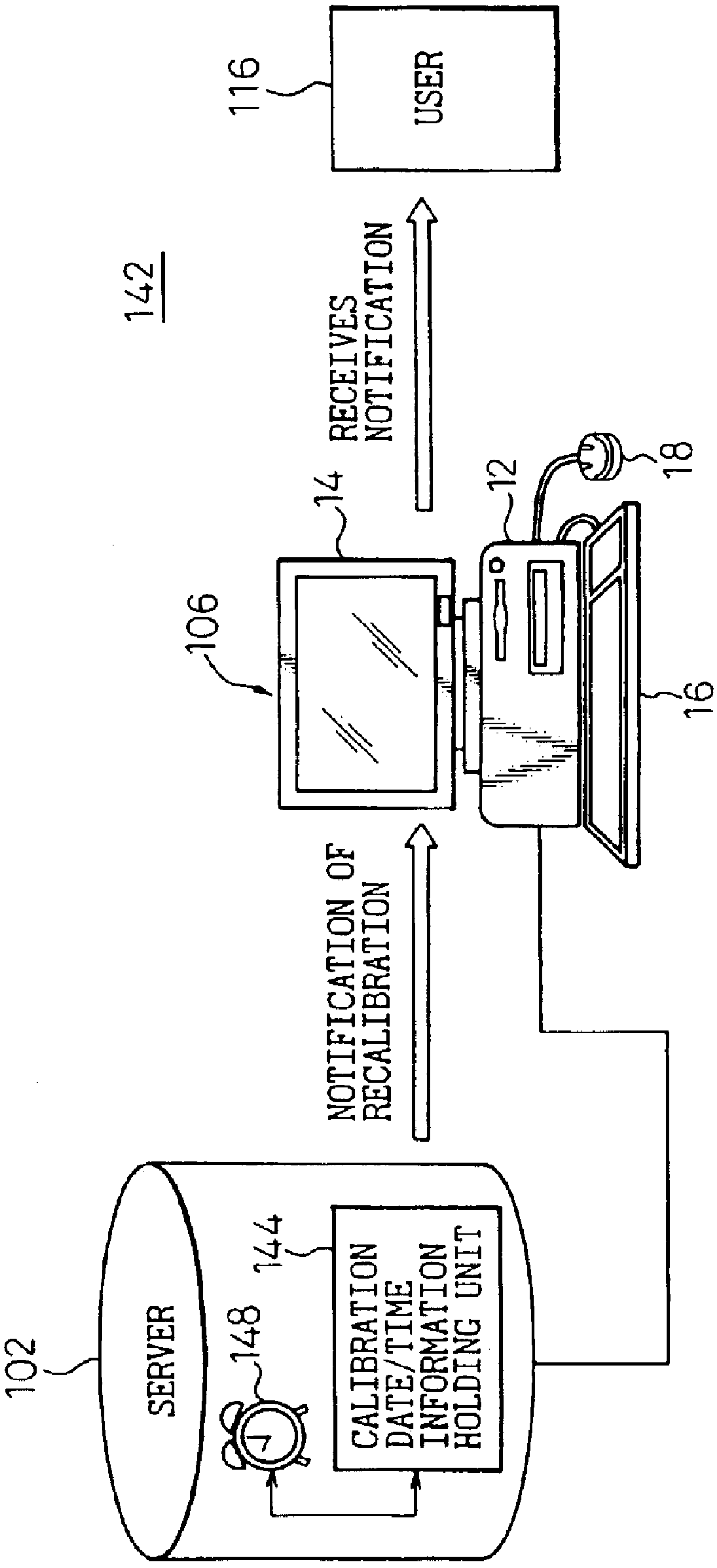
FIG. 47 is a diagram showing the conceptual configuration of a display calibration system to which a still further embodiment of the present invention is applied.
Figure 48:
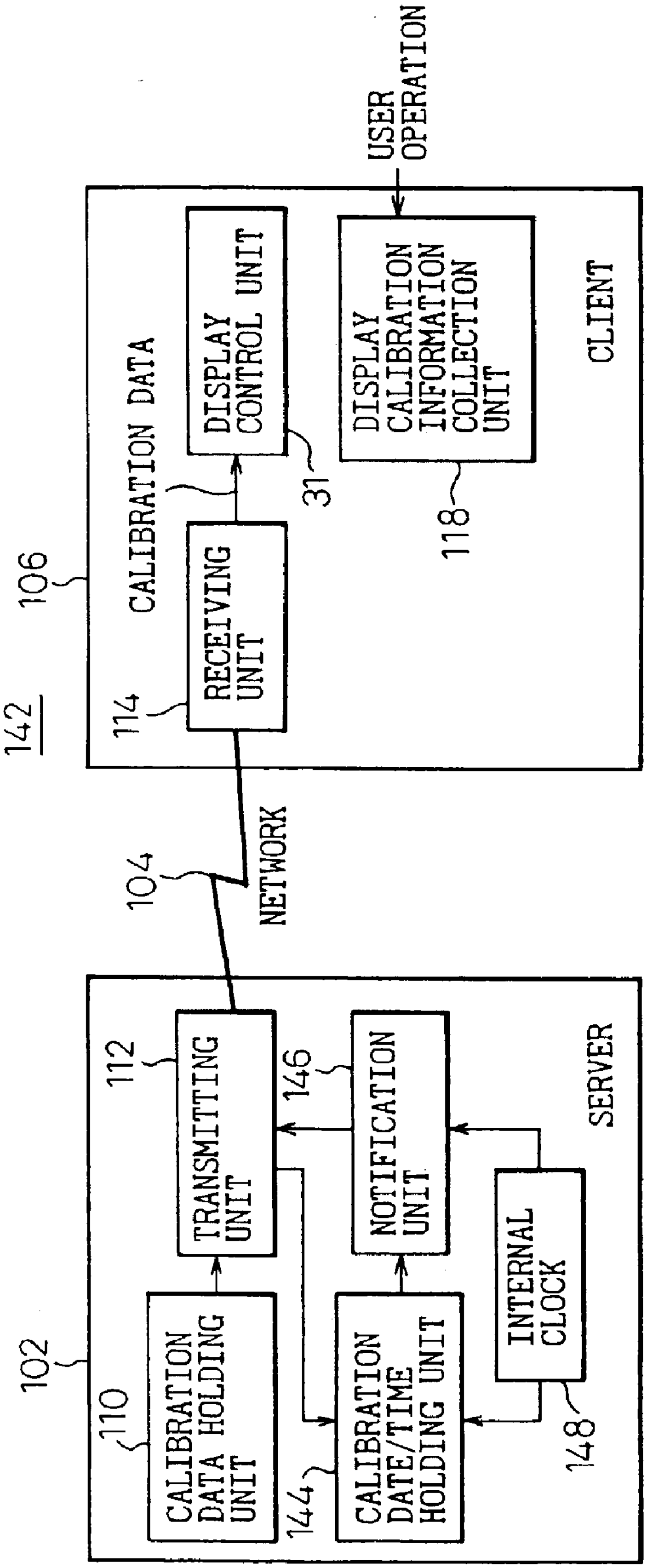
FIG. 48 is a block diagram showing a specific example of the configuration of the system of FIG. 47.

FIGS. 47 and 48 show the configuration of a display calibration system 142 which permits the user to periodically update the profile of the display device 14 of the client 106.

Figure 49:
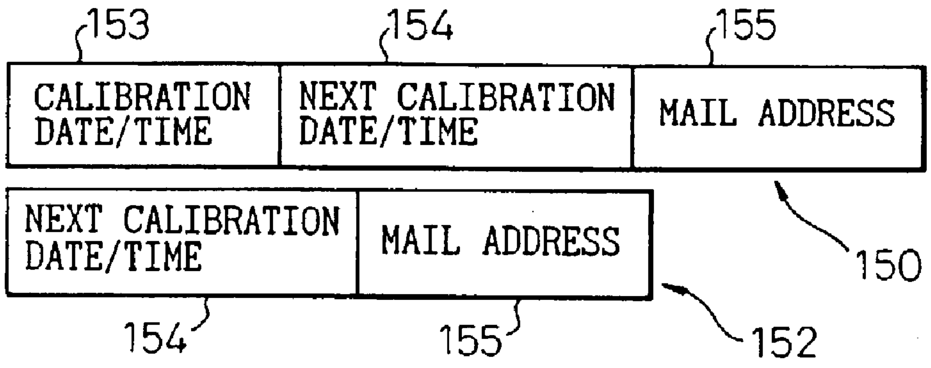
FIG. 49 is a diagram showing an example of management table structure for managing the next calibration date.

In the display calibration system 142, the server 102 includes an internal clock 148 as a clock means, and date/time information generated by the internal clock 148 is supplied to a calibration data/time information holding unit 144 as well as to a notification unit 146. The calibration date/time information holding unit 144 holds therein a management table 150 or a management table 152 such as shown in FIG. 49. The management table 150 consists of a previous calibration date/time storing section 153, a next calibration date/time storing section 154 for storing data indicating the date and time of the next calibration scheduled to be performed after the elapse of a predetermined period (predetermined time) from the date and time of the previous calibration, and a mail address storing section 155 for storing the mail address of the target client 106; the management table 152 consists of a next calibration date/time storing section 154 and a mail address storing section 155 for storing the mail address of the target client 106.

Figure 50:
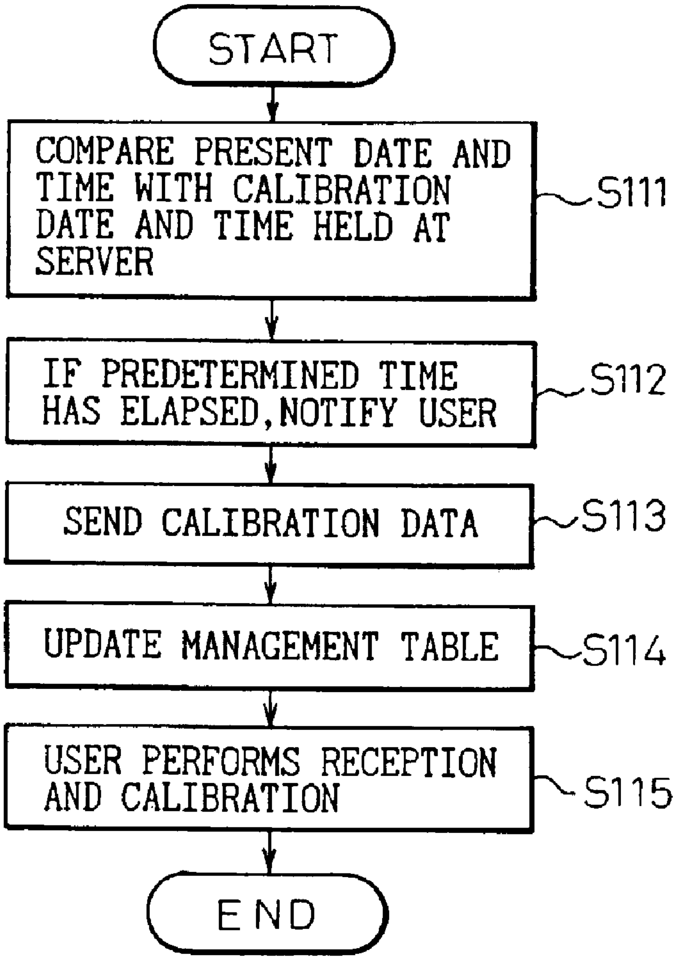
FIG. 50 is a flowchart for explaining the operation of the system shown in FIGS. 47 and 48.

The operation of the display calibration system 142 of FIGS. 47 and 48 will be described with reference to the flowchart shown in FIG. 50.

The calibration date/time information holding unit 144 of the server 102 compares the next calibration date and time stored in the management table 150 or 152 with the present date and time supplied from the internal clock 148 (step S111).

When the predetermined period has elapsed from the previous calibration date and time and the next calibration date and time has become equal to the present date and time, the notification unit 146 refers to the mail address stored in the storing section 155 and notifies the client 106 of the arrival of time to calibrate the display (step S112).

When a request is returned from the client 106 in response to the notification, the server 102 transmits the calibration data 108 to the client 106 (step S113), stores the date and time of the transmission as new calibration date and time in the storing section 153, and updates the contents of the storing section 154 by adding the predetermined period to the new calibration date and time and thus creating the next calibration date and time data (step S114). The user 116 performs the calibration using the image displayed based on the calibration data 108 (step S115).

In this way, in the display calibration system 142 of FIGS. 47 and 48, data indicating the date and time of the ICC profile Ip generated at each client 106 is held at the server 102 and, when a predetermined period has elapsed, a notification is sent to the corresponding client 106, urging it to perform the calibration of the display device 14. The client 106 creates the ICC profile Ip in accordance with this notification, to eliminate the effects of display deterioration over time.

Though not shown here, a configuration that permits the user to periodically adjust the contrast, etc. of the display device 14 can also be accomplished by replacing the display calibration information collection unit 118 at the client 106 by the display device 14 and by making provisions to send the calibration data from the display control unit 31 to the display device 14 (see FIG. 44).

Electronic mail is preferably used as means for notifying the client 106. Electronic mail is the most commonly used notification means on the Internet. The E-mail address of the user 116 is stored in advance as the mail address of the client 106 and, when a predetermined period has elapsed, a mail message urging the user to perform the recalibration of the display device is sent to the E-mail address. The E-mail address of the user 116 as the administrator of the display device is contained in the display calibration information and is fetched from the client 106 when the user performs an operation on the display calibration information collection unit 118.

In this case also, the WWW is used to display the calibration data 108, as explained with reference to FIG. 30. The WWW realizes a multimedia display environment such as images, voice, characters, etc. WWW browsers are available for various platforms including Windows, Macintosh, and UNIX and, by writing the calibration data 108 with a WWW programming language such as HTML or Java, all the clients 106 connected to the Internet can be supported across different platforms.

An example of the calibration data 108 held at the server 102 will be briefly described here. The contents of the calibration data 108 are substantially the same as the contents of the data held in the pattern image data holding unit 30 and grayscale image data holding unit 32 in the profile creation apparatuses 21, 22, and 23 (FIGS. 2, 14, and 15), and the details will not be given here, but briefly, the server 102 is configured to send the best suited calibration data according to the type of the display device 14 provided at the client 106.

According to the present invention, by displaying on a display device a pattern image consisting of a plurality of colors and a grayscale image consisting of a single color, there is achieved the effect that based on the displayed images, the input/output characteristic, i.e., the electro-optical conversion characteristic, of a so-called display such as a CRT display or a liquid crystal display can be measured and calculated in a simple manner at the user side.

Further, according to the present invention, a pattern image consisting of a plurality of colors and a grayscale image consisting of a single color are displayed on a display device and, based on the displayed images, the input/output characteristic of the display is obtained, and the profile of the display is created based on the thus obtained input/output characteristic. This achieves the effect that the profile relating to the color appearance of the display device can be created by the user without using a specialized measuring instrument.

Furthermore, according to the present invention, since the system is configured so that calibration data is sent from the first equipment to the second equipment via a network, adjustments relating to the display profile, etc. can be easily made by the user at the second equipment without the need to get specially prepared reference data.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A profile creation method for display device, comprising:

a displaying step for simultaneously displaying on a display device a pattern image consisting of a plurality of colors and a grayscale image consisting of a single color lying between said plurality of colors;

an input/output characteristic deriving step for obtaining an input/output characteristic of said display device based on operation by a user viewing said pattern image and said grayscale image displayed simultaneously; and a profile creation step for creating a profile for said display device based on said obtained input/output characteristic, wherein said pattern image is displayed as an image consisting of first pixels of first luminance and second pixels of second luminance in prescribed proportions to provide prescribed luminance by an average luminance value taken over said first and said second pixels, and said grayscale image is displayed as an image consisting of pixels of uniform luminance.

2. A profile creation method for a display device as claimed in claim 1, further comprising a color gamut information holding step for holding color gamut information indicating the range of colors reproducible on said displ y device, and wherein:

said profile creation step creates said profile based on said input/output characteristic and said color gamut information.

3. A profile creation method for a display device as claimed in claim 2, wherein said color gamut information holding step holds color gamut information for a plurality of representative display devices, and said profile creation step selects color gamut information corresponding to said display device from among said color gamut information held for said plurality of representative display devices, and creates said profile based on said selected color gamut information and said input/output characteristic.

4. A profile creation method for a display device as claimed in claim 1, wherein the input/output characteristic obtained in said input/output charactenstic deriving step is a gamma characteristic.

5. A profile creation apparatus for a display device, comprising:

a display device for displaying images;

pattern image data holding means for holding as data a pattern image consisting of a plurality of colors;

grayscale image data holding means for holding as data a grayscale image consisting of a single color lying between said plurality of colors;

display control means for reading out said pattern image data and said grayscale image data from said pattern image data holding means and said grayscale image data holding means, and for simultaneously presenting said pattern image and said grayscale image for display on said display device;

input/output characteristic calculation means for obtaining an input/output characteristic of said display device based on operation by a user viewing said pattern image and said grayscale image displayed simultaneously; and profile creation means for creating a profile for said display device based on said obtained input/output characteristics, wherein said pattern image is displayed as an image consisting of first pixels of first luminance and second pixels of second luminance in prescribed proportions to provide prescribed luminance by an average luminance value taken over said first and said second pixels, and said grayscale image is displayed as an image consisting of pixels of uniform luminance.

6. A profile creation apparatus for a display device as claimed in claim 5, further comprising color gamut information holding means for holding color gamut information indicating the range of colors reproducible on said display device, and wherein:

said profile creation means creates said profile based on said input/output charactenstic and said color gamut information.

7. A profile creation apparatus for a display device as claimed in claim 5, wherein color gamut information for a plurality of representative displa devices is held as said color gamut information, and said profile creation means selects color gamut information corresponding to said display device from among said color gamut information held for said plurality of representative display devices, and creates said profile based on said selected color gamut information and said input/output characteristic.

8. A profile creation apparatus for a display device as claimed in claim 5, wherein the input/output characteristic obtained by said input/output characteristic calculation means is a gamma characteristic.

9. A profile creation apparatus for a display device, comprising:

a display device for displaying images;

pattern image data holding means for holding as data a pattern image consisting of a plurality of colors;

grayscale image data holding means for holding as data a grayscale image consisting of a single color lying between said plurality of colors;

display control means for reading out said pattern image data and said grayscale image data from said pattern image data holding means and said grayscale image data holding means, and for simultaneously presenting said pattern image and said grayscale image for display on said display device;

input/output characteristic calculation means for obtaining an input/output characteristic of said display device based on operation by a user viewing said pattern image and said grayscale image displayed simultaneously; and profile creation means for creating a profile for said display device based on said obtained input/output characteristic, wherein said input/output characteristic calculation means further obtains a gamma coefficient value, and calculates a plurality of input value versus output value relations based on said obtained gamma coefficient value, and said profile creation means creates the profile of said display device by including therein said calculated input value versus output value relations.

* * * * *

UNITED STATES PATENT AND TRADEMARK OFFICE

CERTIFICATE OF CORRECTION

PATENT NO. : 6,950,551 B2
APPLICATION NO. : 10/272004
DATED : September 27, 2005
INVENTOR(S) : Kimitaka Murashita et al.

It is certified that error appears in the above-identified patent and that said Letters Patent is hereby corrected as shown below:

Column 36: line 13, change “for” to --for a --;

Column 36, line 37, change “displ y” to --display--.

Column 36, line 54, change “charactenstic” to --characteristic--.

Column 37, line 12, change “characteristics” to --characteristic--.

Column 27, line 26, change “charactenstic” to --characteristic--.

Column 37, line 29, after “wherein” insert --:--.

Column 37, line 31, change “displa” and insert --display--.

Signed and Sealed this

Eighteenth Day of July, 2006

JON W. DUDAS

*Director of the United States Patent and Trademark Office*

UNITED STATES PATENT AND TRADEMARK OFFICE

CERTIFICATE OF CORRECTION

PATENT NO. : 6,950,551 B2
APPLICATION NO. : 10/272004
DATED : September 27, 2005
INVENTOR(S) : Kimitaka Murashita et al.

It is certified that error appears in the above-identified patent and that said Letters Patent is hereby corrected as shown below:

In claim 16, col. 37, line 26, change “charactenstic” to --characteristic--

Signed and Sealed this

Sixth Day of March, 2007

JON W. DUDAS

*Director of the United States Patent and Trademark Office*